(12) United States Patent
Ordentlich et al.

(10) Patent No.: US 12,552,869 B2
(45) Date of Patent: Feb. 17, 2026

(54) CSF-1R ANTIBODIES FOR THE TREATMENT OF CHRONIC GRAFT VERSUS HOST DISEASE

(71) Applicant: Syndax Pharmaceuticals, Inc., Waltham, MA (US)

(72) Inventors: Peter Ordentlich, Lexington, MA (US); Michael Meyers, Hastings-on-Hudson, NY (US); Briggs W. Morrison, Newtown, PA (US)

(73) Assignee: Syndax Pharmaceuticals, Inc., New York, NY (US)

( * ) Notice: Subject to any disclaimer, the term of this patent is extended or adjusted under 35 U.S.C. 154(b) by 888 days.

(21) Appl. No.: 17/783,552

(22) PCT Filed: Dec. 9, 2020

(86) PCT No.: PCT/US2020/064010
§ 371 (c)(1),
(2) Date: Jun. 8, 2022

(87) PCT Pub. No.: WO2021/119128
PCT Pub. Date: Jun. 17, 2021

(65) Prior Publication Data
US 2023/0035183 A1    Feb. 2, 2023

Related U.S. Application Data

(60) Provisional application No. 63/110,111, filed on Nov. 5, 2020, provisional application No. 62/945,842, filed on Dec. 9, 2019.

(51) Int. Cl.
*A61K 39/395*    (2006.01)
*A61P 37/06*    (2006.01)
(Continued)

(52) U.S. Cl.
CPC ...... *C07K 16/2866* (2013.01); *A61K 39/3955* (2013.01); *A61P 37/06* (2018.01);
(Continued)

(58) Field of Classification Search
None
See application file for complete search history.

(56) References Cited

U.S. PATENT DOCUMENTS 8,017,739 B2    9/2011    Eichner et al.
9,908,939 B2    3/2018    Craggs et al.
(Continued)

FOREIGN PATENT DOCUMENTS

AR    079333 A1    1/2012
CN    1863817 A    11/2006
(Continued)

OTHER PUBLICATIONS

Pitiot et al., Alternative Routes of Administration for Therapeutic Antibodies—State of the Art, Antibodies, 11(3):56, 25 pages, doi: 10.3390/antib11030056, Aug. 22, 2022.*
(Continued)

*Primary Examiner* — Claire Kaufman
(74) *Attorney, Agent, or Firm* — Fenwick & West LLP; Heidi A. Erlacher; Eric Owens

(57) ABSTRACT

The present invention relates to methods of treating sclerotic conditions and more specifically to methods of treating chronic graft versus host disease with specific dosages of an anti-CSF-1R antibody, specifically axatilimab.

31 Claims, 15 Drawing Sheets

Specification includes a Sequence Listing.

(51) Int. Cl.
   *C07K 16/28*      (2006.01)
   *A61K 39/00*      (2006.01)
(52) U.S. Cl.
   CPC .. *A61K 2039/505* (2013.01); *A61K 2039/545* (2013.01); *C07K 2317/24* (2013.01); *C07K 2317/76* (2013.01)

(56) References Cited

U.S. PATENT DOCUMENTS

| | | | |
|---|---|---|---|
| 10,039,826 | B2 | 8/2018 | Boonen et al. |
| 10,421,814 | B2 | 9/2019 | Craggs et al. |
| 2007/0086979 | A1 | 4/2007 | Chevrier et al. |
| 2009/0148905 | A1 | 6/2009 | Ashman et al. |
| 2011/0178278 | A1 | 7/2011 | Haegel et al. |
| 2013/0095098 | A1 | 4/2013 | Tyson |
| 2016/0200820 | A1 | 7/2016 | Marshall |

FOREIGN PATENT DOCUMENTS

| | | |
|---|---|---|
| CN | 101128484 A | 2/2008 |
| WO | WO-03080672 A1 | 10/2003 |
| WO | WO2006/072093 A2 | 7/2006 |
| WO | WO-2007143146 A2 | 12/2007 |
| WO | WO-2008055013 A2 | 5/2008 |
| WO | WO-2009026303 A1 | 2/2009 |
| WO | WO-2009052237 A1 | 4/2009 |
| WO | WO-2009112245 A1 | 9/2009 |
| WO | WO-2010012667 A1 | 2/2010 |
| WO | WO-2011070024 A1 | 6/2011 |
| WO | WO-2011107553 A1 | 9/2011 |
| WO | WO-2011123381 A1 | 10/2011 |
| WO | WO-2011131407 A1 | 10/2011 |
| WO | WO-2011140249 A2 | 11/2011 |
| WO | WO-2012082689 A1 | 6/2012 |
| WO | WO-2012110360 A1 | 8/2012 |
| WO | WO-2013057281 A2 | 4/2013 |
| WO | WO-2013087699 A1 | 6/2013 |
| WO | WO-2013119716 A1 | 8/2013 |
| WO | WO-2014036076 A1 | 3/2014 |
| WO | WO-2015028454 A2 | 3/2015 |
| WO | WO-2015028455 A1 | 3/2015 |
| WO | WO2016/128318 A1 | 8/2016 |
| WO | WO-2018213665 A1 * | 11/2018 ......... A61K 31/4406 |

OTHER PUBLICATIONS

Ordentlich et al., Targeting colony stimulating factor-1 receptor (CSF-1R) with SNDX-6352, a novel anti-CSF-1R targeted antibody, Retrieved online from:<URL:https://cms.syndax.com/wp-content/uploads/2016/11/SITC_2016_6352_Poster_11.08.16.pdf> [retrieved on Apr. 29, 2025], Poster #421, 2016.*
Sarantopoulos, S, Targeting CSF1R in chronic GVHD—Lessons in translation, New Engl. J. Med. 391(11):1053-1055, Sep. 19, 2024.*
Ahmed et al., Phase Ib/II Study of Lacnotuzumab in Combination with Spartalizumab in Patients with Advanced Malignancies, J. Immunother. Prec. Oncol. 27(2):73-81, May 2024.*
ClinicalTrials.gov Database, NCT03604692, A Phase 1/2 Study to Evaluate Axatilimab in Participants With Active cGVHD, ver.2, Retrieved online from: <URL:https://clinicaltrials.gov/study/NCT03604692?term=nct03604692&rank=1&tab=history&a=2#version-content-panel> [retrieved on Apr. 28, 2025], Nov. 19, 2018.*
DrugBank Database, Axatilimab, https://go.drugbank.com/drugs/DB16388> [retrieved on Apr. 30, 2025], Oct. 2, 2024.*
Wolff et al., Axatilimab in Recurrent or Refractory Chronic Graft-versus-Host Disease, N. Engl. J. Med. 391:1002-14, 2024.*
Baran et al. "Important Roles for Macrophage Colony-stimulating Factor, CC Chemokine Ligand 2, and Mononuclear Phagocytes in the Pathogenesis of Pulmonary Fibrosis", Am. J. Respir. Grit. Care Med., (2007); 176:78-89.

Chen, C. et al., "Enhancement and destruction of antibody function by somatic mutation: unequal occurrence is controlled by V gene combinatorial association", EMBO J. Jun. 15, 1995; 14(12): 2784-94.
Colman, P. M., "Effects of amino acid sequence changes on antibody-antigen interactions", Res Immunol. Jan. 1994; 145(1): 33-6.
International Preliminary Report of International Application No. PCT/EP2014/068050, dated Mar. 1, 2016, 8 pages.
International Search Report and Written Opinion of International Application No. PCT/EP2014/068047, mailed Mar. 30, 2015, 19 pages.
International Search Report and Written Opinion of International Application No. PCT/EP2014/068050, mailed Nov. 6, 2014, 13 pages.
International Search Report and Written Opinion of International Application No. PCT/EP2016/052494, mailed Apr. 5, 2016, 11 pages.
Kussie, P. H. et al. "A single engineered amino acid substitution changes antibody fine specificity," J. Immunol., (1994); 152:146-152.
Lim et al. "Antibody blockade of c-fms suppresses the progression of inflammation and injury in early diabetic nephropathy in obese db/db mice", Diabetologia; (May 23, 2009); 52(8):1669-1679.
MacDonald et al. "An antibody against the colony-stimulating factor 1 receptor depletes the resident subset of monocytes and tissue- and tumor-associated macrophages but does not inhibit inflammation", Blood, American Society of Hematology, (Nov. 11, 2010), 116(19):3955-3963.
Maurer et al. "Emerging targeted therapies in scleroderma lung and skin fibrosis", Bailliere's Best Practice and Research Clinical Reumatology, (2011); 25(6):843-858.
Paulus et al. "Colony-Stimulating Factor-1 Antibody Reverses Chemoresistance in Human MCF-7 Breast Cancer Xenografts", Cancer Research, (Apr. 15, 2006); 66(8):4349-4356.
Pedroza, M. et al. "Interleukin-6 Contributes to Inflammation and Remodeling in a Model of Adenosine Mediated Lung Injury" PLoS ONE, (2011); 6(7):1-13.
Raghu et al., "Treatment of Idiopathic Pulmonary Fibrosis with a New Antifibrotic Agent, Pirfenidone", Am. J. Respir. Crit. Care Med., (1999); 159:1061-1069.
Rudikoff, S. et al. "Single amino acid substitution altering antigen-binding specificity", Proc Natl Acad Sci, (Mar. 1982); 79:1979-1983.
Tamura, M., et al., "Structural correlates of an anticarcinoma antibody: identification of specificity-determining residues (SDRs) and development of a minimally immunogenic antibody variant by retention of SDRs only," J. Immunol., 2000, vol. 164, No. 3, pp. 1432-1441.
Wedge, S.R., et al.; "AZD2171: A Highly Potent, Orally Bioavailable, Vascular Endothelial Growth Factor Receptor-2 Tyrosine Kinase Inhibitor for the Treatment of Cancer," Cancer Res. (2005); 65(10):4389-4400.
Byren, A.J., et al., "Pulmonary Macrophages: A New Therapeutic Pathway in Fibrosing Lung Disease?", Trends Mol Med., (2016); 22(4):303-316.
He, C., et al., "Accelerated development of pulmonary fibrosis via Cu,Zn-superoxide dismutase-induced alternative activation of macrophages", J Biol Chem., (2013); 288(28):20745-20757.
Jiang, G. et al., "Evaluation of Heavy-Chain C-Terminal Deletion on Product Quality and Pharmacokinetics of Monoclonal Antibodies," J Pharm Sci. (2016); 105(7):2066-2072.
Pechkovsky, D.V., et al., "Alternatively activated alveolar macrophages in pulmonary fibrosis-mediator production and intracellular signal transduction," Clin Immunol., (2010); 137(1):89-101.
Salmasian H, et.al., "Corticosteroid regimens for treatment of acute and chronic graft versus host disease (GvHD) after allogenic stem cell transplantation," Cochrane Database Syst Rev. (2010), 15 pages.
Wynn, T.A., et al., "Macrophages: master regulators of inflammation and fibrosis," Semin Liver Dis., (2010); 30(3):245-257.
Xiulan et al., "119 Establishment of hybridoma clones secreting CSF-1 receptor antibodies and the biological effects of monoclonal

(56) References Cited

OTHER PUBLICATIONS antibodies," Journal of Cellular and Molecular Immunology, Issue 3, pp. 75-76 (1991), with English machine translation, 3 pages.
Alexander et al. "CSF-1-dependant donor-derived macrophages mediate chronic graft-versus-host disease" J Clin Invest. Oct. 2014;124(10):4266-80.
Arceci RJ et al. "Expression of CSF-1 /c-hs and SF/c-kit mRNA during Preimplantation Mouse Development", Developmental Biology 1992, 151 (1), 1-8.
Arceci RJ "Temporal expression and location of colony-stimulating factor 1(CSF-1) and its receptor in the female reproductive tract are consistent with CSF-1-regulated placental development", PNAS 1989, 86(22), 8818-8822.
Byrne et al. "Distribution of Cells Bearing Receptors for a Colony-stimulating Factor (CSF-1) in Murine Tissues", J Cell Biol 1981 91(3 Pt 1) 848-853.
Cerretti DP et al. "Human Macrophage-Colony Stimulating Factor: Alternative RNA and Protein Processing From a Single Gene", Molecular Immunology, vol. 25, No. 8, pp. 761-770, 1988.
Crooks et al (1991) "The use of the Karnofsky Performance Scale in determining outcomes and risk in geriatric outpatients", Journal of Gerontology: Medical Sciences, 1991, vol. 46. No. 4. M139-144.
Douglass TG et al. "Macrophage colony stimulating factor: Not just for macrophages anymore! A gateway into complex biologies", 2008, International Immunopharmacology (2008) 8, 1354-1376.
Flowers M. E. and P. J. Martin (2015) "How we treat chronic graft-versus-host disease", Blood 125(4): 606-615.
Hill et al. (2018) "New and emerging therapies for acute and chronic graft versus host disease", Ther Adv Hematol 9(1): 21-46.
Hofstetter W et al. "Detection of Transcripts and Binding Sites for Colony-Stimulating Factor-1 During Bone Development", Bone 1995, 17(2), 145-151.
Inamoto et al. (2020) "Refined National Institutes of Health response algorithm for chronic graft-versus-host disease in joints and fascia", Blood Advances 4(1): 40-46.
Jagasia et al. (2015) "National Institutes of Health Consensus Development Project on Criteria for Clinical Trials in Chronic Graft-versus-Host Disease: I. The 2014 Diagnosis and Staging Working Group report", Biol Blood Marrow Transplant, 2015, 21(3): 389-401.
Jagasia et al. (2018) "Ruxolitinib for the treatment of patients with steroid-refractory GVHD: an introduction to the REACH trials", Immunotherapy 10(5): 391-402.
Jagasia et al. (2019) "Randomized controlled study of ECP with methoxsalen as first-line treatment of patients with moderate to severe cGVHD", Blood Advances 3(14): 2218-2229.
Jokhi PP et al. "Expression of the Colony Stimulating Factor-I Receptor (c-fms Product) by Cells at the Human Uteroplacental Interface", Laboratory Investigation 1993, 68(3), 308-320.
Kauma SW et al. "Colony-Stimulating Factor-1 and c-fms Expression in Human Endometrial Tissues and Placenta during the Menstrual Cycle and Early Pregnancy", Journal of Clinical Endocrinology and Metabolism, 1991, 73(4), 746-751.
Lansky et al. (1987) "The measurement of performance in childhood cancer patients", Cancer 60(7): 1651-1656.
Lee et al. (2002) "Development and validation of a scale to measure symptoms of chronic graft-versus-host disease", Biology of Blood and Marrow Transplantation, 8(8): 444-452.
Lee et al. (2015) "Measuring therapeutic response in chronic graft-versus-host disease. National Institutes of Health consensus development project on criteria for clinical trials in chronic graft-versus-host disease: IV. The 2014 Response Criteria Working Group report" Biol Blood Marrow Transplant 21(6): 984-999.

MacDonald K. P., (2017) "Chronic graft-versus-host disease: biological insights from preclinical and clinical studies", Blood 129(1): 13-21.
Merkel et al. (2016) "Content Validity of the Lee Chronic Graft-versus-Host Disease Symptom Scale as Assessed by Cognitive Interviews", Biol Blood Marrow Transplant 22(4): 752-758.
Miklos et al. (2017) "Ibrutinib for chronic graft-versus-host disease after failure of prior therapy", Blood 130(21): 2243-2250.
NCT03604692, A Phase 1/2 Study to Evaluate SNDX-6352 in Participants With Active cGVHD, dated Jul. 27, 2018, 10 pages.
O'Toole et al. (1991) "Evaluating cancer patients for rehabilitation potential", The Western Journal of Medicine, 155(4): 384-387.
Pampfer S et al. "Expression of the Colony-Stimulating Factor-i Receptor (c-fms Proto-Oncogene Product) in the Human Uterus and Placenta", Biology of Reproduction 1992, 46(1), 48-57.
Pixley FJ et al. "CSF-1 regulation of the wandering macrophage: complexity in action", 2004, Trends in Cell Biology, 14(11) 628-38.
Pollard JW et al. "Pleiotropic Roles for CSF-1 in Development Defined by the Mouse Mutation Osteopetrotic", Advances in Developmental Biochemistry vol. 4, 1996, pp. 153-193.
Regenstreif et al. "Expression of the c-fms Proto-oncogene and of the Cytokine, CSF-1, during Mouse Embryogenesis", Developmental Biology 133, 284-294 (1989).
Schag et al. (1984) "Karnofsky performance status revisited: reliability, validity, and guidelines", J Clin Oncol 2(3): 187-193.
Tanaka S et al. "Macrophage colony-stimulating factor is indispensable for both proliferation and differentiation of osteoclast progenitors.", 1993, The Journal of Clinical Investigation, 91: 257-263.
Teh et al. (2020) "Reliability and Validity of the Modified 7-Day Lee Chronic Graft-versus-Host Disease Symptom Scale", Biol Blood Marrow Transplant 26(3): 562-567.
Tey et al. "Chronic Graft-Versus-Host Disease: Therapeutics at Last?", The Hematologist, Mini Review, Apr. 16, 2019, vol. 16, No. 3, 16 pages.
Thall et al. (1995) "Bayesian sequential monitoring designs for single-arm clinical trials with multiple outcomes", Statistics in Medicine 14(4): 357-379.
Weir EC et al. "Macrophage Colony-Stimulating Factor Release and Receptor Expression in Bone Cells" 1993, Journal of Bone and Mineral Research, 1993, 8(12) 1507-1518.
Arora, M., et al., "Phase 1 Study of Axatilimab (SNDX-6352), a CSF-1R Humanized Antibody, for Chronic Graft-Versus-Host Disease after 2 or More Lines of Systemic Treatment," (2020) Blood 136(Supplement 1):1-2, 5 pages.
Casadevall et al. "Immunoglobulin isotype influences affinity and specificity" Proceedings of the National Academy of Sciences (2012); 109(31):12272-12273.
NCT03604692 "A Phase 1/2 Study to Evaluate SNDX-6352 in Participants With Active cGVHD" Clinical Trials, dated Dec. 4, 2019, (Version 7) 18 pages.
Radojcic et al. "Safety, Tolerability, and Efficacy of Axatilimab, a Colony-Stimulating Factor 1 Receptor (CSF-1R) Humanized Antibody, in Advanced Chronic Graft-versus-host Disease-Related Bronchiolitis Obliterans Syndrome" Change (2023); 10: 2 pages.
Syndax Press Release "Incyte and Syndax Present Additional Data from Positive AGAVE-201 Trial at ASH Plenary Session Showing Axatilimab Efficacy Including Durable Responses in Chronic Graft-Versus-Host Disease Session Showing Axatilimab Efficacy Including Durable Responses in Chronic Graft-Versus-Host Disease" Press Release (Dec. 2023); 3 pages.
Syndax Pharmaceuticals et al. "Syndax Pharmaceuticals Reports First Quarter 2023 Financial Results and Provides Clinical and Business Update" (May 8, 2023); 8 pages. Retrieved from the Internet: URL:https://www.prnewswire.com/news-releases/syndax-pharmaceuticalsreports-first-quarter-2023-financial-results-and-provides-clinical-andbusiness-update-301818643.html.

* cited by examiner

Overall Responses and by organ system (patient experience)

- Responses observed at all dose levels
- Deep and Sustained responses observed across several organ systems
- Responses seen after prior Ibrutinib = 6; Ruxolitinib = 5; KD-025 = 3
- Patients with 7-point improvement in normalized Lee Symptom Scale (LSS) = 6
- Additional responses in lungs, skin, and GI

| | Total (N = 12) |
|---|---|
| Patients with at least 1 response (CR and/or PR) | 7 |
| Median time to response | 12 weeks |
| Esophagus (n = 1) | 1 |
| Eyes (n = 10) | 3 |
| Joints/fascia (n = 9) | 5 |
| Mouth (n = 7) | 1 |
| Skin (n = 8) | 3 |

FIG. 8

Chronic GVHD incidence and limited treatment options

- Chronic GVHD commonly affects 30-50% of allogeneic HCT recipients
- Corticosteroids are the standard frontline treatment
- Approximately 50% of the patients need second line treatment for disease progression or inadequate response
- Ibrutinib is the only approved second line treatment of chronic GVHD
- Morbidity and mortality in patients needing second or further lines of therapy remains high
- Amongst patients with chronic GVHD, those with sclerosis and lung involvement are often difficult to treat and associated with poor outcomes
- Development of novel agents to treat chronic GVHD remains an unmet medical need

FIG. 10

Baseline demographics & characteristics

| Characteristic | 1 mg/kg q2wk n=2¹ | 1mg/kg q2wk n=3 | 3 mg/kg q2wk n=6 | 3 mg/kg q4wk n=4 | Total N=15 |
|---|---|---|---|---|---|
| Age, median (range), years | 56 (48, 64) | 36 (29, 66) | 60 (53, 73) | 63 (31, 73) | 60 (29, 73) |
| Myeloablative transplant n, (%) | 1 (50)² | 1 (33) | 2 (33) | 3 (75) | 7 (47) |
| Related Donor | 2 (100) | 2 (67) | 4 (67) | 1 (25) | 9 (60) |
| Matched unrelated Donor | 0 | 1 (33) | 2 (33) | 3 (75) | 6 (40) |
| Peripheral blood SCT | 2 (100) | 3 (100) | 5 (83) | 4 (100) | 14 (93) |
| Transplant→cGVHD, median (range), months | 6.1 (3.4, 8.8) | 3.7 (0.2, 5.7) | 12.1 (5.2, 24.2) | 9.2 (2.3, 20) | 6.8 (0.2, 24.2) |
| cGVHD→C1D1 | 37 (18, 36) | 46.8 (24.8, 85.2) | 49.2 (20.4, 187.2) | 25.2 (9.6, 42) | 42 (9.6, 187.2) |
| KPS at enrollment, median (range) | 85 (80, 90) | 70 (70, 90) | 75 (60, 80) | 80 (70, 100) | 80 (60, 100) |
| # organs involved, median (range) | 3.5 (3, 4) | 3 (2, 5) | 4 (1, 5) | 3.5 (2, 9) | 4 (1, 9) |
| ≥4 organs involved | 1 (50)² | 1 (33) | 4 (67) | 2 (50) | 8 (53) |
| Prior tx, median (range) | 5.5 (4, 7) | 7 (4, 9) | 4.5 (3, 7) | 3 (2, 6) | 4 (2, 9) |
| Ibrutinib, n (%) | 2 (100) | 3 (100) | 6 (100) | 0 | 11 (73) |
| Ruxolitinib | 2 (100) | 1 (33) | 4 (67) | 2 (50) | 9 (60) |
| KD025 | 1 (50)² | 1 (33) | 3 (50) | 0 | 5 (33) |

¹Includes one patient from 0.15mg/kg q2wk dosing cohort. ²Includes one patient from 0.5mg/kg q2wk dosing cohort. Abbreviations: SCT=stem-cell transplant, KPS=Karnofsky Performance Score, tx=treatment, q=every

FIG. 11

Conclusions

- Axatilimab demonstrates good tolerability with clinical activity demonstrated by a 57% (n=8) response rate in a heavily pre-treated patient population

- Low rate of infections reported with no viral reactivations

- Ongoing development of axatilimab will include a Phase 2 study (AGAVE-201) planned for enrollment. This will be a randomized, multicenter study to evaluate the efficacy, safety and tolerability of Axatilimab at 3 different doses in patients with recurrent or refractory active cGVHD who have received at least 2 lines of systemic therapy

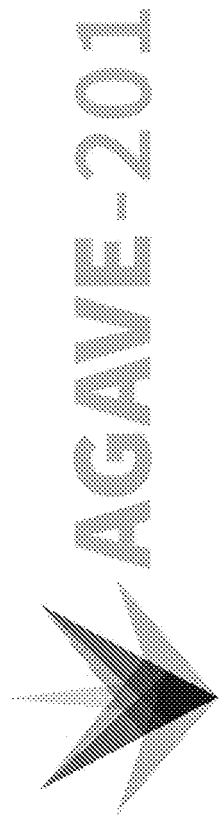

FIG. 15

SEQUENCE LISTING

```
<160> NUMBER OF SEQ ID NOS: 38

<210> SEQ ID NO 1
<211> LENGTH: 11
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 1

Leu Ala Ser Glu Asp Ile Tyr Asp Asn Leu Ala
1               5                   10

<210> SEQ ID NO 2
<211> LENGTH: 7
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 2

Tyr Ala Ser Ser Leu Gln Asp
1               5

<210> SEQ ID NO 3
<211> LENGTH: 9
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 3

Leu Gln Asp Ser Glu Tyr Pro Trp Thr
1               5
```

<210> SEQ ID NO 4
<211> LENGTH: 12
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 4

Gly Phe Ser Leu Thr Thr Tyr Gly Met Gly Val Gly
1               5                   10

<210> SEQ ID NO 5
<211> LENGTH: 16
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 5

Asn Ile Trp Trp Asp Asp Asp Lys Tyr Tyr Asn Pro Ser Leu Lys Asn
1               5                   10                  15

<210> SEQ ID NO 6
<211> LENGTH: 16
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 6

Ile Gly Pro Ile Lys Tyr Pro Thr Ala Pro Tyr Arg Tyr Phe Asp Phe
1               5                   10                  15

<210> SEQ ID NO 7
<211> LENGTH: 107
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 7

Asp Ile Gln Met Thr Gln Ser Pro Ala Ser Leu Ser Ala Ser Leu Gly
1               5                   10                  15

Glu Thr Val Ser Ile Glu Cys Leu Ala Ser Glu Asp Ile Tyr Asp Asn
            20                  25                  30

Leu Ala Trp Tyr Gln Lys Lys Pro Gly Lys Ser Pro His Leu Leu Ile
        35                  40                  45

Tyr Tyr Ala Ser Ser Leu Gln Asp Gly Val Pro Ser Arg Phe Ser Gly
    50                  55                  60

Ser Gly Ser Gly Thr Gln Tyr Ser Leu Lys Ile Asn Ser Leu Glu Ser
65                  70                  75                  80

Glu Asp Ala Ala Thr Tyr Phe Cys Leu Gln Asp Ser Glu Tyr Pro Trp
                85                  90                  95

Thr Phe Gly Gly Gly Thr Lys Leu Glu Leu Lys
            100                 105

<210> SEQ ID NO 8
<211> LENGTH: 321
<212> TYPE: DNA
<213> ORGANISM: Artificial Sequence
<220> FEATURE:
<221> NAME/KEY: source
<223> OTHER INFORMATION: /note="Description of Artificial Sequence: Synthetic polynucleotide"

<400> SEQUENCE: 8

```
gacatccaga tgacacagtc tccagcttcc ctgtctgcat ctctgggaga aactgtctcc    60
atcgaatgtc tagcaagtga ggacatttac gataatttag cgtggtacca agaagaagcca  120
ggaaaatctc ctcacctcct catctattat gcaagtagct tgcaagatgg ggtcccatca  180
cggttcagtg gcagtggatc tggcacacag tattctctca aaatcaacag cctggaatct  240
gaagatgctg cgacttattt ctgtctacag gattctgagt atccgtggac gttcggtgga  300
ggcaccaagc tggaattgaa a                                              321
```

<210> SEQ ID NO 9
<211> LENGTH: 127
<212> TYPE: PRT
<213> ORGANISM: Artificial Sequence
<220> FEATURE:
<221> NAME/KEY: source
<223> OTHER INFORMATION: /note="Description of Artificial Sequence: Synthetic polypeptide"

<400> SEQUENCE: 9

```
Met Gly Val Pro Thr Gln Leu Leu Val Leu Leu Leu Trp Ile Thr
1               5                   10                  15

Asp Ala Ile Cys Asp Ile Gln Met Thr Gln Ser Pro Ala Ser Leu Ser
            20                  25                  30

Ala Ser Leu Gly Glu Thr Val Ser Ile Glu Cys Leu Ala Ser Glu Asp
        35                  40                  45

Ile Tyr Asp Asn Leu Ala Trp Tyr Gln Lys Pro Gly Lys Ser Pro
    50                  55                  60

His Leu Leu Ile Tyr Tyr Ala Ser Ser Leu Gln Asp Gly Val Pro Ser
65                  70                  75                  80

Arg Phe Ser Gly Ser Gly Ser Gly Thr Gln Tyr Ser Leu Lys Ile Asn
                85                  90                  95

Ser Leu Glu Ser Glu Asp Ala Ala Thr Tyr Phe Cys Leu Gln Asp Ser
            100                 105                 110

Glu Tyr Pro Trp Thr Phe Gly Gly Gly Thr Lys Leu Glu Leu Lys
        115                 120                 125
```

<210> SEQ ID NO 10
<211> LENGTH: 381
<212> TYPE: DNA
<213> ORGANISM: Artificial Sequence
<220> FEATURE:
<221> NAME/KEY: source
<223> OTHER INFORMATION: /note="Description of Artificial Sequence: Synthetic polynucleotide"

<400> SEQUENCE: 10

```
atgggtgtcc ccactcagct cttggtgttg ttgctgctgt ggattacaga tgccatatgt    60
gacatccaga tgacacagtc tccagcttcc ctgtctgcat ctctgggaga aactgtctcc  120
atcgaatgtc tagcaagtga ggacatttac gataatttag cgtggtacca agaagaagcca  180
ggaaaatctc ctcacctcct catctattat gcaagtagct tgcaagatgg ggtcccatca  240
```

```
cggttcagtg gcagtggatc tggcacacag tattctctca aaatcaacag cctggaatct    300
gaagatgctg cgacttattt ctgtctacag gattctgagt atccgtggac gttcggtgga    360
ggcaccaagc tggaattgaa a                                              381
```

```
<210> SEQ ID NO 11
<211> LENGTH: 125
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 11
```

```
Gln Val Thr Leu Lys Glu Ser Gly Pro Gly Ile Leu Gln Pro Ser Gln
 1               5                  10                  15

Thr Leu Ser Leu Thr Cys Thr Phe Ser Gly Phe Ser Leu Thr Thr Tyr
             20                  25                  30

Gly Met Gly Val Gly Trp Ile Arg Gln Pro Ser Gly Lys Gly Leu Glu
         35                  40                  45

Trp Leu Ala Asn Ile Trp Trp Asp Asp Asp Lys Tyr Tyr Asn Pro Ser
 50                  55                  60

Leu Lys Asn Arg Leu Thr Ile Ser Lys Asp Thr Ser Asn Asn Gln Ala
 65                  70                  75                  80

Phe Leu Lys Leu Thr Asn Val His Thr Ser Asp Ser Ala Thr Tyr Tyr
             85                  90                  95

Cys Ala Arg Ile Gly Pro Ile Lys Tyr Pro Thr Ala Pro Tyr Arg Tyr
            100                 105                 110

Phe Asp Phe Trp Gly Pro Gly Thr Met Val Thr Val Ser
        115                 120                 125
```

```
<210> SEQ ID NO 12
<211> LENGTH: 375
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic polynucleotide"

<400> SEQUENCE: 12
```

```
caggttactc tgaaagagtc tggccctggg atattgcagc cctcccagac cctcagtctg     60
acttgcactt tctctgggtt ttcactgacc acttatggta tgggtgtggg ctggattcgt    120
cagccttcag ggaagggtct ggagtggctg gcaaacattt ggtgggatga tgataagtat    180
tacaatccat ctctgaaaaa ccggctcaca atctccaagg acacctccaa caaccaagca    240
ttcctcaagc tcaccaatgt acacacttca gattctgcca catactactg tgctcggata    300
gggccgatta atacccgac ggccccctac cggtactttg acttctgggg cccaggaacc     360
atggtcaccg tctcg                                                     375
```

```
<210> SEQ ID NO 13
<211> LENGTH: 144
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 13
```

```
Met Asp Arg Leu Thr Ser Ser Phe Leu Leu Ile Val Pro Ala Tyr
1               5                   10                  15

Val Leu Ser Gln Val Thr Leu Lys Glu Ser Gly Pro Gly Ile Leu Gln
            20                  25                  30

Pro Ser Gln Thr Leu Ser Leu Thr Cys Thr Phe Ser Gly Phe Ser Leu
            35                  40                  45

Thr Thr Tyr Gly Met Gly Val Gly Trp Ile Arg Gln Pro Ser Gly Lys
        50                  55                  60

Gly Leu Glu Trp Leu Ala Asn Ile Trp Trp Asp Asp Lys Tyr Tyr
65                  70                  75                  80

Asn Pro Ser Leu Lys Asn Arg Leu Thr Ile Ser Lys Asp Thr Ser Asn
                85                  90                  95

Asn Gln Ala Phe Leu Lys Leu Thr Asn Val His Thr Ser Asp Ser Ala
            100                 105                 110

Thr Tyr Tyr Cys Ala Arg Ile Gly Pro Ile Lys Tyr Pro Thr Ala Pro
            115                 120                 125

Tyr Arg Tyr Phe Asp Phe Trp Gly Pro Gly Thr Met Val Thr Val Ser
    130                 135                 140
```

<210> SEQ ID NO 14
<211> LENGTH: 432
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic polynucleotide"

<400> SEQUENCE: 14

```
atggacaggc ttacttcctc attcctactg ctgattgtcc ctgcatatgt cctgtctcag    60
gttactctga aagagtctgg ccctgggata ttgcagccct cccagaccct cagtctgact   120
tgcactttct ctgggttttc actgaccact tatggtatgg gtgtgggctg gattcgtcag   180
ccttcaggga agggtctgga gtggctggca aacatttggt gggatgatga aagtattac   240 aatccatctc tgaaaaaccg gctcacaatc tccaaggaca cctccaacaa ccaagcattc   300
ctcaagctca ccaatgtaca cacttcagat tctgccacat actactgtgc tcggataggg   360
ccgattaaat acccgacggc ccctaccgg tactttgact tctggggccc aggaaccatg   420
gtcaccgtct cg                                                       432
```

<210> SEQ ID NO 15
<211> LENGTH: 107
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 15

```
Asp Ile Gln Met Thr Gln Ser Pro Ser Ser Leu Ser Ala Ser Val Gly
1               5                   10                  15

Asp Arg Val Thr Ile Thr Cys Leu Ala Ser Glu Asp Ile Tyr Asp Asn
            20                  25                  30

Leu Ala Trp Tyr Gln Gln Lys Pro Gly Lys Ala Pro Lys Leu Leu Ile
        35                  40                  45

Tyr Tyr Ala Ser Ser Leu Gln Asp Gly Val Pro Ser Arg Phe Ser Gly
    50                  55                  60
```

```
Ser Gly Ser Gly Thr Asp Tyr Thr Leu Thr Ile Ser Ser Leu Gln Pro
 65                  70                  75                  80

Glu Asp Phe Ala Thr Tyr Tyr Cys Leu Gln Asp Ser Glu Tyr Pro Trp
                 85                  90                  95

Thr Phe Gly Gly Gly Thr Lys Val Glu Ile Lys
            100                 105

<210> SEQ ID NO 16
<211> LENGTH: 321
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic polynucleotide"

<400> SEQUENCE: 16
gacatacaga tgactcagtc accctcaagc ctgagtgcca gtgtgggaga cagggtgaca       60
atcacctgtc tggcctccga ggatatctac gataacctgg catggtatca gcagaaacct      120
ggaaaggctc ccaagctcct gatttattat gcctcctctc tccaagacgg cgttccatct      180
cggttcagcg gaagcggctc cgggacggat tacacactga caattagctc tctgcaaccg      240
gaggattttg ctacttacta ctgcctgcaa gactccgaat acccatggac cttcggtggt      300
ggcaccaaag tggaaatcaa g                                                321

<210> SEQ ID NO 17
<211> LENGTH: 127
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 17

Met Ser Val Pro Thr Gln Val Leu Gly Leu Leu Leu Leu Trp Leu Thr
 1               5                  10                  15

Asp Ala Arg Cys Asp Ile Gln Met Thr Gln Ser Pro Ser Ser Leu Ser
                 20                  25                  30

Ala Ser Val Gly Asp Arg Val Thr Ile Thr Cys Leu Ala Ser Glu Asp
             35                  40                  45

Ile Tyr Asp Asn Leu Ala Trp Tyr Gln Gln Lys Pro Gly Lys Ala Pro
         50                  55                  60

Lys Leu Leu Ile Tyr Tyr Ala Ser Ser Leu Gln Asp Gly Val Pro Ser
 65                  70                  75                  80

Arg Phe Ser Gly Ser Gly Ser Gly Thr Asp Tyr Thr Leu Thr Ile Ser
                 85                  90                  95

Ser Leu Gln Pro Glu Asp Phe Ala Thr Tyr Tyr Cys Leu Gln Asp Ser
            100                 105                 110

Glu Tyr Pro Trp Thr Phe Gly Gly Gly Thr Lys Val Glu Ile Lys
            115                 120                 125

<210> SEQ ID NO 18
<211> LENGTH: 381
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic polynucleotide"
```

-continued

<400> SEQUENCE: 18

```
atgagcgtgc ctactcaagt cttggggctg ctcttgcttt ggcttaccga cgcaagatgc    60
gacatacaga tgactcagtc accctcaagc ctgagtgcca gtgtgggaga cagggtgaca   120
atcacctgtc tggcctccga ggatatctac gataacctgg catggtatca gcagaaacct   180
ggaaaggctc ccaagctcct gatttattat gcctcctctc tccaagacgg cgttccatct   240
cggttcagcg gaagcggctc cgggacggat tacacactga caattagctc tctgcaaccg   300
gaggattttg ctacttacta ctgcctgcaa gactccgaat acccatggac cttcggtggt   360
ggcaccaaag tggaaatcaa g                                              381
```

<210> SEQ ID NO 19
<211> LENGTH: 214
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 19

```
Asp Ile Gln Met Thr Gln Ser Pro Ser Ser Leu Ser Ala Ser Val Gly
1               5                   10                  15

Asp Arg Val Thr Ile Thr Cys Leu Ala Ser Glu Asp Ile Tyr Asp Asn
            20                  25                  30

Leu Ala Trp Tyr Gln Gln Lys Pro Gly Lys Ala Pro Lys Leu Leu Ile
        35                  40                  45

Tyr Tyr Ala Ser Ser Leu Gln Asp Gly Val Pro Ser Arg Phe Ser Gly
    50                  55                  60

Ser Gly Ser Gly Thr Asp Tyr Thr Leu Thr Ile Ser Ser Leu Gln Pro
65                  70                  75                  80

Glu Asp Phe Ala Thr Tyr Tyr Cys Leu Gln Asp Ser Glu Tyr Pro Trp
                85                  90                  95

Thr Phe Gly Gly Gly Thr Lys Val Glu Ile Lys Arg Thr Val Ala Ala
            100                 105                 110

Pro Ser Val Phe Ile Phe Pro Pro Ser Asp Glu Gln Leu Lys Ser Gly
        115                 120                 125

Thr Ala Ser Val Val Cys Leu Leu Asn Asn Phe Tyr Pro Arg Glu Ala
    130                 135                 140

Lys Val Gln Trp Lys Val Asp Asn Ala Leu Gln Ser Gly Asn Ser Gln
145                 150                 155                 160

Glu Ser Val Thr Glu Gln Asp Ser Lys Asp Ser Thr Tyr Ser Leu Ser
                165                 170                 175

Ser Thr Leu Thr Leu Ser Lys Ala Asp Tyr Glu Lys His Lys Val Tyr
            180                 185                 190

Ala Cys Glu Val Thr His Gln Gly Leu Ser Ser Pro Val Thr Lys Ser
        195                 200                 205

Phe Asn Arg Gly Glu Cys
    210
```

<210> SEQ ID NO 20
<211> LENGTH: 642
<212> TYPE: DNA
<213> ORGANISM: Artificial Sequence
<220> FEATURE:
<221> NAME/KEY: source
<223> OTHER INFORMATION: /note="Description of Artificial Sequence:

Synthetic polynucleotide"

<400> SEQUENCE: 20

```
gacatacaga tgactcagtc accctcaagc ctgagtgcca gtgtgggaga cagggtgaca       60
atcacctgtc tggcctccga ggatatctac gataacctgg catggtatca gcagaaacct      120
ggaaaggctc ccaagctcct gatttattat gcctcctctc tccaagacgg cgttccatct      180
cggttcagcg gaagcggctc cgggacggat tacacactga caattagctc tctgcaaccg      240
gaggattttg ctacttacta ctgcctgcaa gactccgaat acccatggac cttcggtggt      300
ggcaccaaag tggaaatcaa gcgtacggta gcggccccat ctgtcttcat cttcccgcca      360
tctgatgagc agttgaaatc tggaactgcc tctgttgtgt gcctgctgaa taacttctat      420
cccagagagg ccaaagtaca gtggaaggtg gataacgccc tccaatcggg taactcccag      480
gagagtgtca cagagcagga cagcaaggac agcacctaca gcctcagcag cacccctgacg      540
ctgagcaaag cagactacga gaaacacaaa gtctacgcct gcgaagtcac ccatcagggc      600
ctgagctcgc ccgtcacaaa gagcttcaac aggggagagt gt                        642
```

<210> SEQ ID NO 21
<211> LENGTH: 234
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 21

Met Ser Val Pro Thr Gln Val Leu Gly Leu Leu Leu Leu Trp Leu Thr
1               5                   10                  15

Asp Ala Arg Cys Asp Ile Gln Met Thr Gln Ser Pro Ser Ser Leu Ser
            20                  25                  30

Ala Ser Val Gly Asp Arg Val Thr Ile Thr Cys Leu Ala Ser Glu Asp
        35                  40                  45

Ile Tyr Asp Asn Leu Ala Trp Tyr Gln Gln Lys Pro Gly Lys Ala Pro
    50                  55                  60

Lys Leu Leu Ile Tyr Tyr Ala Ser Ser Leu Gln Asp Gly Val Pro Ser
65                  70                  75                  80

Arg Phe Ser Gly Ser Gly Ser Gly Thr Asp Tyr Thr Leu Thr Ile Ser
                85                  90                  95

Ser Leu Gln Pro Glu Asp Phe Ala Thr Tyr Tyr Cys Leu Gln Asp Ser
            100                 105                 110

Glu Tyr Pro Trp Thr Phe Gly Gly Gly Thr Lys Val Glu Ile Lys Arg
        115                 120                 125

Thr Val Ala Ala Pro Ser Val Phe Ile Phe Pro Pro Ser Asp Glu Gln
    130                 135                 140

Leu Lys Ser Gly Thr Ala Ser Val Val Cys Leu Leu Asn Asn Phe Tyr
145                 150                 155                 160

Pro Arg Glu Ala Lys Val Gln Trp Lys Val Asp Asn Ala Leu Gln Ser
                165                 170                 175

Gly Asn Ser Gln Glu Ser Val Thr Glu Gln Asp Ser Lys Asp Ser Thr
            180                 185                 190

Tyr Ser Leu Ser Ser Thr Leu Thr Leu Ser Lys Ala Asp Tyr Glu Lys
        195                 200                 205

His Lys Val Tyr Ala Cys Glu Val Thr His Gln Gly Leu Ser Ser Pro
    210                 215                 220

Val Thr Lys Ser Phe Asn Arg Gly Glu Cys
225                 230

<210> SEQ ID NO 22
<211> LENGTH: 702
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic polynucleotide"

<400> SEQUENCE: 22
atgagcgtgc ctactcaagt cttggggctg ctcttgcttt ggcttaccga cgcaagatgc    60
gacatacaga tgactcagtc accctcaagc ctgagtgcca gtgtgggaga cagggtgaca   120
atcacctgtc tggcctccga ggatatctac gataaccctg gcatggtatca gcagaaacct   180 ggaaaggctc ccaagctcct gatttattat gcctcctctc tccaagacgg cgttccatct   240
cggttcagcg gaagcggctc cgggacggat tacacactga caattagctc tctgcaaccg   300
gaggattttg ctacttacta ctgcctgcaa gactccgaat acccatggac cttcggtggt   360
ggcaccaaag tggaaatcaa gcgtacggta gcggccccca ctgtcttcat cttcccgcca   420
tctgatgagc agttgaaatc tggaactgcc tctgttgtgt gcctgctgaa taacttctat   480
cccagagagg ccaaagtaca gtggaaggtg ataacgccc tccaatcggg taactcccag   540
gagagtgtca cagagcagga cagcaaggac agcacctaca gcctcagcag caccctgacg   600
ctgagcaaag cagactacga gaaacacaaa gtctacgcct gcgaagtcac ccatcagggc   660
ctgagctcgc ccgtcacaaa gagcttcaac aggggagagt gt                      702

<210> SEQ ID NO 23
<211> LENGTH: 125
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 23

Glu Val Thr Leu Lys Glu Ser Gly Pro Ala Leu Val Lys Pro Thr Gln
1               5                   10                  15

Thr Leu Thr Leu Thr Cys Thr Phe Ser Gly Phe Ser Leu Thr Thr Tyr
                20                  25                  30

Gly Met Gly Val Gly Trp Ile Arg Gln Pro Pro Gly Lys Ala Leu Glu
            35                  40                  45

Trp Leu Ala Asn Ile Trp Trp Asp Asp Lys Tyr Tyr Asn Pro Ser
    50                  55                  60

Leu Lys Asn Arg Leu Thr Ile Ser Lys Asp Thr Ser Lys Asn Gln Val
65                  70                  75                  80

Val Leu Thr Met Thr Asn Met Asp Pro Val Asp Thr Ala Thr Tyr Tyr
                85                  90                  95

Cys Ala Arg Ile Gly Pro Ile Lys Tyr Pro Thr Ala Pro Tyr Arg Tyr
            100                 105                 110

Phe Asp Phe Trp Gly Gln Gly Thr Met Val Thr Val Ser
        115                 120                 125

<210> SEQ ID NO 24
<211> LENGTH: 375

<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic polynucleotide"

<400> SEQUENCE: 24

```
gaagtgacac tcaaggagtc tggacccgct ctggtgaaac caacccaaac actcactttg      60
acatgtactt ttagtggctt ctcattgact acctatggaa tgggcgtggg atggatcaga     120
cagccacctg gcaaggctct ggaatggctg ccaacatct ggtgggatga cgacaagtac      180
tataacccgt ccctgaaaaa ccggctgacc attagcaagg atacttctaa aaatcaagtg     240
gtgctgacca tgacaaatat ggatcccgtt gacaccgcaa cctactactg cgcccgcatt     300
ggtcccataa agtaccctac ggcaccttac cgatatttcg acttttgggg ccaagggaca     360
atggttactg tctcg                                                      375
```

<210> SEQ ID NO 25
<211> LENGTH: 144
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 25

```
Met Glu Trp Ser Trp Val Phe Leu Phe Phe Leu Ser Val Thr Thr Gly
1               5                   10                  15

Val His Ser Glu Val Thr Leu Lys Glu Ser Gly Pro Ala Leu Val Lys
            20                  25                  30

Pro Thr Gln Thr Leu Thr Leu Thr Cys Thr Phe Ser Gly Phe Ser Leu
        35                  40                  45

Thr Thr Tyr Gly Met Gly Val Gly Trp Ile Arg Gln Pro Pro Gly Lys
    50                  55                  60

Ala Leu Glu Trp Leu Ala Asn Ile Trp Trp Asp Asp Lys Tyr Tyr
65                  70                  75                  80

Asn Pro Ser Leu Lys Asn Arg Leu Thr Ile Ser Lys Asp Thr Ser Lys
                85                  90                  95

Asn Gln Val Val Leu Thr Met Thr Asn Met Asp Pro Val Asp Thr Ala
            100                 105                 110

Thr Tyr Tyr Cys Ala Arg Ile Gly Pro Ile Lys Tyr Pro Thr Ala Pro
        115                 120                 125

Tyr Arg Tyr Phe Asp Phe Trp Gly Gln Gly Thr Met Val Thr Val Ser
    130                 135                 140
```

<210> SEQ ID NO 26
<211> LENGTH: 432
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic polynucleotide"

<400> SEQUENCE: 26

```
atggagtggt cctgggtgtt tctgttcttc ctgagtgtga ccaccggggt ccactccgaa      60
gtgacactca aggagtctgg acccgctctg gtgaaaccaa cccaaacact cactttgaca     120
tgtactttta gtggcttctc attgactacc tatggaatgg cgtgggatg gatcagacag      180
```

```
ccacctggca aggctctgga atggctggcc aacatctggt gggatgacga caagtactat    240
aacccgtccc tgaaaaaccg gctgaccatt agcaaggata cttctaaaaa tcaagtggtg    300
ctgaccatga caaatatgga tcccgttgac accgcaacct actactgcgc cgcattggt     360 cccataaagt accctacggc accttaccga tatttcgact tttggggcca agggacaatg    420
gttactgtct cg                                                        432
```

<210> SEQ ID NO 27
<211> LENGTH: 453
<212> TYPE: PRT
<213> ORGANISM: Artificial Sequence
<220> FEATURE:
<221> NAME/KEY: source
<223> OTHER INFORMATION: /note="Description of Artificial Sequence: Synthetic polypeptide"

<400> SEQUENCE: 27

```
Glu Val Thr Leu Lys Glu Ser Gly Pro Ala Leu Val Lys Pro Thr Gln
1               5                   10                  15

Thr Leu Thr Leu Thr Cys Thr Phe Ser Gly Phe Ser Leu Thr Thr Tyr
            20                  25                  30

Gly Met Gly Val Gly Trp Ile Arg Gln Pro Pro Gly Lys Ala Leu Glu
        35                  40                  45

Trp Leu Ala Asn Ile Trp Trp Asp Asp Lys Tyr Tyr Asn Pro Ser
    50                  55                  60

Leu Lys Asn Arg Leu Thr Ile Ser Lys Asp Thr Ser Lys Asn Gln Val
65                  70                  75                  80

Val Leu Thr Met Thr Asn Met Asp Pro Val Asp Thr Ala Thr Tyr Tyr
                85                  90                  95

Cys Ala Arg Ile Gly Pro Ile Lys Tyr Pro Thr Ala Pro Tyr Arg Tyr
            100                 105                 110

Phe Asp Phe Trp Gly Gln Gly Thr Met Val Thr Val Ser Ser Ala Ser
        115                 120                 125

Thr Lys Gly Pro Ser Val Phe Pro Leu Ala Pro Cys Ser Arg Ser Thr
    130                 135                 140

Ser Glu Ser Thr Ala Ala Leu Gly Cys Leu Val Lys Asp Tyr Phe Pro
145                 150                 155                 160

Glu Pro Val Thr Val Ser Trp Asn Ser Gly Ala Leu Thr Ser Gly Val
                165                 170                 175

His Thr Phe Pro Ala Val Leu Gln Ser Ser Gly Leu Tyr Ser Leu Ser
            180                 185                 190

Ser Val Val Thr Val Pro Ser Ser Ser Leu Gly Thr Lys Thr Tyr Thr
        195                 200                 205

Cys Asn Val Asp His Lys Pro Ser Asn Thr Lys Val Asp Lys Arg Val
    210                 215                 220

Glu Ser Lys Tyr Gly Pro Pro Cys Pro Pro Cys Pro Ala Pro Glu Phe
225                 230                 235                 240

Leu Gly Gly Pro Ser Val Phe Leu Phe Pro Pro Lys Pro Lys Asp Thr
                245                 250                 255

Leu Met Ile Ser Arg Thr Pro Glu Val Thr Cys Val Val Val Asp Val
            260                 265                 270

Ser Gln Glu Asp Pro Glu Val Gln Phe Asn Trp Tyr Val Asp Gly Val
        275                 280                 285

Glu Val His Asn Ala Lys Thr Lys Pro Arg Glu Glu Gln Phe Asn Ser
    290                 295                 300
```

| | | | | | | | | | | | | |
|---|---|---|---|---|---|---|---|---|---|---|---|---|
| Thr | Tyr | Arg | Val | Val | Ser | Val | Leu | Thr | Val | Leu | His | Gln | Asp | Trp | Leu |
| 305 | | | | | 310 | | | | | 315 | | | | | 320 |

| Asn | Gly | Lys | Glu | Tyr | Lys | Cys | Lys | Val | Ser | Asn | Lys | Gly | Leu | Pro | Ser |
| | | | | 325 | | | | | 330 | | | | | 335 | |

| Ser | Ile | Glu | Lys | Thr | Ile | Ser | Lys | Ala | Lys | Gly | Gln | Pro | Arg | Glu | Pro |
| | | | 340 | | | | | 345 | | | | | 350 | | |

| Gln | Val | Tyr | Thr | Leu | Pro | Pro | Ser | Gln | Glu | Glu | Met | Thr | Lys | Asn | Gln |
| | | | 355 | | | | | 360 | | | | | 365 | | |

| Val | Ser | Leu | Thr | Cys | Leu | Val | Lys | Gly | Phe | Tyr | Pro | Ser | Asp | Ile | Ala |
| | 370 | | | | | 375 | | | | | 380 | | | | |

| Val | Glu | Trp | Glu | Ser | Asn | Gly | Gln | Pro | Glu | Asn | Asn | Tyr | Lys | Thr | Thr |
| 385 | | | | | 390 | | | | | 395 | | | | | 400 |

| Pro | Pro | Val | Leu | Asp | Ser | Asp | Gly | Ser | Phe | Phe | Leu | Tyr | Ser | Arg | Leu |
| | | | | 405 | | | | | 410 | | | | | 415 | |

| Thr | Val | Asp | Lys | Ser | Arg | Trp | Gln | Glu | Gly | Asn | Val | Phe | Ser | Cys | Ser |
| | | | 420 | | | | | 425 | | | | | 430 | | |

| Val | Met | His | Glu | Ala | Leu | His | Asn | His | Tyr | Thr | Gln | Lys | Ser | Leu | Ser |
| | | | 435 | | | | | 440 | | | | | 445 | | |

| Leu | Ser | Leu | Gly | Lys |
| | 450 | | | |

<210> SEQ ID NO 28
<211> LENGTH: 1966
<212> TYPE: DNA
<213> ORGANISM: Artificial Sequence
<220> FEATURE:
<221> NAME/KEY: source
<223> OTHER INFORMATION: /note="Description of Artificial Sequence: Synthetic polynucleotide"

<400> SEQUENCE: 28

```
gaagtgacac tcaaggagtc tggacccgct ctggtgaaac caacccaaac actcactttg      60
acatgtactt ttagtggctt ctcattgact acctatggaa tgggcgtggg atggatcaga     120
cagccacctg gcaaggctct ggaatggctg ccaacatct ggtgggatga cgacaagtac     180
tataacccgt ccctgaaaaa ccggctgacc attagcaagg atacttctaa aaatcaagtg     240
gtgctgacca tgacaaatat ggatcccgtt gacaccgcaa cctactactg cgcccgcatt     300
ggtcccataa agtaccctac ggcaccttac cgatatttcg acttttgggg ccaagggaca     360
atggttactg tctcgagcgc ttctacaaag ggcccatccg tcttcccct ggcgccctgc     420
tccaggagca cctccgagag cacagccgcc ctgggctgcc tggtcaagga ctacttcccc     480
gaaccggtga cggtgtcgtg gaactcaggc gccctgacca gcggcgtgca caccttcccg     540
gctgtcctac agtcctcagg actctactcc ctcagcagcg tggtgaccgt gccctccagc     600
agcttgggca cgaagaccta cacctgcaac gtagatcaca agcccagcaa caccaaggtg     660
gacaagagag ttggtgagag gccagcacag ggagggaggg tgtctgctgg aagccaggct     720
cagccctcct gcctggacgc accccggctg tgcagcccca gcccagggca gcaaggcatg     780
ccccatctgt ctcctcaccc ggaggcctct gaccacccca tcatgccca gggagagggt     840
cttctggatt tttccaccag gctccgggca gccacaggct ggatgcccct accccaggcc     900
ctgcgcatac aggggcaggt gctgcgctca gacctgccaa gagccatatc cgggaggacc     960
ctgccctga cctaagccca ccccaaaggc caaactctcc actccctcag ctcagacacc    1020
ttctctcctc ccagatctga gtaactccca atcttctctc tgcagagtcc aaatatggtc    1080
```

-continued

```
cccatgccc accatgccca ggtaagccaa cccaggcctc gccctccagc tcaaggcggg    1140
acaggtgccc tagagtagcc tgcatccagg gacaggcccc agccgggtgc tgacgcatcc    1200
acctccatct cttcctcagc acctgagttc ctgggggggac catcagtctt cctgttcccc   1260
ccaaaaccca aggacactct catgatctcc cggacccctg aggtcacgtg cgtggtggtg    1320
gacgtgagcc aggaagaccc cgaggtccag ttcaactggt acgtggatgg cgtggaggtg    1380
cataatgcca agacaaagcc gcgggaggag cagttcaaca gcacgtaccg tgtggtcagc    1440
gtcctcaccg tcctgcacca ggactggctg aacggcaagg agtacaagtg caaggtctcc    1500
aacaaaggcc tcccgtcctc catcgagaaa accatctcca aagccaaagg tgggacccac    1560
ggggtgcgag ggccacatgg acagaggtca gctcggccca ccctctgccc tgggagtgac    1620
cgctgtgcca acctctgtcc ctacagggca gccccgagag ccacaggtgt acaccctgcc    1680
cccatcccag gaggagatga ccaagaacca ggtcagcctg acctgcctgg tcaaaggctt    1740
ctaccccagc gacatcgccg tggagtggga gagcaatggg cagccggaga acaactacaa    1800
gaccacgcct cccgtgctgg actccgacgg ctccttcttc ctctacagca ggctaaccgt    1860
ggacaagagc aggtggcagg agggggaatgt cttctcatgc tccgtgatgc atgaggctct    1920
gcacaaccac tacacacaga agagcctctc cctgtctctg ggtaaa               1966
```

<210> SEQ ID NO 29
<211> LENGTH: 472
<212> TYPE: PRT
<213> ORGANISM: Artificial Sequence
<220> FEATURE:
<221> NAME/KEY: source
<223> OTHER INFORMATION: /note="Description of Artificial Sequence: Synthetic polypeptide"

<400> SEQUENCE: 29

```
Met Glu Trp Ser Trp Val Phe Leu Phe Phe Leu Ser Val Thr Thr Gly
1               5                   10                  15

Val His Ser Glu Val Thr Leu Lys Glu Ser Gly Pro Ala Leu Val Lys
            20                  25                  30

Pro Thr Gln Thr Leu Thr Leu Thr Cys Thr Phe Ser Gly Phe Ser Leu
        35                  40                  45

Thr Thr Tyr Gly Met Gly Val Gly Trp Ile Arg Gln Pro Pro Gly Lys
    50                  55                  60

Ala Leu Glu Trp Leu Ala Asn Ile Trp Trp Asp Asp Lys Tyr Tyr
65                  70                  75                  80

Asn Pro Ser Leu Lys Asn Arg Leu Thr Ile Ser Lys Asp Thr Ser Lys
                85                  90                  95

Asn Gln Val Val Leu Thr Met Thr Asn Met Asp Pro Val Asp Thr Ala
            100                 105                 110

Thr Tyr Tyr Cys Ala Arg Ile Gly Pro Ile Lys Tyr Pro Thr Ala Pro
        115                 120                 125

Tyr Arg Tyr Phe Asp Phe Trp Gly Gln Gly Thr Met Val Thr Val Ser
    130                 135                 140

Ser Ala Ser Thr Lys Gly Pro Ser Val Phe Pro Leu Ala Pro Cys Ser
145                 150                 155                 160

Arg Ser Thr Ser Glu Ser Thr Ala Ala Leu Gly Cys Leu Val Lys Asp
                165                 170                 175

Tyr Phe Pro Glu Pro Val Thr Val Ser Trp Asn Ser Gly Ala Leu Thr
            180                 185                 190

Ser Gly Val His Thr Phe Pro Ala Val Leu Gln Ser Ser Gly Leu Tyr
```

```
            195                 200                 205
Ser Leu Ser Ser Val Val Thr Val Pro Ser Ser Leu Gly Thr Lys
        210                 215                 220

Thr Tyr Thr Cys Asn Val Asp His Lys Pro Ser Asn Thr Lys Val Asp
225                 230                 235                 240

Lys Arg Val Glu Ser Lys Tyr Gly Pro Pro Cys Pro Pro Cys Pro Ala
                245                 250                 255

Pro Glu Phe Leu Gly Gly Pro Ser Val Phe Leu Phe Pro Pro Lys Pro
            260                 265                 270

Lys Asp Thr Leu Met Ile Ser Arg Thr Pro Glu Val Thr Cys Val Val
        275                 280                 285

Val Asp Val Ser Gln Glu Asp Pro Glu Val Gln Phe Asn Trp Tyr Val
290                 295                 300

Asp Gly Val Glu Val His Asn Ala Lys Thr Lys Pro Arg Glu Glu Gln
305                 310                 315                 320

Phe Asn Ser Thr Tyr Arg Val Val Ser Val Leu Thr Val Leu His Gln
                325                 330                 335

Asp Trp Leu Asn Gly Lys Glu Tyr Lys Cys Lys Val Ser Asn Lys Gly
            340                 345                 350

Leu Pro Ser Ser Ile Glu Lys Thr Ile Ser Lys Ala Lys Gly Gln Pro
        355                 360                 365

Arg Glu Pro Gln Val Tyr Thr Leu Pro Pro Ser Gln Glu Glu Met Thr
370                 375                 380

Lys Asn Gln Val Ser Leu Thr Cys Leu Val Lys Gly Phe Tyr Pro Ser
385                 390                 395                 400

Asp Ile Ala Val Glu Trp Glu Ser Asn Gly Gln Pro Glu Asn Asn Tyr
                405                 410                 415

Lys Thr Thr Pro Pro Val Leu Asp Ser Asp Gly Ser Phe Phe Leu Tyr
            420                 425                 430

Ser Arg Leu Thr Val Asp Lys Ser Arg Trp Gln Glu Gly Asn Val Phe
        435                 440                 445

Ser Cys Ser Val Met His Glu Ala Leu His Asn His Tyr Thr Gln Lys
450                 455                 460

Ser Leu Ser Leu Ser Leu Gly Lys
465                 470

<210> SEQ ID NO 30
<211> LENGTH: 2023
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic polynucleotide"

<400> SEQUENCE: 30
atggagtggt cctgggtgtt tctgttcttc ctgagtgtga ccaccggggt ccactccgaa    60
gtgacactca aggagtctgg acccgctctg gtgaaaccaa cccaaacact cactttgaca   120 tgtacttta gtggcttctc attgactacc tatggaatgg gcgtgggatg gatcagacag   180
ccacctggca aggctctgga atggctggcc aacatctggt gggatgacga caagtactat   240
aacccgtccc tgaaaaaccg gctgaccatt agcaaggata cttctaaaaa tcaagtggtg   300
ctgaccatga caaatatgga tcccgttgac accgcaacct actactgcgc ccgcattggt   360
cccataaagt accctacggc accttaccga tatttcgact ttggggccca agggacaatg   420
```

-continued

```
gttactgtct cgagcgcttc tacaaagggc ccatccgtct tcccctggc gccctgctcc      480
aggagcacct ccgagagcac agccgccctg ggctgcctgg tcaaggacta cttccccgaa      540
ccggtgacgg tgtcgtggaa ctcaggcgcc ctgaccagcg gcgtgcacac cttcccggct      600
gtcctacagt cctcaggact ctactccctc agcagcgtgg tgaccgtgcc ctccagcagc      660
ttgggcacga agacctacac ctgcaacgta gatcacaagc ccagcaacac caaggtggac      720
aagagagttg gtgagaggcc agcacaggga gggagggtgt ctgctggaag ccaggctcag      780
ccctcctgcc tggacgcacc ccggctgtgc agccccagcc cagggcagca aggcatgccc      840
catctgtctc ctcacccgga ggcctctgac caccccactc atgcccaggg agagggtctt      900
ctggattttt ccaccaggct ccgggcagcc acaggctgga tgcccctacc ccaggccctg      960
cgcatacagg ggcaggtgct cgcctcagac ctgccaagag ccatatccgg gaggaccctg     1020
cccctgacct aagcccaccc caaaggccaa actctccact ccctcagctc agacaccttc     1080
tctcctccca gatctgagta actcccaatc ttctctctgc agagtccaaa tatggtcccc     1140
catgcccacc atgcccaggt aagccaaccc aggcctcgcc ctccagctca aggcgggaca     1200
ggtgccctag agtagcctgc atccaggac aggcccagc cgggtgctga cgcatccacc      1260
tccatctctt cctcagcacc tgagttcctg ggggaccat cagtcttcct gttccccca       1320
aaacccaagg acactctcat gatctcccgg acccctgagg tcacgtgcgt ggtggtggac     1380
gtgagccagg aagaccccga ggtccagttc aactggtacg tggatggcgt ggaggtgcat     1440
aatgccaaga caaagccgcg ggaggagcag ttcaacagca cgtaccgtgt ggtcagcgtc     1500
ctcaccgtcc tgcaccagga ctggctgaac ggcaaggagt acaagtgcaa ggtctccaac     1560
aaaggcctcc cgtcctccat cgagaaaacc atctccaaag ccaaaggtgg acccacgggg     1620
gtgcgagggc cacatggaca gaggtcagct cggcccaccc tctgccctgg gagtgaccgc     1680
tgtgccaacc tctgtcccta cagggcagcc ccgagagcca caggtgtaca ccctgccccc     1740
atcccaggag gagatgacca agaaccaggt cagcctgacc tgcctggtca aaggcttcta     1800
ccccagcgac atcgccgtgg agtgggagag caatgggcag ccggagaaca actacaagac     1860
cacgcctccc gtgctggact ccgacggctc cttcttcctc tacagcaggc taaccgtgga     1920
caagagcagg tggcaggagg ggaatgtctt ctcatgctcc gtgatgcatg aggctctgca     1980
caaccactac acacagaaga gcctctcccct gtctctgggt aaa                      2023
```

<210> SEQ ID NO 31
<211> LENGTH: 107
<212> TYPE: PRT
<213> ORGANISM: Artificial Sequence
<220> FEATURE:
<221> NAME/KEY: source
<223> OTHER INFORMATION: /note="Description of Artificial Sequence: Synthetic polypeptide"

<400> SEQUENCE: 31

```
Asp Ile Gln Met Thr Gln Ser Pro Ser Ser Leu Ser Ala Ser Val Gly
1               5                   10                  15

Asp Arg Val Thr Ile Thr Cys Arg Ala Ser Gln Ser Ile Ser Ser Tyr
            20                  25                  30

Leu Asn Trp Tyr Gln Gln Lys Pro Gly Lys Ala Pro Lys Leu Leu Ile
        35                  40                  45

Tyr Ala Ala Ser Ser Leu Gln Ser Gly Val Pro Ser Arg Phe Ser Gly
    50                  55                  60

Ser Gly Ser Gly Thr Asp Phe Thr Leu Thr Ile Ser Ser Leu Gln Pro
```

```
                65                  70                  75                  80
Glu Asp Phe Ala Thr Tyr Tyr Cys Gln Gln Ser Tyr Ser Thr Pro Leu
                    85                  90                  95

Thr Phe Gly Gly Gly Thr Lys Val Glu Ile Lys
            100                 105
```

<210> SEQ ID NO 32
<211> LENGTH: 321
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic polynucleotide"

<400> SEQUENCE: 32

```
gacatccaga tgacccagtc tccatcctcc ctgtctgcat ctgtaggaga cagagtcacc    60
atcacttgcc gggcaagtca gagcattagc agctatttaa attggtatca gcagaaacca   120
gggaaagccc ctaagctcct gatctatgct gcatccagtt tgcaaagtgg ggtcccatca   180
aggttcagtg gcagtggatc tgggacagat ttcactctca ccatcagcag tctgcaacct   240
gaagattttg caacttacta ctgtcaacag agttacagta cccctctcac tttcggcgga   300
gggaccaagg tggagatcaa a                                             321
```

<210> SEQ ID NO 33
<211> LENGTH: 114
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 33

```
Gln Val Thr Leu Lys Glu Ser Gly Pro Ala Leu Val Lys Pro Thr Gln
1               5                   10                  15

Thr Leu Thr Leu Thr Cys Thr Phe Ser Gly Phe Ser Leu Ser Thr Ser
            20                  25                  30

Gly Met Arg Val Ser Trp Ile Arg Gln Pro Pro Gly Lys Ala Leu Glu
        35                  40                  45

Trp Leu Ala Arg Ile Asp Trp Asp Asp Lys Phe Tyr Ser Thr Ser
    50                  55                  60

Leu Lys Thr Arg Leu Thr Ile Ser Lys Asp Thr Ser Lys Asn Gln Val
65                  70                  75                  80

Val Leu Thr Met Thr Asn Met Asp Pro Val Asp Thr Ala Thr Tyr Tyr
                85                  90                  95

Cys Ala Arg Ile Ala Phe Asp Ile Trp Gly Gln Gly Thr Met Val Thr
            100                 105                 110

Val Ser
```

<210> SEQ ID NO 34
<211> LENGTH: 342
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic polynucleotide"

<400> SEQUENCE: 34
caggtcacct tgaaggagtc tggtcctgcg ctggtgaaac ccacacagac cctcacactg 60
acctgcacct tctctgggtt ctcactcagc actagtggaa tgcgtgtgag ctggatccgt 120
cagcccccag ggaaggccct ggagtggctt gcacgcattg attgggatga tgataaattc 180
tacagcacat ctctgaagac caggctcacc atctccaagg acacctccaa aaaccaggtg 240
gtccttacaa tgaccaacat ggaccctgtg acacagcca cgtattactg tgcacggata 300
gcttttgata tctggggcca agggacaatg gtcaccgtct ct 342

```
<210> SEQ ID NO 35
<211> LENGTH: 972
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"
```

<400> SEQUENCE: 35

Met Gly Pro Gly Val Leu Leu Leu Leu Val Ala Thr Ala Trp His
1               5                   10                  15

Gly Gln Gly Ile Pro Val Ile Glu Pro Ser Val Pro Glu Leu Val Val
            20                  25                  30

Lys Pro Gly Ala Thr Val Thr Leu Arg Cys Val Gly Asn Gly Ser Val
        35                  40                  45

Glu Trp Asp Gly Pro Pro Ser Pro His Trp Thr Leu Tyr Ser Asp Gly
    50                  55                  60

Ser Ser Ser Ile Leu Ser Thr Asn Asn Ala Thr Phe Gln Asn Thr Gly
65                  70                  75                  80

Thr Tyr Arg Cys Thr Glu Pro Gly Asp Pro Leu Gly Gly Ser Ala Ala
                85                  90                  95

Ile His Leu Tyr Val Lys Asp Pro Ala Arg Pro Trp Asn Val Leu Ala
            100                 105                 110

Gln Glu Val Val Val Phe Glu Asp Gln Asp Ala Leu Leu Pro Cys Leu
        115                 120                 125

Leu Thr Asp Pro Val Leu Glu Ala Gly Val Ser Leu Val Arg Val Arg
    130                 135                 140

Gly Arg Pro Leu Met Arg His Thr Asn Tyr Ser Phe Ser Pro Trp His
145                 150                 155                 160

Gly Phe Thr Ile His Arg Ala Lys Phe Ile Gln Ser Gln Asp Tyr Gln
                165                 170                 175

Cys Ser Ala Leu Met Gly Gly Arg Lys Val Met Ser Ile Ser Ile Arg
            180                 185                 190

Leu Lys Val Gln Lys Val Ile Pro Gly Pro Pro Ala Leu Thr Leu Val
        195                 200                 205

Pro Ala Glu Leu Val Arg Ile Arg Gly Glu Ala Ala Gln Ile Val Cys
    210                 215                 220

Ser Ala Ser Ser Val Asp Val Asn Phe Asp Val Phe Leu Gln His Asn
225                 230                 235                 240

Asn Thr Lys Leu Ala Ile Pro Gln Gln Ser Asp Phe His Asn Asn Arg
                245                 250                 255

Tyr Gln Lys Val Leu Thr Leu Asn Leu Asp Gln Val Asp Phe Gln His
            260                 265                 270

Ala Gly Asn Tyr Ser Cys Val Ala Ser Asn Val Gln Gly Lys His Ser
        275                 280                 285

Thr Ser Met Phe Phe Arg Val Val Glu Ser Ala Tyr Leu Asn Leu Ser

```
            290                 295                 300
Ser Glu Gln Asn Leu Ile Gln Glu Val Thr Val Gly Glu Gly Leu Asn
305                 310                 315                 320

Leu Lys Val Met Val Glu Ala Tyr Pro Gly Leu Gln Gly Phe Asn Trp
                325                 330                 335

Thr Tyr Leu Gly Pro Phe Ser Asp His Gln Pro Glu Pro Lys Leu Ala
                340                 345                 350

Asn Ala Thr Thr Lys Asp Thr Tyr Arg His Thr Phe Thr Leu Ser Leu
            355                 360                 365

Pro Arg Leu Lys Pro Ser Glu Ala Gly Arg Tyr Ser Phe Leu Ala Arg
        370                 375                 380

Asn Pro Gly Gly Trp Arg Ala Leu Thr Phe Glu Leu Thr Leu Arg Tyr
385                 390                 395                 400

Pro Pro Glu Val Ser Val Ile Trp Thr Phe Ile Asn Gly Ser Gly Thr
                405                 410                 415

Leu Leu Cys Ala Ala Ser Gly Tyr Pro Gln Pro Asn Val Thr Trp Leu
            420                 425                 430

Gln Cys Ser Gly His Thr Asp Arg Cys Asp Glu Ala Gln Val Leu Gln
        435                 440                 445

Val Trp Asp Asp Pro Tyr Pro Glu Val Leu Ser Gln Glu Pro Phe His
    450                 455                 460

Lys Val Thr Val Gln Ser Leu Leu Thr Val Glu Thr Leu Glu His Asn
465                 470                 475                 480

Gln Thr Tyr Glu Cys Arg Ala His Asn Ser Val Gly Ser Gly Ser Trp
                485                 490                 495

Ala Phe Ile Pro Ile Ser Ala Gly Ala His Thr His Pro Pro Asp Glu
            500                 505                 510

Phe Leu Phe Thr Pro Val Val Ala Cys Met Ser Ile Met Ala Leu
        515                 520                 525

Leu Leu Leu Leu Leu Leu Leu Leu Tyr Lys Tyr Lys Gln Lys Pro
    530                 535                 540

Lys Tyr Gln Val Arg Trp Lys Ile Ile Glu Ser Tyr Glu Gly Asn Ser
545                 550                 555                 560

Tyr Thr Phe Ile Asp Pro Thr Gln Leu Pro Tyr Asn Glu Lys Trp Glu
                565                 570                 575

Phe Pro Arg Asn Asn Leu Gln Phe Gly Lys Thr Leu Gly Ala Gly Ala
            580                 585                 590

Phe Gly Lys Val Val Glu Ala Thr Ala Phe Gly Leu Gly Lys Glu Asp
        595                 600                 605

Ala Val Leu Lys Val Ala Val Lys Met Leu Lys Ser Thr Ala His Ala
    610                 615                 620

Asp Glu Lys Glu Ala Leu Met Ser Glu Leu Lys Ile Met Ser His Leu
625                 630                 635                 640

Gly Gln His Glu Asn Ile Val Asn Leu Leu Gly Ala Cys Thr His Gly
                645                 650                 655

Gly Pro Val Leu Val Ile Thr Glu Tyr Cys Cys Tyr Gly Asp Leu Leu
            660                 665                 670

Asn Phe Leu Arg Arg Lys Ala Glu Ala Met Leu Gly Pro Ser Leu Ser
        675                 680                 685

Pro Gly Gln Asp Pro Glu Gly Gly Val Asp Tyr Lys Asn Ile His Leu
    690                 695                 700

Glu Lys Lys Tyr Val Arg Arg Asp Ser Gly Phe Ser Ser Gln Gly Val
705                 710                 715                 720
```

```
Asp Thr Tyr Val Glu Met Arg Pro Val Ser Thr Ser Ser Asn Asp Ser
                725                 730                 735

Phe Ser Glu Gln Asp Leu Asp Lys Glu Asp Gly Arg Pro Leu Glu Leu
            740                 745                 750

Arg Asp Leu Leu His Phe Ser Ser Gln Val Ala Gln Gly Met Ala Phe
        755                 760                 765

Leu Ala Ser Lys Asn Cys Ile His Arg Asp Val Ala Ala Arg Asn Val
    770                 775                 780

Leu Leu Thr Asn Gly His Val Ala Lys Ile Gly Asp Phe Gly Leu Ala
785                 790                 795                 800

Arg Asp Ile Met Asn Asp Ser Asn Tyr Ile Val Lys Gly Asn Ala Arg
                805                 810                 815

Leu Pro Val Lys Trp Met Ala Pro Glu Ser Ile Phe Asp Cys Val Tyr
            820                 825                 830

Thr Val Gln Ser Asp Val Trp Ser Tyr Gly Ile Leu Leu Trp Glu Ile
        835                 840                 845

Phe Ser Leu Gly Leu Asn Pro Tyr Pro Gly Ile Leu Val Asn Ser Lys
    850                 855                 860

Phe Tyr Lys Leu Val Lys Asp Gly Tyr Gln Met Ala Gln Pro Ala Phe
865                 870                 875                 880

Ala Pro Lys Asn Ile Tyr Ser Ile Met Gln Ala Cys Trp Ala Leu Glu
                885                 890                 895

Pro Thr His Arg Pro Thr Phe Gln Gln Ile Cys Ser Phe Leu Gln Glu
            900                 905                 910

Gln Ala Gln Glu Asp Arg Arg Glu Arg Asp Tyr Thr Asn Leu Pro Ser
        915                 920                 925

Ser Ser Arg Ser Gly Gly Ser Gly Ser Ser Ser Glu Leu Glu Glu
    930                 935                 940

Glu Ser Ser Glu His Leu Thr Cys Cys Glu Gln Gly Asp Ile Ala
945                 950                 955                 960

Gln Pro Leu Leu Gln Pro Asn Asn Tyr Gln Phe Cys
                965                 970

<210> SEQ ID NO 36
<211> LENGTH: 49
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 36

Met Arg His Thr Asn Tyr Ser Phe Ser Pro Trp His Gly Phe Thr Ile
1               5                   10                  15

His Arg Ala Lys Phe Ile Gln Ser Gln Asp Tyr Gln Cys Ser Ala Leu
            20                  25                  30

Met Gly Gly Arg Lys Val Met Ser Ile Ser Ile Arg Leu Lys Val Gln
        35                  40                  45

Lys

<210> SEQ ID NO 37
<211> LENGTH: 493
<212> TYPE: PRT
<213> ORGANISM: Artificial Sequence
<220> FEATURE:
<221> NAME/KEY: source
```

<223> OTHER INFORMATION: /note="Description of Artificial Sequence: Synthetic polypeptide"

<400> SEQUENCE: 37

```
Ile Pro Val Ile Glu Pro Ser Val Pro Glu Leu Val Val Lys Pro Gly
1               5                   10                  15
Ala Thr Val Thr Leu Arg Cys Val Gly Asn Gly Ser Val Glu Trp Asp
                20                  25                  30
Gly Pro Pro Ser Pro His Trp Thr Leu Tyr Ser Asp Gly Ser Ser Ser
            35                  40                  45
Ile Leu Ser Thr Asn Asn Ala Thr Phe Gln Asn Thr Gly Thr Tyr Arg
50                  55                  60
Cys Thr Glu Pro Gly Asp Pro Leu Gly Gly Ser Ala Ala Ile His Leu
65                  70                  75                  80
Tyr Val Lys Asp Pro Ala Arg Pro Trp Asn Val Leu Ala Gln Glu Val
                85                  90                  95
Val Val Phe Glu Asp Gln Asp Ala Leu Leu Pro Cys Leu Leu Thr Asp
            100                 105                 110
Pro Val Leu Glu Ala Gly Val Ser Leu Val Arg Val Arg Gly Arg Pro
        115                 120                 125
Leu Met Arg His Thr Asn Tyr Ser Phe Ser Pro Trp His Gly Phe Thr
130                 135                 140
Ile His Arg Ala Lys Phe Ile Gln Ser Gln Asp Tyr Gln Cys Ser Ala
145                 150                 155                 160
Leu Met Gly Gly Arg Lys Val Met Ser Ile Ser Ile Arg Leu Lys Val
                165                 170                 175
Gln Lys Val Ile Pro Gly Pro Pro Ala Leu Thr Leu Val Pro Ala Glu
            180                 185                 190
Leu Val Arg Ile Arg Gly Glu Ala Ala Gln Ile Val Cys Ser Ala Ser
        195                 200                 205
Ser Val Asp Val Asn Phe Asp Val Phe Leu Gln His Asn Asn Thr Lys
210                 215                 220
Leu Ala Ile His Gln Gln Ser Asp Phe His Asn Asn Arg Tyr Gln Lys
225                 230                 235                 240
Val Leu Thr Leu Asn Leu Asp Gln Val Asp Phe Gln His Ala Gly Asn
                245                 250                 255
Tyr Ser Cys Val Ala Ser Asn Val Gln Gly Lys His Ser Thr Ser Met
            260                 265                 270
Phe Phe Arg Val Val Glu Ser Ala Tyr Leu Asn Leu Ser Ser Glu Gln
        275                 280                 285
Asn Leu Ile Gln Glu Val Thr Val Gly Glu Gly Leu Asn Leu Lys Val
290                 295                 300
Met Val Glu Ala Tyr Pro Gly Leu Gln Gly Phe Asn Trp Thr Tyr Leu
305                 310                 315                 320
Gly Pro Phe Ser Asp His Gln Pro Glu Pro Lys Leu Ala Asn Ala Thr
                325                 330                 335
Thr Lys Asp Thr Tyr Arg His Thr Phe Thr Leu Ser Leu Pro Arg Leu
            340                 345                 350
Lys Pro Ser Glu Ala Gly Arg Tyr Ser Phe Leu Ala Arg Asn Pro Gly
        355                 360                 365
Gly Trp Arg Ala Leu Thr Phe Glu Leu Thr Leu Arg Tyr Pro Pro Glu
370                 375                 380
Val Ser Val Ile Trp Thr Phe Ile Asn Gly Ser Gly Thr Leu Leu Cys
385                 390                 395                 400
```

```
Ala Ala Ser Gly Tyr Pro Gln Pro Asn Val Thr Trp Leu Gln Cys Ser
            405                 410                 415

Gly His Thr Asp Arg Cys Asp Glu Ala Gln Val Leu Gln Val Trp Asp
            420                 425                 430

Asp Pro Tyr Pro Glu Val Leu Ser Gln Glu Pro Phe His Lys Val Thr
            435                 440                 445

Val Gln Ser Leu Leu Thr Val Glu Thr Leu Glu His Asn Gln Thr Tyr
450                 455                 460

Glu Cys Arg Ala His Asn Ser Val Gly Ser Gly Ser Trp Ala Phe Ile
465                 470                 475                 480

Pro Ile Ser Ala Gly Ala His Thr His Pro Pro Asp Glu
                485                 490

<210> SEQ ID NO 38
<211> LENGTH: 512
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 38

Met Gly Pro Gly Val Leu Leu Leu Leu Val Ala Thr Ala Trp His
1               5                   10                  15

Gly Gln Gly Ile Pro Val Ile Glu Pro Ser Val Pro Glu Leu Val Val
            20                  25                  30

Lys Pro Gly Ala Thr Val Thr Leu Arg Cys Val Gly Asn Gly Ser Val
            35                  40                  45

Glu Trp Asp Gly Pro Pro Ser Pro His Trp Thr Leu Tyr Ser Asp Gly
50                  55                  60

Ser Ser Ser Ile Leu Ser Thr Asn Asn Ala Thr Phe Gln Asn Thr Gly
65                  70                  75                  80

Thr Tyr Arg Cys Thr Glu Pro Gly Asp Pro Leu Gly Gly Ser Ala Ala
                85                  90                  95

Ile His Leu Tyr Val Lys Asp Pro Ala Arg Pro Trp Asn Val Leu Ala
            100                 105                 110

Gln Glu Val Val Val Phe Glu Asp Gln Asp Ala Leu Leu Pro Cys Leu
            115                 120                 125

Leu Thr Asp Pro Val Leu Glu Ala Gly Val Ser Leu Val Arg Val Arg
130                 135                 140

Gly Arg Pro Leu Met Arg His Thr Asn Tyr Ser Phe Ser Pro Trp His
145                 150                 155                 160

Gly Phe Thr Ile His Arg Ala Lys Phe Ile Gln Ser Gln Asp Tyr Gln
                165                 170                 175

Cys Ser Ala Leu Met Gly Gly Arg Lys Val Met Ser Ile Ser Ile Arg
            180                 185                 190

Leu Lys Val Gln Lys Val Ile Pro Gly Pro Pro Ala Leu Thr Leu Val
            195                 200                 205

Pro Ala Glu Leu Val Arg Ile Arg Gly Glu Ala Ala Gln Ile Val Cys
            210                 215                 220

Ser Ala Ser Ser Val Asp Val Asn Phe Asp Val Phe Leu Gln His Asn
225                 230                 235                 240

Asn Thr Lys Leu Ala Ile Pro Gln Gln Ser Asp Phe His Asn Asn Arg
                245                 250                 255
```

-continued

```
Tyr Gln Lys Val Leu Thr Leu Asn Leu Asp Gln Val Asp Phe Gln His
            260                 265                 270

Ala Gly Asn Tyr Ser Cys Val Ala Ser Asn Val Gln Gly Lys His Ser
            275                 280                 285

Thr Ser Met Phe Phe Arg Val Val Glu Ser Ala Tyr Leu Asn Leu Ser
            290                 295                 300

Ser Gly Gln Asn Leu Ile Gln Glu Val Thr Val Gly Glu Gly Leu Asn
305                 310                 315                 320

Leu Lys Val Met Val Glu Ala Tyr Pro Gly Leu Gln Gly Phe Asn Trp
                325                 330                 335

Thr Tyr Leu Gly Pro Phe Ser Asp His Gln Pro Glu Pro Lys Leu Ala
            340                 345                 350

Asn Ala Thr Thr Lys Asp Thr Tyr Arg His Thr Phe Thr Leu Ser Leu
            355                 360                 365

Pro Arg Leu Lys Pro Ser Glu Ala Gly Arg Tyr Ser Phe Leu Ala Arg
    370                 375                 380

Asn Pro Gly Gly Trp Arg Ala Leu Thr Phe Glu Leu Thr Leu Arg Tyr
385                 390                 395                 400

Pro Pro Glu Val Ser Val Ile Trp Thr Phe Ile Asn Gly Ser Gly Thr
                405                 410                 415

Leu Leu Cys Ala Ala Ser Gly Tyr Pro Gln Pro Asn Val Thr Trp Leu
            420                 425                 430

Gln Cys Ser Gly His Thr Asp Arg Cys Asp Glu Ala Gln Val Leu Gln
            435                 440                 445

Val Trp Asp Asp Pro Tyr Pro Glu Val Leu Ser Gln Glu Pro Phe His
    450                 455                 460

Lys Val Thr Val Gln Ser Leu Leu Thr Val Glu Thr Leu Glu His Asn
465                 470                 475                 480

Gln Thr Tyr Glu Cys Arg Ala His Asn Ser Val Gly Ser Gly Ser Trp
                485                 490                 495

Ala Phe Ile Pro Ile Ser Ala Gly Ala His Thr His Pro Pro Asp Glu
            500                 505                 510
```

CSF-1R ANTIBODIES FOR THE TREATMENT OF CHRONIC GRAFT VERSUS HOST DISEASE

RELATED APPLICATIONS

This application is a U.S. National Stage Application under 35 U.S.C. § 371 of International Application No. PCT/US2020/064010, filed on Dec. 9, 2020, which claims priority to, and the benefit of, U.S. Provisional Application No. 62/945,842, filed on Dec. 9, 2019, and 63/110,111, filed on Nov. 5, 2020, the contents of which are hereby incorporated by reference in their entireties.

FIELD OF DISCLOSURE

The present invention relates to methods of treating sclerotic skin conditions and more specifically to method of treating chronic graft versus host disease with a preferred dose of an anti-CSF-1R antibody, Axatilimab.

INCORPORATION OF SEQUENCE LISTING

The instant application contains a Sequence Listing which has been submitted electronically in ASCII format and is hereby incorporated by reference in its entirety. Said ASCII copy, created on Jun. 7, 2022, is named SYND-042_N01US_327830-2527_SL.txt and is 59,291 bytes in size.

BACKGROUND

Colony stimulating factor 1 (CSF-1), also known as macrophage colony stimulating factor (M-CSF) is a cytokine produced by a variety of cells, including endothelial cells and fibroblasts. CSF-1 is composed of two "monomer" polypeptides, which form a biologically active dimeric CSF-1 protein. CSF-1 exists in at least three mature forms due to alternative R A splicing, proteolytic processing of protein precursors and post-translational modifications including glycosylation and addition of proteoglycan (see, Cerretti D P et al. 1988, Mol Immunol, 25(8), 761; Pixley F J and Stanley E R, 2004, Trends in Cell Biology, 14(11) 628-38; Douglass, T G et al, 2008, Int Immunopharmacol, 8, 1354-76). The various forms of CSF-1 protein include two secreted molecules, one that is glycosylated, the other comprised of a longer amino terminal sequence and proteoglycan modification. Another variant is a transmembrane (TM) molecule that is glycosylated but has no proteoglycan moieties. This membrane form can be shed via proteolytic cleavage to release an active, soluble molecule. All forms are produced as precursor polypeptides having a 32 amino acid signal sequence at the amino terminus, a putative transmembrane region of approximately 23 amino acids near the carboxyl terminus and a short cytoplasmic COOH-terminal tail. The precursor peptides are subsequently processed by amino terminal and carboxyl terminal proteolytic cleavages to produce the mature forms of CSF-1 with residues 1-149 being identical and constituting the receptor binding domain. In vivo, CSF-1 monomers are glycosylated, and dimerized via disulfide-linkage. CSF-1 belongs to a group of biological agonists that promote the production of blood cells. Specifically, it acts as a growth, differentiation and survival factor for bone marrow progenitor cells of the mononuclear phagocyte lineage. Further, CSF-1 stimulates the survival, proliferation and function of macrophages via a specific receptor on responding cells.

The CSF-1 receptor (CSF-1 R) is also referred to as the c-fms gene product or CD 115. CSF-1 R is a 165 kDa type 1 TM glycoprotein belonging to the type III receptor tyrosine kinase family. In addition to CSF-1, the structurally similar but sequence unrelated molecule IL-34 has also been shown to be a ligand for CSF-1R (Lin, et al. 2008, Science 320:807-81 1). Expression of CSF-1 R is restricted mainly to cells of the monocyte-macrophage lineage, both circulating and resident tissue populations, including osteoclasts. In addition, it is expressed in a number of cells of the female reproductive system including oocytes, decidual cells and trophoblasts (Pollard J W and Stanley E R, 1996 Advances in Developmental Biochemistry Vol 4, 1996, Pages 153-193 (Pleiotropic Roles for CSF-1 in Development Defined by the Mouse Mutation Osteopetrotic); Arceci R J, PNAS 1989, 86(22), 8818-8822 (Temporal Expression and Location of CSF-1 and its Receptor in Female Reproductive Tract are consistent with CSF-1-Regulated Placental Development); Arceci, R J et al, 1992, 151 (1), 1-8; Dev Biol; Regenstreif L J and Rossant J, Dev Biol 1989 May; 133(1): 284-94 (Expression of the c-fms-oncogene and of the cytokine, CSF-1, during mouse embryogenesis), Pampfer S et al, Biol Reprod 1992, 46(1), 48-57 (Expression of the CSF-1 receptor (c-fms proto-oncogene product) in the human uterus and placenta; Jokhi P P et al, Lab Invest 1993, 68(3), 308-320 (Expression of the CSF-1 Receptor (c-fms product) by cells at the human uteroplacental interface); Kauma S W et al, J Clin Endocrinol Metab 1991, 73(4), 746-751 (CSF-1 and c-fms expression in human endometrial tissues and placenta during the menstrual cycle and early pregnancy), Byrne J Cell Biol 1981 91(3 Pt 1) 848-53, Hofstetter W et al, Bone 1995, 17, (2), 145-151; Tanaka S et al, 1993, J Clin Invest, 91: 257-63; Weir E C et al, 1993, J Bone Miner Res, 8(12) 1507-18.

Binding of the ligand CSF-1 to the CSF-1 receptor results in the phosphorylation of the receptor on one or more tyrosine residues through the action of its tyrosine kinase domain. This phosphorylation can be detected because antibodies are available that bind to the receptor only after phosphorylation (for example Phospho-M-CSF-Receptor (Tyr546) antibody #3083 from Cell Signaling Technology).

Chronic graft versus host disease (cGVHD), an immune response of the donor-derived hematopoietic cells against recipient tissues, is a serious, potentially life-threatening complication of allogeneic hematopoietic stem cell transplantation (HSCT). cGVHD is estimated to develop in approximately 40% of transplant recipients, is estimated to effect 14,000 patients in the US and can last for years. Chronic GVHD typically manifests across multiple organ systems, with the skin and mucosa being commonly involved and is characterized by the development of fibrotic tissue. Graft versus host disease (GVHD) is an immunologically mediated disease that contributes substantially to transplant-related morbidity and mortality. The overall incidence of GVHD remains between 30% and 60% and carries approximately a 50% mortality rate. Acute and chronic GVHD are complex clinical phenomena that require new and promising treatments. Chronic graft versus host disease (cGVHD) remains the major cause of morbidity and non-relapse mortality after allogeneic hematopoietic stem cell transplantation (HSCT). cGVHD typically manifests with multiorgan pathology which often occurs during the first-year post-HSCT but can also develop beyond the first year post-HSCT (Jagasia 2015). Treatment of cGVHD is currently based on steroid administration. While progress has been made with improvements in survival outcomes over time, current available therapies are associated with significant toxicities, and many currently available salvage therapies are associated with increased immunosuppression, infectious complications, and potential loss of the graft versus leukemia (GVL) effect. Thus, there is an unmet need for development of newer treatment strategies for cGVHD to improve long-term post-transplant outcomes and quality of life for HSCT recipients (Hill 2018).

Axatilimab is a humanized IgG4 monoclonal antibody (mAb) with high affinity against CSF-1R. Axatilimab can affect the migration, proliferation, differentiation, and survival of TAMs by binding to CSF-1R and blocking activation by its two known ligands, Colony stimulating factor-1 (CSF-1) and interleukin-34 (IL-34).

While the pathophysiological understanding of cGVHD is emerging, there has been little meaningful development of therapies for patients with cGVHD. Currently, there remains a long-standing reliance on prednisone as the mainstay of treatment. Steroid administration can relieve symptoms and delay disease progression; however, this approach is associated with significant toxicity and emergence of resistance (Flowers and Martin 2015, MacDonald 2017). An effort to decrease corticosteroid doses has led to their use in combination with other immunosuppressants, such as cyclosporine, tacrolimus, and sirolimus, in frontline or second-line settings, despite a lack of clinical evidence supporting additional efficacy after combining these agents with corticosteroids (Miklos 2017).

Approximately 50% to 60% of patients with cGVHD require secondary treatment within 2 years after initial systemic treatment. Despite no consensus with respect to optimal choice of agent, they have typically included rituximab or imatinib (Flowers and Martin 2015). In 2017 Imbruvica® (ibrutinib), a BTK inhibitor, became the first FDA approved therapy for the treatment of adult patients with cGVHD, indicated for patients who have received ≥1 lines of therapy. The side effects of ibrutinib are significant with 38% of patients discontinuing due to an adverse event and 31% of patients dose reducing in the pivotal evaluation of ibrutinib in patients with cGVHD. Additionally, investigators have noted that they do not give ibrutinib to a large proportion of their cGVHD patients due to the organ system involvement of the patients that participated in the clinical development program. Recent insights into cGVHD have led to interventions targeting kinases involved in the disease related inflammatory signaling pathways, such as BTK, JAK1/2, and Syk, being evaluated.

Nonclinical and patient sample correlative studies targeting these pathways have shown promising results (MacDonald 2017).

Axatilimab has the potential, based on its high affinity to inhibit CSF-1R, to provide an immunotherapeutic approach to treat cGVHD and other scleroderma conditions. Scleroderma has a spectrum of manifestations and a variety of therapeutic implications. It comprises localized scleroderma, systemic sclerosis, scleroderma-like disorders, and Sine scleroderma (Smith, 2000). Whilst localized scleroderma is a rare dermatologic disease associated with fibrosis and manifestations limited to skin, systemic sclerosis is a multisystem disease with variable risk for internal organ involvement and variation in the extent of skin disease. Systemic sclerosis can be diffuse or limited. Limited systemic sclerosis is also called CREST (calcinosis, Raynaud's esophageal dysfunction, sclerodaytyly, telangiectasiae). Scleroderma-like disorders are believed to be related to industrial environment exposure. In Sine disease, there is internal organ involvement without skin changes. The major manifestations of scleroderma and in particular of systemic sclerosis are inappropriate excessive collagen synthesis and deposition, endothelial dysfunction, spasm, collapse and obliteration by fibrosis. These patients with chronic GVHD including sclerosis and lung involvement are often difficult to treat and associated with poor outcomes therefore morbidity and mortality in these patients, especially those needing second or further lines of therapy remains high. Therefore, the development of novel agents to treat chronic GVHD and these related conditions remains an unmet medical need.

SUMMARY

Inhibitors of CSF-1R activity are active in the treatment of sclerotic conditions and chronic host versus graft disease. Axatilimab, is an anti-CSF-1R antibody or antigen binding fragment thereof, comprises a heavy chain, wherein the variable domain of the heavy chain comprises at least one of a CDR having the sequence given in SEQ ID NO:4 for CDR-H1, a CDR having the sequence given in SEQ ID NO:5 for CDR-H2 and a CDR having the sequence given in SEQ ID NO:6 for CDR-H3; and/or a light chain, wherein the variable domain of the light chain comprises at least one of a CDR having the sequence given in SEQ ID NO: 1 for CDR-L1, a CDR having the sequence given in SEQ ID NO:2 for CDR-L2 and a CDR having the sequence given in SEQ ID NO: 3 for CDR-L3.

In some embodiments, the anti-CSF-1R antibody or antigen binding fragment thereof comprises a heavy chain and a light chain, wherein the variable domain of the heavy chain comprises three CDRs and the sequence of CDR-H1 has at least 60% identity or similarity to the sequence given in SEQ ID NO:4, the sequence of CDR-H2 has at least 60% identity or similarity to the sequence given in SEQ ID NO:5 and the sequence of CDR-H3 has at least 60% identity or similarity to the sequence given in SEQ ID NO:6; and wherein the variable domain of the light chain comprises three CDRs and the sequence of CDR-L1 has at least 60% identity or similarity to the sequence given in SEQ ID NO: 1, the sequence of CDR-L2 has at least 60% identity or similarity to the sequence given in SEQ ID NO:2 and the sequence of CDR-L3 has at least 60% identity or similarity to the sequence given in SEQ ID NO:3.

In some embodiments, the anti-CSF-1R antibody or antigen binding fragment thereof comprises a heavy chain, wherein the heavy chain comprises the sequence given in SEQ ID NO:23; and a light chain, wherein the light chain comprises the sequence given in SEQ ID NO:15.

In some embodiments, the anti-CSF-1R antibody or anti-CSF-1 antibody or antigen binding fragment thereof is selected from the group consisting of a complete antibody molecule having full length heavy and light chains, a Fab, modified Fab', Fab', F(ab')$_2$, Fv, VH, VL and scFv fragment thereof.

In some embodiments, the anti-CSF-1R antibody or antigen binding fragment thereof comprises a heavy chain comprising the sequence given in SEQ ID NO:27 and a light chain comprising the sequence given in SEQ ID NO:19.

In some embodiments, the anti-CSF-1R antibody or antigen binding fragment thereof cross-blocks the binding of an antibody comprising the 6 CDRs given in sequence SEQ ID NO:1 for CDR-L1, SEQ ID NO:2 for CDR-L2, SEQ ID NO:3 for CDR-L3, SEQ ID NO:4 for CDR-H1, SEQ ID NO:5 for CDR-H2 and SEQ ID NO:6 for CDR-H3.

In some embodiments, the anti-CSF-1R as defined herein is axatilimab.

In some embodiments, the dosing of axatilimab is 0.3 mg/kg Q2W, 1 mg/kg Q2W, or 3 mg/kg Q4W. In some embodiments, the administration of axatilimab is for the prevention or treatment of a sclerotic skin condition. In some embodiments, the administration of axatilimab is for the prevention or treatment of chronic graft versus host disease.

The details of the disclosure are set forth in the accompanying description below. Although methods and materials similar or equivalent to those described herein can be used in the practice or testing of the present application, illustrative methods and materials are now described. In the case of conflict, the present specification, including definitions, will control. In addition, the materials, methods, and examples are illustrative only and are not intended to be limiting. Other features, objects, and advantages of the disclosure will be apparent from the description and from the claims. In the specification and the appended claims, the singular forms also include the plural unless the context clearly dictates otherwise. Unless defined otherwise, all technical and scientific terms used herein have the same meaning as commonly understood by one of ordinary skill in the art to which this disclosure belongs.

The contents of all references (including literature references, issued patents, published patent applications, and co-pending patent applications) cited throughout this application are hereby expressly incorporated herein in their entireties by reference. The references cited herein are not admitted to be prior art to the application.

BRIEF DESCRIPTION OF THE DRAWINGS

FIG. 8 shows responses observed across several organ systems following multiple treatments.

FIG. 10 shows the characteristics of chronic GVHD.

FIG. 11 shows patient demographics and characteristics.

FIG. 15 shows the summary and ongoing trials of Axatilimab.

DETAILED DESCRIPTION

Figure 1:
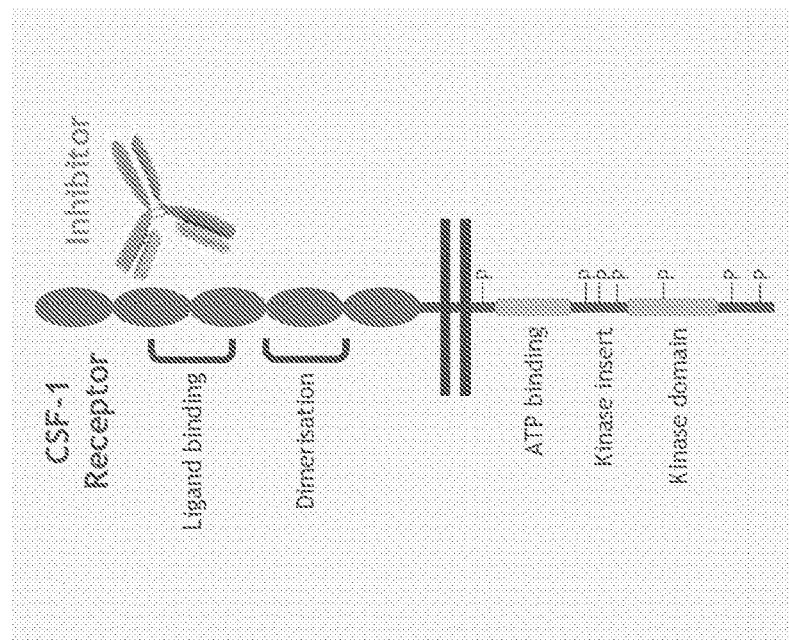
FIG. 1 shows the general schematic for treatment of cGVHD with the anti-CSF-1R antibody, or antigen binding fragment thereof, according to the current invention.
Figure 2:
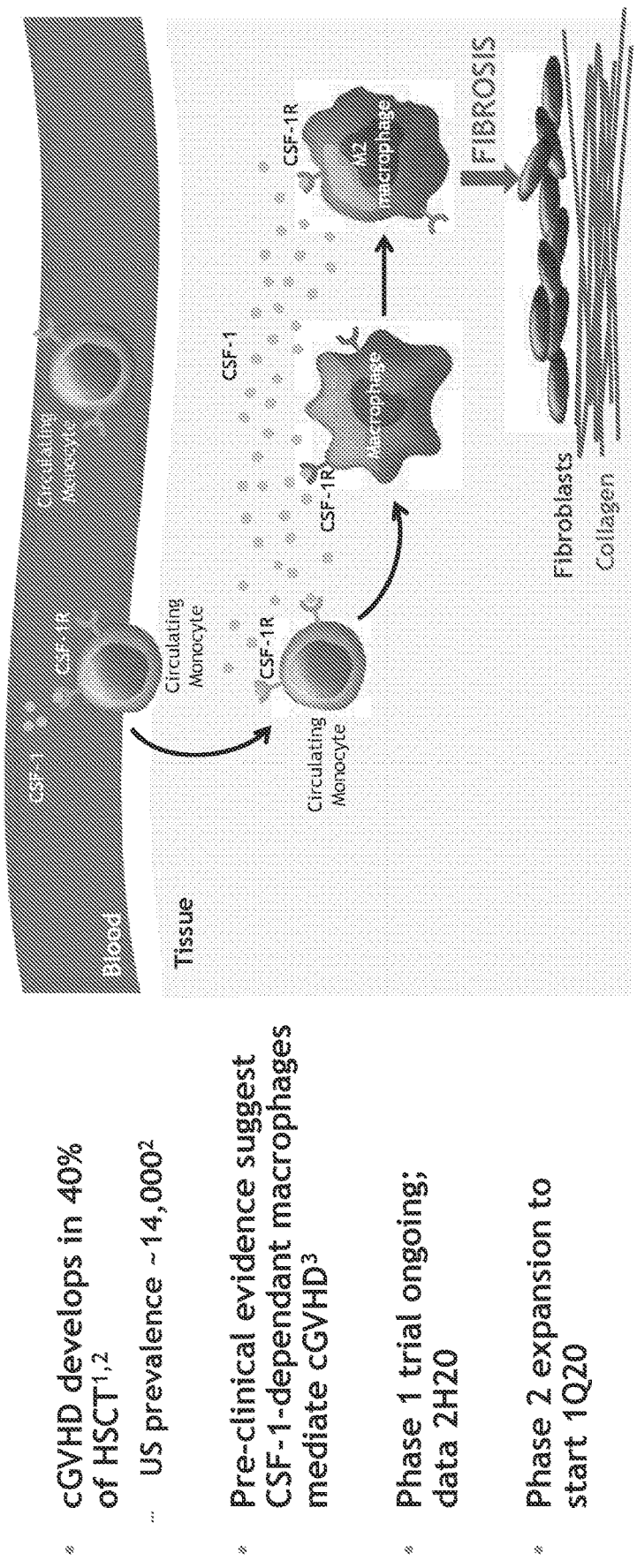
FIG. 2 shows the pathway for CSF-1R signaling in cGVHD.
Figure 3:
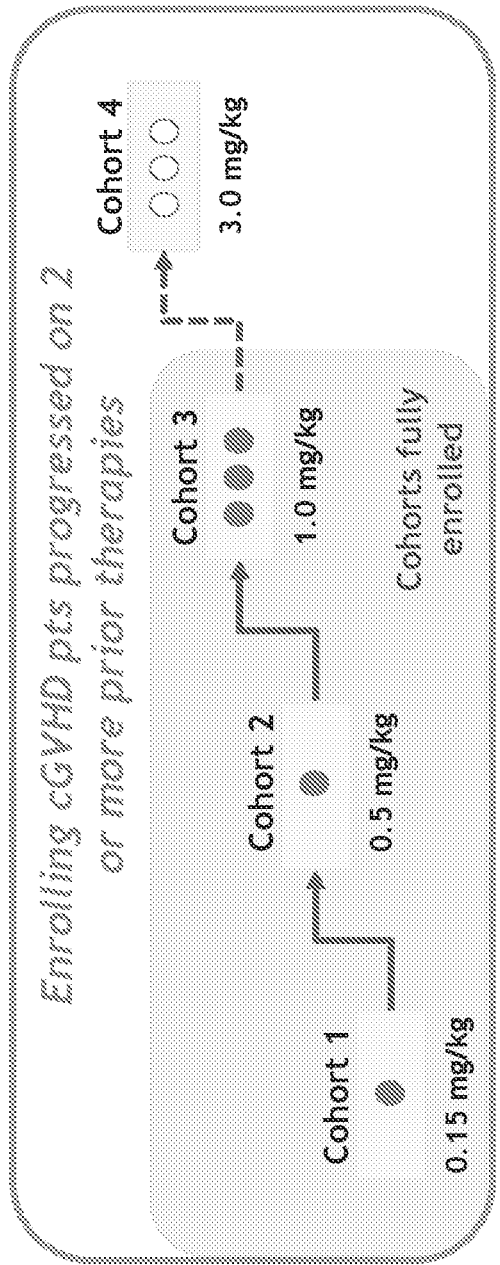
FIG. 3 shows the general schematic for clinical trials according to the current invention.
Figure 4:
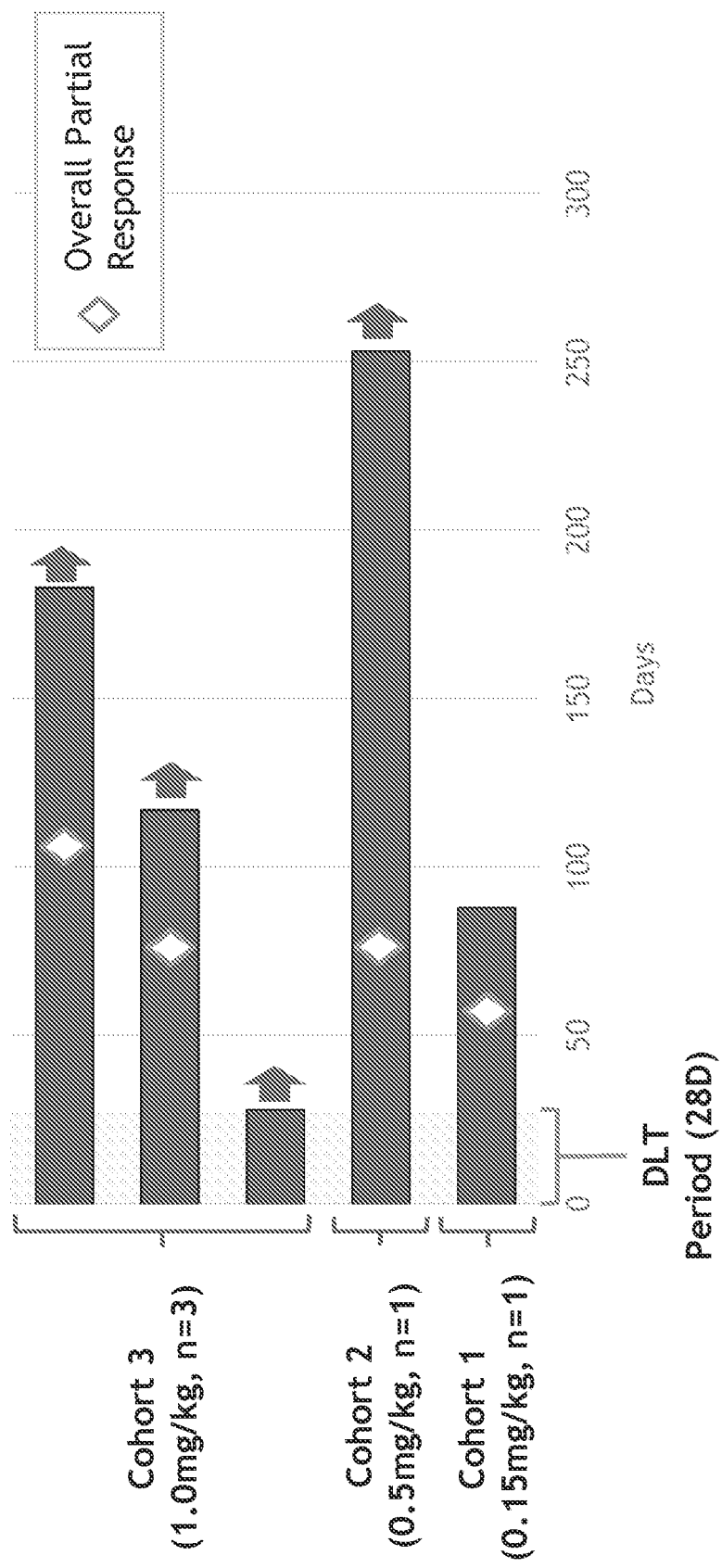
FIG. 4 shows the various cohorts treated according to various embodiments of the present invention.
Figure 5:
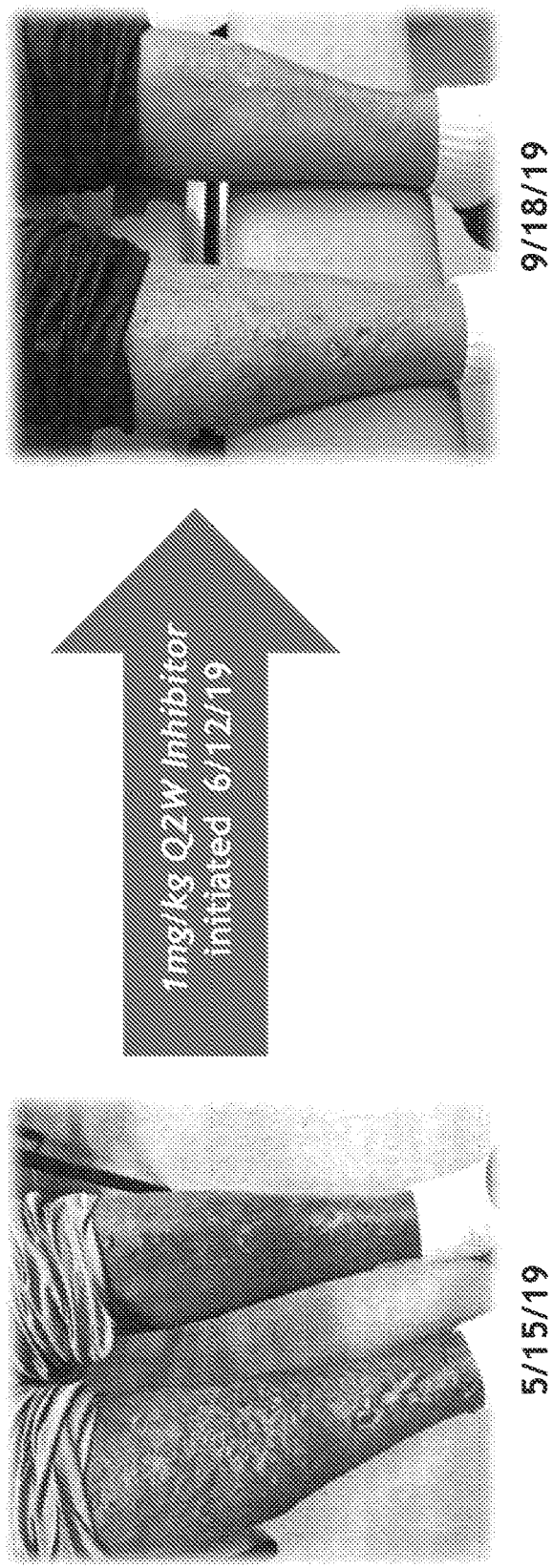
FIG. 5 shows the first evidence of CSF-1R inhibition inducing a response in cGVHD at a dosage of 1 mg/kg Q2W (every two weeks) of the anti-CSF-1R antibody or antigen binding fragment thereof.
Figure 6:
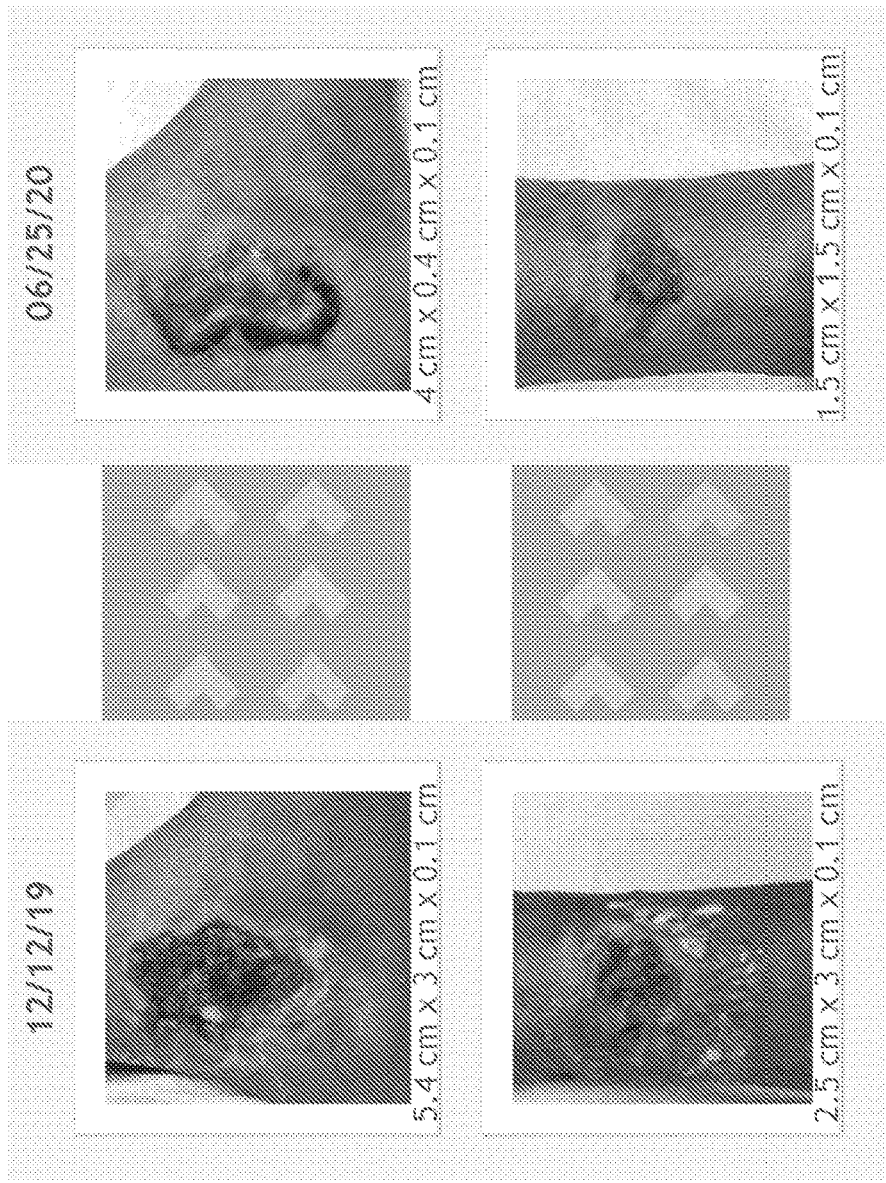
FIG. 6 shows evidence of CSF-1R inhibition inducing a response in cGVHD at a dosage of 3 mg/kg Q2W (every two weeks) of the anti-CSF-1R antibody or antigen binding fragment thereof.
Figure 7:
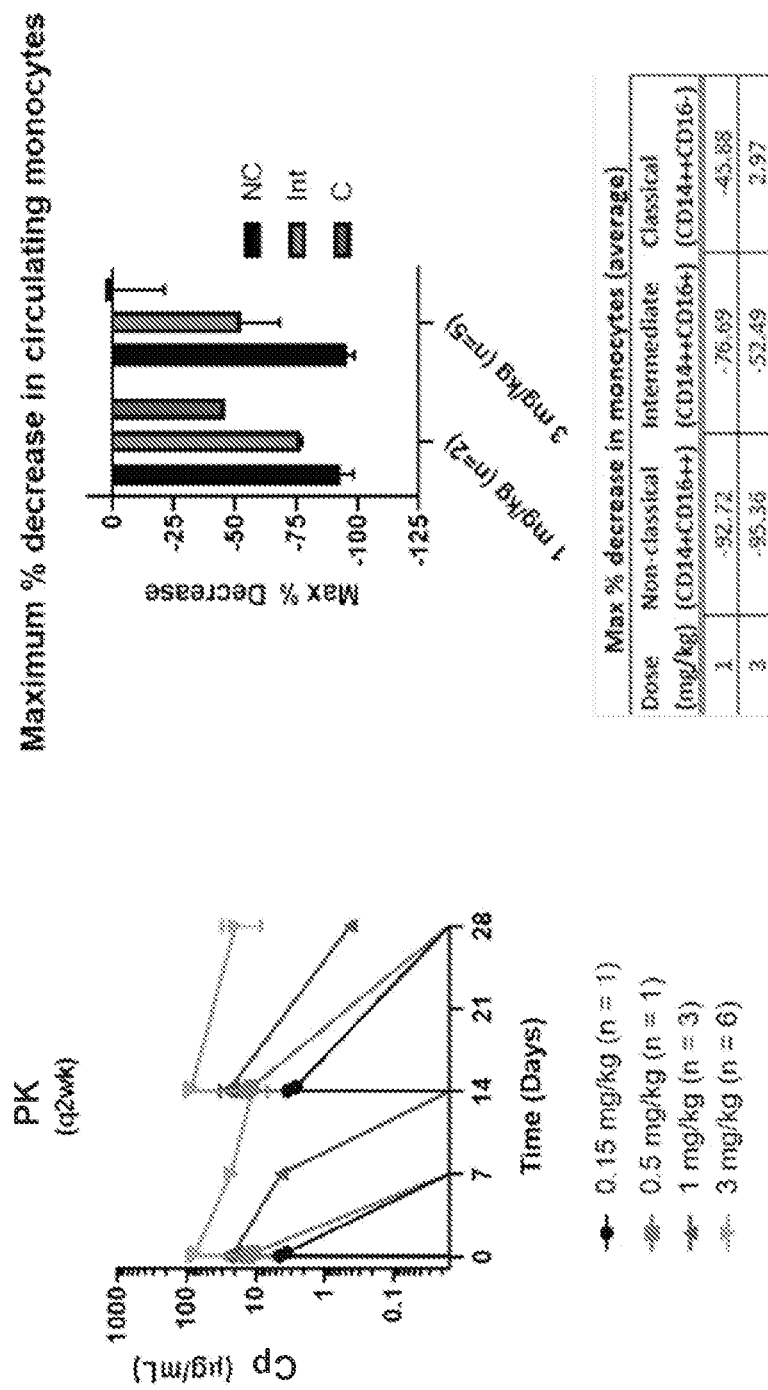
FIG. 7 shows antibody concentration and monocyte count including circulating $CD14^+CD16^+$ nonclassical and $CD14^{++}CD16^+$ intermediate monocyte kinetics, are consistent with those observed in healthy volunteers and patients. Shows that at doses of 3 mg/kg q2wk the patient still has circulating antibodies at trough at doses <3 mg/kg not detectable, similarly on the right note a marked reduction in non-classical monocytes, significantly more profound when compared to Intermediate and Classical.
Figure 9:
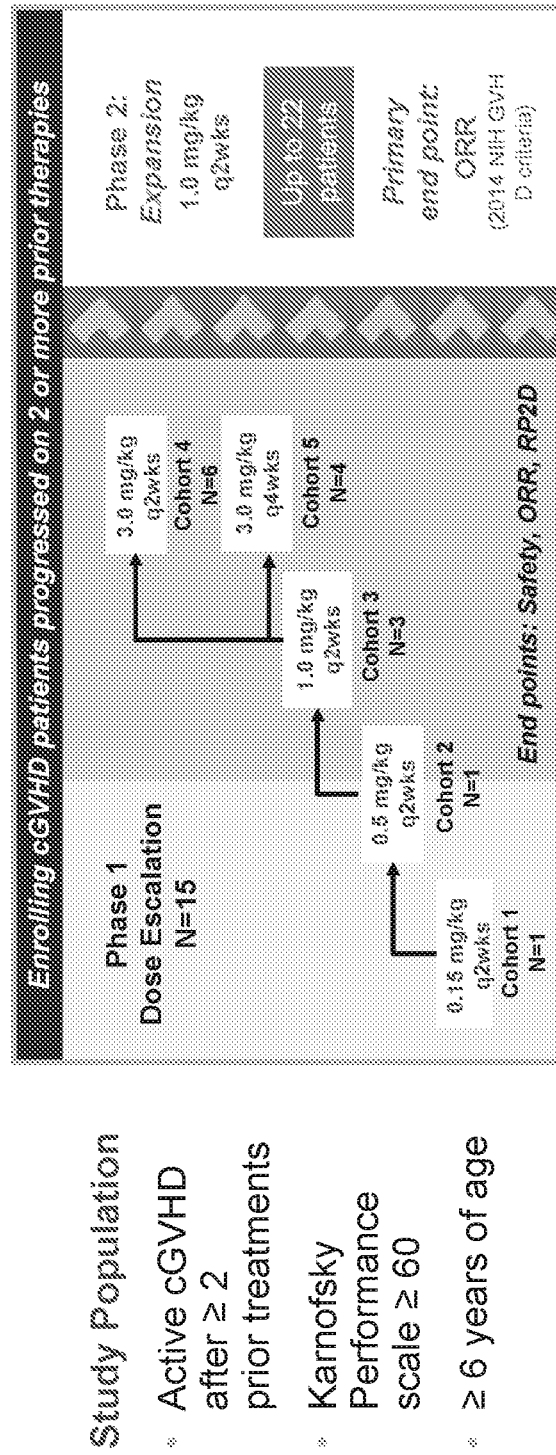
FIG. 9 shows the Axatilimab dose escalation and expansion.
Figure 12:
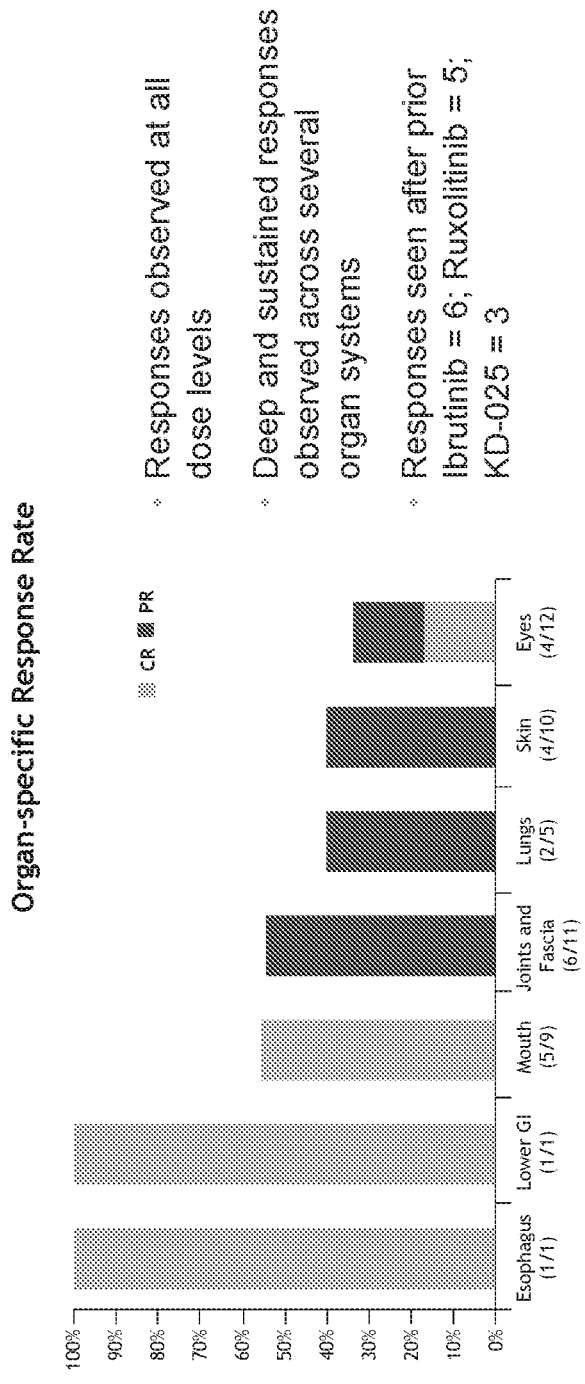
FIG. 12 shows the responses across cGVHD organ systems.
Figure 13:
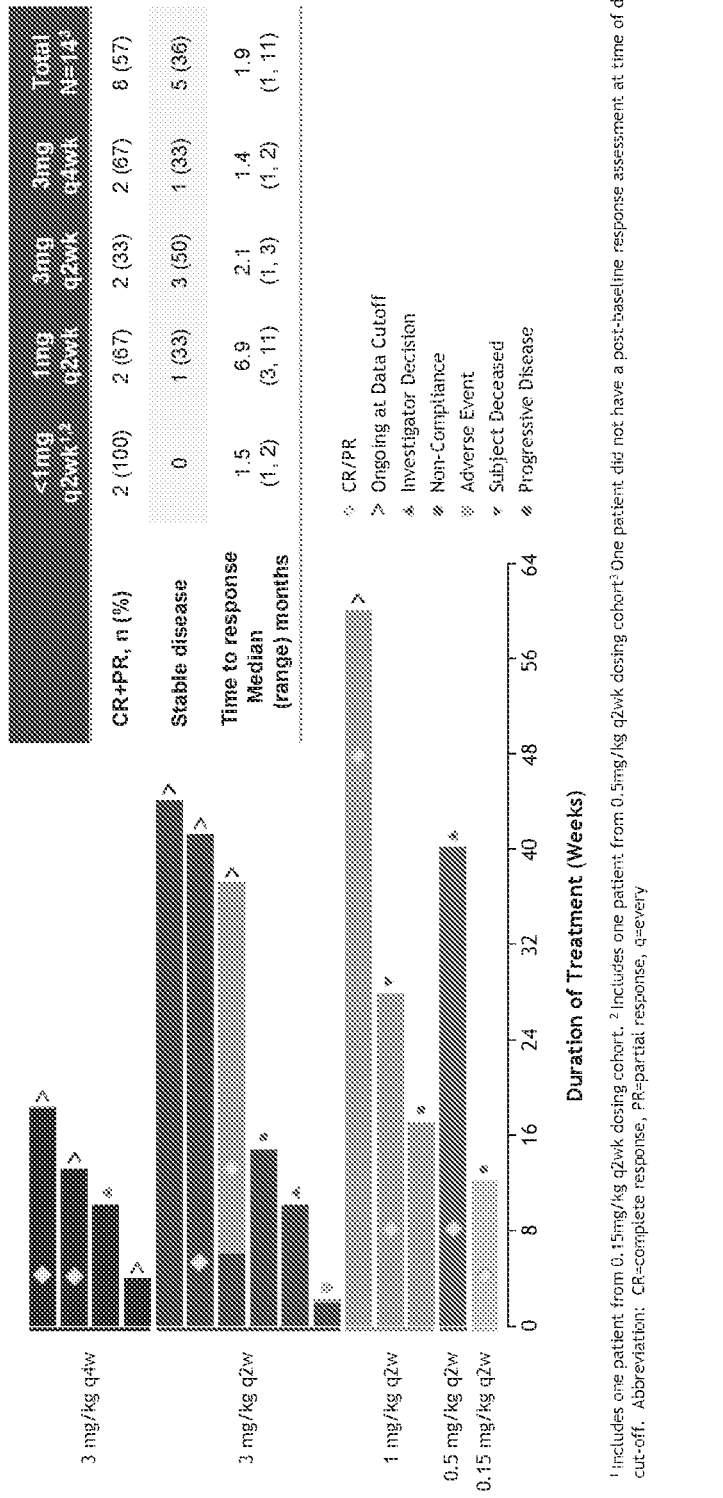
FIG. 13 shows the symptom control from the administration of various dosages of Axatilimab at various intervals.
Figure 14:
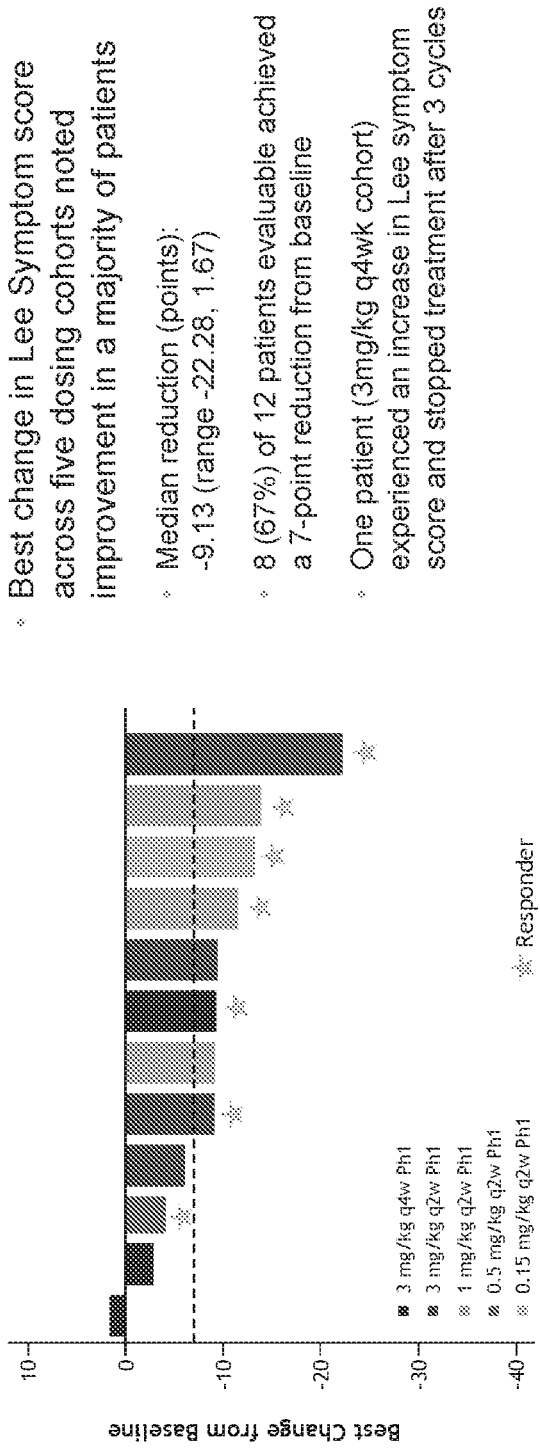
FIG. 14 shows a waterfall plot and an improved Lee symptom scores in a majority of patients.

In some embodiments, the present application is directed to the treatment of graft versus host disease using an anti-CSF-1R antibody or binding fragment thereof. In some embodiments, the anti-CSF-1R antibody is Axatilimab. In some embodiments, the anti-CSF-1R antibody or antigen binding fragment thereof, comprises a heavy chain, wherein the variable domain of the heavy chain comprises at least one of a CDR having the sequence given in SEQ ID NO:4 for CDR-H1, a CDR having the sequence given in SEQ ID NO:5 for CDR-H2 and a CDR having the sequence given in SEQ ID NO:6 for CDR-H3; and/or a light chain, wherein the variable domain of the light chain comprises at least one of a CDR having the sequence given in SEQ ID NO: 1 for CDR-L1, a CDR having the sequence given in SEQ ID NO:2 for CDR-L2 and a CDR having the sequence given in SEQ ID NO: 3 for CDR-L3.

In some embodiments, the anti-CSF-1R antibody or antigen binding fragment thereof comprises a heavy chain and a light chain, wherein the variable domain of the heavy chain comprises three CDRs and the sequence of CDR-H1 has at least 60% identity or similarity to the sequence given in SEQ ID NO:4, the sequence of CDR-H2 has at least 60% identity or similarity to the sequence given in SEQ ID NO:5 and the sequence of CDR-H3 has at least 60% identity or similarity to the sequence given in SEQ ID NO:6; and wherein the variable domain of the light chain comprises three CDRs and the sequence of CDR-L1 has at least 60% identity or similarity to the sequence given in SEQ ID NO: 1, the sequence of CDR-L2 has at least 60% identity or similarity to the sequence given in SEQ ID NO:2 and the sequence of CDR-L3 has at least 60% identity or similarity to the sequence given in SEQ ID NO:3.

In some embodiments, the anti-CSF-1R antibody or antigen binding fragment thereof comprises a heavy chain, wherein the heavy chain comprises the sequence given in SEQ ID NO:23; and a light chain, wherein the light chain comprises the sequence given in SEQ ID NO:15.

In some embodiments, the antibody has a heavy chain comprising the sequence given in SEQ ID NO: 27 and a light chain comprising the sequence given in SEQ ID NO: 19. Also provided is an anti-CSF-1R antibody or binding fragment thereof, in which the heavy and light chains are at least 80% (preferably 85%, 90%, 95% or 98%) identical or similar to a heavy chain comprising the sequence given in SEQ ID NO: 27 and a light chain comprising the sequence given in SEQ ID NO: 19.

In one embodiment, the light chain has or consists of the sequence given in SEQ ID NO: 19 and the heavy chain has or consists of the sequence given in SEQ ID NO: 27. In another embodiment, the light chain has or consists of the sequence of SEQ ID NO: 19 and the heavy chain has or consists of the sequence of SEQ ID NO: 27, wherein the amino acid lysine at position 453 of SEQ ID NO: 27 is missing or deleted.

Also provided by the present disclosure is a specific region or epitope of human CSF-1R which is bound by an antibody of the disclosure, in particular an antibody 969.g2 comprising the heavy chain sequence gH2 (SEQ ID NO: 27) and/or the light chain sequence gL7 (SEQ ID NO: 19).

In some embodiments, the anti-CSF-1R antibody or anti-CSF-1 antibody or antigen binding fragment thereof is selected from the group consisting of a complete antibody molecule having full length heavy and light chains, a Fab, modified Fab', Fab', F(ab')$_2$, Fv, VH, VL and scFv fragment thereof.

In some embodiments, the anti-CSF-1R antibody or antigen binding fragment thereof comprises a heavy chain comprising the sequence given in SEQ ID NO:27 and a light chain comprising the sequence given in SEQ ID NO:19.

In some embodiments, the anti-CSF-1R antibody or antigen binding fragment thereof cross-blocks the binding of an antibody comprising the 6 CDRs given in sequence SEQ ID NO:1 for CDR-L1, SEQ ID NO:2 for CDR-L2, SEQ ID NO:3 for CDR-L3, SEQ ID NO:4 for CDR-H1, SEQ ID NO:5 for CDR-H2 and SEQ ID NO:6 for CDR-H3.

In some embodiments, the anti-CSF-1R antibody or antigen binding fragment thereof cross-blocks the binding by binding the same epitope as the antibody which it blocks.

In some embodiments, the anti-CSF-1 antibody or antigen binding fragment thereof cross-blocks the binding by binding the same epitope as the antibody which it blocks.

In some embodiments, the anti-CSF-1R antibody or anti-CSF-1 antibody or antigen binding fragment thereof or inhibitor of CSF-1R is administered once a week.

In some embodiments, the anti-CSF-1R antibody or anti-CSF-1 antibody or antigen binding fragment thereof or inhibitor of CSF-1R is administered once every two weeks. In some embodiments, the anti-CSF-1R antibody or anti-CSF-1 antibody or antigen binding fragment thereof or inhibitor of CSF-1R is administered twice every week.

In some embodiments, the anti-CSF-1R antibody or anti-CSF-1 antibody or antigen binding fragment thereof or inhibitor of CSF-1R is administered three times every week.

In some embodiments, the anti-CSF-1R antibody or anti-CSF-1 antibody antigen binding fragment thereof or inhibitor of CSF-1R is administered at a dose ranging between about 0.1 mg/kg and about 30 mg/kg.

In some embodiments, the anti-CSF-1R antibody or anti-CSF-1 antibody antigen binding fragment thereof or inhibitor of CSF-1R activity is administered at a dose ranging between about 0.1 mg/kg and about 10 mg/kg. In some embodiments, the anti-CSF-1R antibody or anti-CSF-1 antibody antigen binding fragment thereof or inhibitor of CSF-1R activity is administered at a dose ranging between about 0.1 mg/kg and about 10 mg/kg for the treatment of chronic graft versus host disease.

In some embodiments, the anti-CSF-1R antibody or anti-CSF-1 antibody or antigen binding fragment thereof or inhibitor of CSF-1R activity is administered at a dose of about 0.1 mg/kg, 0.5 mg/kg, 1 mg/kg, 1.5 mg/kg, 3 mg/kg, 5 mg/kg, 6 mg/kg, 7.5 mg/kg, or about 10 mg/kg.

In some embodiments, the axatilimab is administered at a dose of 0.15 mg/kg every week. In some embodiments, the axatilimab is administered at a dose of 0.5 mg/kg every week. In some embodiments, the axatilimab is administered at a dose of 1.0 mg/kg every week. In some embodiment, the axatilimab is administered at a dose of 3.0 mg/kg every week. In some embodiments, the axatilimab is administered at a dose of 0.15 mg/kg every two weeks. In some embodiments, the axatilimab is administered at a dose of 0.5 mg/kg every two weeks. In some embodiments, the axatilimab is administered at a dose of 1.0 mg/kg every two weeks. In some embodiment, the axatilimab is administered at a dose of 3.0 mg/kg every two weeks. In some embodiments, the axatilimab is administered at a dose of 0.15 mg/kg every three weeks. In some embodiments, the axatilimab is administered at a dose of 0.5 mg/kg every three weeks. In some embodiments, the axatilimab is administered at a dose of 1.0 mg/kg every three weeks. In some embodiment, the axatilimab is administered at a dose of 3.0 mg/kg every three weeks. In some embodiments, the axatilimab is administered at a dose of 0.15 mg/kg every four weeks. In some embodiments, the axatilimab is administered at a dose of 0.5 mg/kg every four weeks. In some embodiments, the axatilimab is administered at a dose of 1.0 mg/kg every four weeks. In some embodiment, the axatilimab is administered at a dose of 3.0 mg/kg every four weeks. In some embodiments, from week to week the dosage is increased or decreased based on circulating classical monocyte levels.

Preferably, the anti-CSF-1R antibody or anti-CSF-1 antibody or antigen binding fragment thereof or inhibitor of CSF-1R is administered once every two weeks. Preferably, the anti-CSF-1R antibody or anti-CSF-1 antibody or antigen binding fragment thereof or inhibitor of CSF-1R is administered at a dose of 1 mg/kg. Preferably, the anti-CSF-1R antibody or anti-CSF-1 antibody or antigen binding fragment thereof or inhibitor of CSF-1R is administered at a dose of 3 mg/kg. Preferably, the anti-CSF-1R antibody or anti-CSF-1 antibody or antigen binding fragment thereof or inhibitor of CSF-1R is administered at a dose of 1 mg/kg every two weeks.

In some embodiments, the CSF-1R inhibitor is administered and decreases circulating classical monocytes. In some embodiments, the CSF-1R inhibitor is administered and depletes the circulating classical monocytes. In some embodiments, the CSF-1R inhibitor is administered and fully depletes the level of classical monocytes. In some embodiments, an initial administration of a CSF-1R inhibitor depletes the level of classical monocytes by a pre-determined percentage. In some embodiments, an initial administration of a CSF-1R inhibitor depletes the level of classical monocytes by a pre-determined percentage and a subsequent administration of the CSF-1R inhibitor occurs once the level of classical monocytes increases. In some embodiments, an initial administration of a CSF-1R inhibitor depletes the level of classical monocytes by a pre-determined percentage and a subsequent administration of the CSF-1R inhibitor occurs once the level of classical monocytes increases to a pre-determined percentage. In some embodiments, least 20%, at least 30%, at least 40%, at least 50%, at least 60%, at least 70%, at least 80%, at least 90% or 100%.

In some embodiments, the method provides for the treatment of chronic graft versus host disease (cGVHD) in a human, the method comprising administering to the human in need thereof a pharmaceutically effective amount of axatilimab. In some embodiments, the treatment methods herein are directed to scleroderma. In some embodiments, the treatment methods are directed to preventing or alleviating the symptoms of chronic graft versus host disease (cGVHD). In some embodiments, the cGVHD is liver cGVHD. In some embodiments, the cGVHD is kidney cGVHD. In some embodiments, the cGVHD is esophageal cGVHD. In some embodiments, the cGVHD is stomach cGVHD. In some embodiments, the treatment methods herein are directed to localized scleroderma, systemic sclerosis, scleroderma-like disorders, and Sine scleroderma. In some embodiments, the treatment methods herein are directed to systemic sclerosis. In some embodiments, the treatment methods herein are directed to Systemic sclerosis, wherein the systemic sclerosis is diffuse or limited. In some embodiments, the treatment methods herein are directed to CREST (calcinosis, Raynaud's esophageal dysfunction, sclerodaytyly, telangiectasiae). Scleroderma-like disorders are believed to be related to industrial environment exposure. In Sine disease, there is internal organ involvement without skin changes. The major manifestations of scleroderma and in particular of systemic sclerosis are inappropriate excessive collagen synthesis and deposition, endothelial dysfunction, spasm, collapse and obliteration by fibrosis. In some embodiments, the cell transplantation is a hematopoietic cell transplantation. In some embodiments, the GVHD is acute GVHD. In some embodiments, the GVHD is chronic GVHD. In some embodiments, the GVHD is sclerodermatous GVHD. In some embodiments, the GVHD is steroid resistant GVHD. In some embodiments, the GVHD is cyclosporin-resistant GVHD. In some embodiments, the GVHD is refractory GVHD. In some embodiments, the GHVD is oral GVHD. In some embodiments, the oral GVHD is reticular oral GVHD. In some embodiments, the oral GVHD is erosive oral GVHD. In some embodiments, the oral GVHD is ulcerative oral GVHD. In some embodiments, the oral GVHD is GVHD of the oral cavity. In some embodiments, the oral GVHD is GVHD of the oropharyngeal region. In some embodiments, the oral GVHD is GVHD of the pharyngeal region. In some embodiments, the oral GVHD is GVHD of the esophageal region. In some embodiments, the oral GVHD is acute oral GVHD. In some embodiments, the oral GVHD is chronic oral GVHD. In some embodiments, the patient exhibits one or more symptoms of GVHD. In some embodiments, the patient has or will receive an allogeneic bone marrow or hematopoietic stem cell transplant.

Without being bound by any theory, the presence of monocytes/marcophages provide both positive and negative effects. Without being bound by any theory, the monocytes/marcophages have been found to have positive and negative effects in the conditions discussed herein, and in some embodiments, the condition is a sclerotic skin condition as discussed herein and/or chronic graft versus host disease. In some embodiments, the presence of circulating classical monocytes have beneficial effects if allowed to be present in reduced quantities. Allowing the monocyte/macrophage levels to increase between administrations of the CSF-1R inhibitor/antibody allows the treatment to harness the positive effects of the circulating monocyte/macrophages while avoiding the negative effects. In some embodiments, an antibody inhibits monocyte proliferation. In some embodiments, an antibody is considered to "inhibit monocyte proliferation" when it reduces the amount of monocyte proliferation by at least 50%, using the assay described, e.g., U.S. Pat. No. 8,206,715 B2. In some embodiments, an antibody reduces the amount of monocyte proliferation by at least 20%, at least 30%, at least 40%, at least 50%, at least 60%, at least 70%, at least 80%, at least 90% or 100%. In some such embodiments, the antibody is said to inhibit monocyte proliferation by at least at least 50%, at least 60%, at least 70%, etc.

Human monocytes exhibit pro-inflammatory features in a variety of disease contexts Human monocytes were identified by the expression of CD14. They can be further classified on the basis of CD16 expression (the high affinity Fc receptor). CD16− cells are referred to as classical monocytes since they are ordinarily about 90% of total monocytes in healthy individuals. CD16+ cells appear to be expanded in many inflammatory diseases and exhibit a preferential migration across the endothelial layers in response to chemokines. They are thus usually referred to as non-classical or proinflammatory monocytes (non-classical (CD14+/CD16+) monocytes and classical (CD14+/CD16−) monocyte).

In some embodiments, administering the CSF-1R inhibitor of the present invention decreases circulating monocytes by at least 40%, at least 50%, at least 60%, at least 70%, at least 80%, at least 90% or 100%. In some such embodiments, the antibody is said to inhibit monocyte proliferation by at least at least 50%, at least 60%, at least 70%, etc. In some embodiments, the level of circulating monocytes is allowed to increase by at least 5%, at least 10%, at least 15%, at least about 20%, at least about 25%, at least about 30%, at least about 40%, at least about 50% before the administration of a subsequent dose of the CSF-1R inhibitor. In some embodiments, the level of circulating monocytes is allowed to increase for 1 week before administration of a subsequent dose of the CSF-1R inhibitor. In some embodiments, the level of circulating monocytes is allowed to increase for 2 weeks before administration of a subsequent dose of the CSF-1R inhibitor. In some embodiments, the level of circulating monocytes is allowed to increase for 3 weeks before administration of a subsequent dose of the CSF-1R inhibitor. In some embodiments, the level of circulating monocytes is allowed to increase for 4 weeks before administration of a subsequent dose of the CSF-1R inhibitor.

In some embodiments, the monocytes are non-classical. In some embodiments, the monocytes are classical. In some embodiments, the monocytes are a combination of classical and non-classical monocytes. In some embodiments, the monocytes are a combination of classical and intermediate monocytes.

In some embodiments, the CSF-1R inhibitor is axatilimab. In some embodiments, the CSF-1R inhibitor is administered according to the following dosage scheme. In some embodiments, the dose schedule maximizes the benefits of circulating macrophages and minimizes negative effects. In some embodiments, the dose is increased inverse to the following dosage schedule.

| | Starting Dose | | |
|---|---|---|---|
| Dose reduction | 0.3 mg/kg IV Q2W | 1 mg/kg IV Q2W | 3 mg/kg Q4W |
| Reduction of 1 dose level | 0.2 mg/kg | 0.6 mg/kg IV Q2W | 2 mg/kg Q4w |
| Reduction of 2 dose levels | 0.15 mg/kg | 0.3 mg/kg IV Q2W | 1 mg/kg q2w |

In some embodiments, the method of the present invention is directed to the treatment of sclerotic skin conditions wherein the patient has progressed on one or more prior therapies. In one embodiment, the sclerotic skin condition is active chronic graft versus host disease. In one embodiment, the patient progressed on at least two prior therapies. In one embodiment, the prior therapy was ibrutinib. In one embodiment, at least one of the prior therapies was ibrutinib.

In some embodiments, the method of the present invention is directed to the treatment of cGVHD wherein the patient has progressed on one or more prior therapies. In one embodiment, the patient progressed on at least two prior therapies. In one embodiment, the prior therapy was ibrutinib. In one embodiment, at least one of the prior therapies was ibrutinib.

In one embodiments, the axatilimab is administered with one or more additional agents useful in the treatment of graft versus host disease is selected from the group of prednisone, methylprednisone, oral nonabsorbable corticosteroids, such as budesonide or beclomethasone diproprionate, immune modulators, such as cyclosporine, tacrolimus, mycophenolate mofetil, tilomisole, imuthiol, antithymocyte globulin, anti-TNF agents, azathioprine, inosine 5'-monophosphate dehydrogenase inhibitors, azodiacarbonide, bisindolyl maleimide VIII, brequinar, chlorambucil, CTLA-4Ig, corticosteroids, cyclophosphamide, deoxyspergualin, dexamethasone, glucocorticoids, leflunomide, mercaptopurine, 6-mercaptopurine, methotrexate, methylprednisolone, mizoribine, mizoribine monophosphate, muromonab CD3, mycophenolate mofetil, OKT3, rho (D) immune globin, vitamin D analogs, MC1288), daclizumab, infliximab, rituximab, tocilizumab alemtuzumab, methotrexate, antithymocyte denileukin diftitox, Campath-1H, keratinocyte growth factor, abatacept, remestemcel-L suberoylanilide hydroxamic acid, pentostatin, thalidomide, imatinib mesylate, cyclophosphamide, fludarabine, OKT3, melphalan, thiopeta, and lymphocyte immune globulin, anti-thymocyte, and globulin

| Nucleic Acids, Polypeptides |
|---|

CDR-L1: LASEDIYDNLA (SEQ ID NO: 1)

CDRL2: YASSLQD (SEQ ID NO: 2)

CDR-L3: LQDSEYPWT (SEQ ID NO: 3)

CDR-H1: GFSLTTYGMGVG (SEQ ID NO: 4)

CDR-H2: NIWWDDDKYYNPSLKN (SEQ ID NO: 5)

CDR-H3: IGPIKYPTAPYRYFDF (SEQ ID NO: 6)

Rat Ab 969 VL region: DIQMTQSPAS LSASLGETVS IECLASEDIY DNLAWYQKKP
GKSPHLLIYY ASSLQDGVPS RFSGSGSGTQ YSLKINSLES EDAATYFCLQ
DSEYPWTFGG GTKLELK (SEQ ID NO: 7)

Rat Ab 969 VL region: gacatccaga tgacacagtc tccagcttcc ctgtctgcat ctctgggaga aactgtctcc
atcgaatgtc tagcaagtga ggacatttac gataatttag cgtggtacca gaagaagcca ggaaaatctc ctcacctcct catctattat
gcaagtagct tgcaagatgg ggtcccatca cggttcagtg gcagtggatc tggcacacag tattctctca aaatcaacag
cctggaatct gaagatgctg cgacttattt ctgtctacag gattctgagt atccgtggac gttcggtgga ggcaccaagc tggaattgaa
a (SEQ ID NO: 8)

Rat Ab 969 VL region with signal sequence underlined and italicized: *MGVPTQLLVL*
*LLLWITDAIC* DIQMTQSPAS LSASLGETVS IECLASEDIY DNLAWYQKKP GKSPHLLIYY
*ASSLQDGVPS* RFSGSGSGTQ YSLKINSLES EDAATYFCLQ DSEYPWTFGG GTKLELK
(SEQ ID NO: 9)

Rat Ab 969 VL region with signal sequence underlined and italicized: *atgggtgtcc ccactcagct*
*cttggtgttg ttgctgctgt ggattacaga tgccatatgt* gacatccaga tgacacagtc tccagcttcc ctgtctgcat ctctgggaga
aactgtctcc atcgaatgtc tagcaagtga ggacatttac gataatttag cgtggtacca gaagaagcca ggaaaatctc ctcacctcct
catctattat gcaagtagct tgcaagatgg ggtcccatca cggttcagtg gcagtggatc tggcacacag tattctctca aaatcaacag
cctggaatct gaagatgctg cgacttattt ctgtctacag gattctgagt atccgtggac gttcggtgga ggcaccaagc tggaattgaa
a (SEQ ID NO: 10)

Rat Ab 969 VH region: QVTLKESGPG ILQPSQTLSL TCTFSGFSLT TYGMGVGWIR
QPSGKGLEWLANIWWDDDKY YNPSLKNRLT ISKDTSNNQA FLKLTNVHTS
DSATYYCARIGPIKYPTAPY RYFDFWGPGT MVTVS (SEQ ID NO: 11)

Rat Ab 969 VH region: caggttactc tgaaagagtc tggccctggg atattgcagc cctccagac cctcagtctg
acttgcactt tctctgggtt tcactgacc acttatggta tgggtgtggg ctggattcgt cagccttcag ggaagggtct ggagtggctg
gcaaacattt ggtgggatga tgataagtat tacaatccat ctctgaaaaa ccggctcaca atctccaagg acacctccaa
caaccaagca ttcctcaagc tcaccaatgt acacacttca gattctgcca catactactg tgctcggata gggccgatta aatacccgac
ggccccctac cggtactttg acttctgggg cccaggaacc atggtcaccg tctcg (SEQ ID NO: 12)

Rat Ab 969 VH region with signal sequence underlined and italicized: *MDRLTSSFLL*
*LIVPAYVLSQ* VTLKESGPGILQPSQTLSLT CTFSGFSLTT YGMGVGWIRQ PSGKGLEWLA
*NIWWDDDKYY* NPSLKNRLTI SKDTSNNQAF LKLTNVHTSD SATYYCARIG
PIKYPTAPYR YFDFWGPGTM VTVS (SEQ ID NO: 13)

Rat Ab 969 VH region with signal sequence underlined and italicized: *atggacaggc ttacttcctc*
*attcctactg ctgattgtcc ctgcatatgt cctgtct*cag gttactctga aagagtctgg ccctgggata ttgcagcct cccagaccct
cagtctgact tgcactttct ctgggttttc actgaccact tatggtatgg gtgtgggctg gattcgtcag ccttcaggga agggtctgga
gtggctggca aacatttggt gggatgatga taagtattac aatccatctc tgaaaaaccg gctcacaatc tccaaggaca
cctccaacaa ccaagcattc ctcaagctca ccaatgtaca cacttcagat tctgccacat actactgtgc tcggataggg ccgattaaat
acccgacggc ccctaccgg tactttgact tctggggccc aggaaccatg tcaccgtctc cg (SEQ ID NO: 14)

969 gL7 V-region: DIQMTQSPSS LSASVGDRVT ITCLASEDIY DNLAWYQQKP
GKAPKLLIYY ASSLQDGVPS RFSGSGSGTD YTLTISSLQP EDFATYYCLQ
DSEYPWTFGG GTKVEIK (SEQ ID NO: 15)

969 gL7 V-region: gacatacaga tgactcagtc accctcaagc ctgagtgcca gtgtgggaga cagggtgaca atcacctgtc
tggcctccga ggatatctac gataacctgg catggtatca gcagaaacct ggaaaggctc ccaagctcct gatttattat gcctcctctc
tccaagacgg cgttccatct cggttcagcg gaagcggctc cgggacggat tacacactga caattagctc tctgcaaccg
gaggattttg ctacttacta ctgcctgcaa gactccgaat acccatggac cttcggtggt ggcaccaaag tggaaatcaa g (SEQ
ID NO: 16)

| Nucleic Acids, Polypeptides |
| --- |

969 gL7 V-region with signal sequence underlined and italicized: *MSVPTQVLGL LLLWLTDARC*
DIQMTQSPSS LSASVGDRVT ITCLASEDIY DNLAWYQQKP GKAPKLLIYY
ASSLQDGVPS RFSGSGSGTD YTLTISSLQP EDFATYYCLQ DSEYPWTFGG GTKVEIK
(SEQ ID NO: 17)

969 gL7 V-region with signal sequence underlined and italicized: *atgagcgtgc ctactcaagt*
*cttggggctg ctcttgcttt ggcttaccga cgcaagatgc* gacatacaga tgactcagtc accctcaagc ctgagtgcca
gtgtgggaga cagggtgaca atcacctgtc tggcctccga ggatatctac gataacctgg catggtatca gcagaaacct
ggaaaggctc ccaagctcct gatttattat gcctcctctc tccaagacgg cgttccatct cggttcagcg gaagcggctc
cgggacggat tacacactga caattagctc tctgcaaccg gaggattttg ctacttacta ctgcctgcaa gactccgaat
acccatggac cttcggtggt ggcaccaaag tggaaatcaa g (SEQ ID NO: 18)

969 gL7 light chain (V + constant): DIQMTQSPSS LSASVGDRVT ITCLASEDIY
DNLAWYQQKP GKAPKLLIYY ASSLQDGVPS RFSGSGSGTD YTLTISSLQP
EDFATYYCLQ DSEYPWTFGG GTKVEIKRTV AAPSVFIFPP SDEQLKSGTA
SVVCLLNNFY PREAKVQWKV DNALQSGNSQ ESVTEQDSKD STYSLSSTLT
LSKADYEKHK VYACEVTHQG LSSPVTKSFN RGEC (SEQ ID NO: 19)

969 gL7 light chain (V + constant): gacatacaga tgactcagtc accctcaagc ctgagtgcca gtgtgggaga
cagggtgaca atcacctgtc tggcctccga ggatatctac gataacctgg catggtatca gcagaaacct ggaaaggctc
ccaagctcct gatttattat gcctcctctc tccaagacgg cgttccatct cggttcagcg gaagcggctc cgggacggat tacacactga
caattagctc tctgcaaccg gaggattttg ctacttacta ctgcctgcaa gactccgaat acccatggac cttcggtggt ggcaccaaag
tggaaatcaa gcgtacggta gcggccccat ctgtcttcat cttcccgcca tctgatgagc agttgaaatc tggaactgcc tctgttgtgt
gcctgctgaa taacttctat cccagagagg ccaaagtaca gtggaaggtg gataacgccc tccaatcggg taactcccag
gagagtgtca cagagcagga cagcaaggac agcacctaca gcctcagcag caccctgacg ctgagcaaag cagactacga
gaaacacaaa gtctacgcct gcgaagtcac ccatcagggc ctgagctcgc ccgtcacaaa gagcttcaac aggggagagt gt
(SEQ ID NO: 20)

969 gL7 light chain (V + constant) with signal sequence underlined and italicized: *MSVPTQVLGL*
*LLLWLTDARC* DIQMTQSPSS LSASVGDRVT ITCLASEDIY DNLAWYQQKP
GKAPKLLIYY ASSLQDGVPS RFSGSGSGTD YTLTISSLQP EDFATYYCLQ
DSEYPWTFGG GTKVEIKRTV AAPSVFIFPP SDEQLKSGTA SVVCLLNNFY
PREAKVQWKV DNALQSGNSQ ESVTEQDSKD STYSLSSTLT LSKADYEKHK
VYACEVTHQG LSSPVTKSFN RGEC (SEQ ID NO: 21)

969 gL7 light chain (V + constant) with signal sequence underlined and italicized:
*atgagcgtgc ctactcaagt cttggggctg ctcttgcttt ggcttaccga cgcaagatgc* gacatacaga tgactcagtc
accctcaagc ctgagtgcca gtgtgggaga cagggtgaca atcacctgtc tggcctccga ggatatctac gataacctgg
catggtatca gcagaaacct ggaaaggctc ccaagctcct gatttattat gcctcctctc tccaagacgg cgttccatct cggttcagcg
gaagcggctc cgggacggat tacacactga caattagctc tctgcaaccg gaggattttg ctacttacta ctgcctgcaa
gactccgaat acccatggac cttcggtggt ggcaccaaag tggaaatcaa gcgtacggta gcggccccat ctgtcttcat
cttcccgcca tctgatgagc agttgaaatc tggaactgcc tctgttgtgt gcctgctgaa taacttctat cccagagagg ccaaagtaca
gtggaaggtg gataacgccc tccaatcggg taactcccag gagagtgtca cagagcagga cagcaaggac agcacctaca
gcctcagcag caccctgacg ctgagcaaag cagactacga gaaacacaaa gtctacgcct gcgaagtcac ccatcagggc
ctgagctcgc ccgtcacaaa gagcttcaac aggggagagtgt (SEQ ID NO: 22)

969 gH2 V-region: EVTLKESGPA LVKPTQTLTL TCTFSGFSLT TYGMGVGWIR
QPPGKALEWL ANIWWDDDKY YNPSLKNRLT ISKDTSKNQV VLTMTNMDPV
DTATYYCARI GPIKYPTAPY RYFDFWGQGT MVTVS (SEQ ID NO: 23)

969 gH2 V-region: gaagtgacac tcaaggagtc tggacccgct ctggtgaaac caacccaaac actcactttg acatgtactt
ttagtggctt ctcattgact acctatggaa tgggcgtggg atggatcaga cagccacctg gcaaggctct ggaatggctg
gccaacatct ggtgggatga cgacaagtac tataacccgt ccctgaaaaa ccggctgacc attagcaagg atacttctaa
aaatcaagtg gtgctgacca tgacaaatat ggatccgtt gacaccgcaa cctactacg cgcccgcatt ggtcccataa
agtaccctac ggcaccttac cgatatttcg acttttgggg ccaagggaca atggttactg tctcg (SEQ ID NO: 24)

969 gH2 V-region with signal sequence underlined and italicized: MEWSWVFLFF LSVTTGVHSE
VTLKESGPAL VKPTQTLTLT CTFSGFSLTT YGMGVGWIRQ PPGKALEWLA
NIWWDDDKYY NPSLKNRLTI SKDTSKNQVV LTMTNMDPVD TATYYCARIG
PIKYPTAPYR YFDFWGQGTM VTVS (SEQ ID NO: 25)

969 gH2 V-region with signal sequence underlined and italicized: atggagtggt cctgggtgtt
*tctgttcttc ctgagtgtga ccaccggggt ccactcc*gaa gtgacactca aggagtctgg acccgctctg gtgaaaccaa
cccaaacact cactttgaca tgtactttta gtggcttctc attgactacc tatggaatgg gcgtgggatg gatcagacag ccacctggca
aggctctgga atggctggcc aacatctggt gggatgacga caagtactat aacccgtccc tgaaaaaccg gctgaccatt
agcaaggata cttctaaaaa tcaagtggtg ctgaccatga caaatatgga tcccgttgac accgcaacct actactgcgc
ccgcattggt cccataaagt accctacggc accttaccga tatttcgact tttggggcca agggacaatg gttactgtct cg (SEQ
ID NO: 26)

969 gH2 heavy chain (V + constant-hu IgG4P): EVTLKESGPA LVKPTQTLTL TCTFSGFSLT
TYGMGVGWIR QPPGKALEWL ANIWWDDDKY YNPSLKNRLT ISKDTSKNQV
VLTMTNMDPV DTATYYCARI GPIKYPTAPY RYFDFWGQGT MVTVSSASTK
GPSVFPLAPC SRSTSESTAA LGCLVKDYFP EPVTVSWNSG ALTSGVHTFP
AVLQSSGLYS LSSVVTVPSS SLGTKTYTCN VDHKPSNTKV DKRVESKYGP
PCPPCPAPEF LGGPSVFLFP PKPKDTLMIS RTPEVTCVVV DVSQEDPEVQ
FNWYVDGVEV HNAKTKPREE QFNSTYRVVS VLTVLHQDWL NGKEYKCKVS
NKGLPSSIEK TISKAKGQPR EPQVYTLPPS QEEMTKNQVS LTCLVKGFYP SDIAVEWESN GQPENNYKTT PPVLDSDGSF FLYSRLTVDK SRWQEGNVFS
CSVMHEALHN HYTQKSLSLSLGK (SEQ ID NO: 27)

969 gH2 heavy chain (V + constant-hu IgG4P, exons underlined):
gaagtgacac tcaaggagtc tggaccegct ctggtgaaac aacccaaac actcactttg acatgtactt ttagtggctt ctcattgact
acctatggaa tgggcgtggg atggatcaga cagccacctg gcaaggctct ggaatggctg gccaacatct ggtgggatga
cgacaagtac tataacccgt ccctgaaaaa ccggctgacc attagcaagg atacttctaa aaatcaagtg gtgctgacca
tgacaaatat ggatcccgtt gacaccgcaa cctactactg cgcccgcatt ggtcccataa agtaccctac ggcaccttac cgatatttcg
acttttgggg ccaagggaca atggttactg tctcgagcgc ttctacaaag gcccatccg tcttcccct ggcgccctgc
tccaggagca cctccgagag cacagccgcc ctgggctgcc tggtcaagga ctacttcccc gaaccggtga cggtgtcgtg
gaactcaggc gccctgacca gcggcgtgca caccttcccg gctgtcctac agtcctcagg actctactcc ctcagcagcg
tggtgaccgt gccctccagc agcttgggca cgaagaccta cacctgcaac gtagatcaca agcccagcaa caccaaggtg
gacaagagag ttggtgagag gccagcacag ggagggaggg tgtctgctgg aagccaggct cagccctcct gcctggacgt
acccccggctg tgcagccca gcccagggca gcaaggcatg cccatctgt ctcctcaccc ggaggcctct gaccacccca
ctcatgccca gggagagggt cttctggatt tttccaccag gctccgggca gccacaggct ggatgcccct accccaggcc
ctgcgcatac aggggcaggt gctgcgctca gacctgccaa ggacctcatc cgggaggacc ctgccctga cctaagccca
ccccaaaggc caaactctcc actccctcag ctcagacacc ttctctcctc ccagatctga gtaactccca atcttctctc tgcagagtcc
aaatatggtc ccccatgccc accatgccca ggtaagccaa cccaggcctc gccctccagc tcaaggcggg acaggtgccc
tagagtagcc tgcatccagg acaggcccc agccgggtgc tgacgcatcc acctccatct cttcctcagc acctgagttc
ctgggggac catcagtctt cctgttcccc ccaaaaccca agcacactct catgatctcc cggacccctg aggtcacgtg
cgtggtggtg gacgtgagcc aggaagaccc cgaggtccag ttcaactggt acgtggatgg cgtggaggtg cataatgcca
agacaaagcc gcgggaggag cagttcaaca gcacgtaccg tgtggtcagc gtcctcaccg tcctgcacca ggactggctg
aacggcaagg agtacaagtg caaggtctcc aacaaaggcc tcccgtcctc catcgagaaa accatctcca aagccaaagg
tgggaccccac ggggtgcgag ggccacatgg acagaggtca gccccgcccc ccctctgccc tggagtgac cgctgtgcca
acctctgtcc ctacagggca gcccgagag ccacaggtgt acaccctgcc ccatcccgag gaggatgaca ccaagaacca
ggtcagcctg acctgcctgg tcaaaggctt ctacccage gacatcgccg tggagtggga gcaatggg cagccggaga
acaactacaa gaccacgcct cccgtgctgg actccgacgg ctccttcttc ctctacagca ggctaaccgt ggacaagagc
aggtggcagg aggggaatgt cttctcatgc tccgtgatgc atgaggctct gcacaaccac tacacacaga gagcctctc
cctgtctctg ggtaaa (SEQ ID NO: 28)

969 gH2 heavy chain (V + constant-hu IgG4P) with signal sequence underlined and italicized:
*MEWSWVFLFF LSVTTGVHSE* VTLKESGPAL VKPTQTLTLT CTFSGFSLTT
YGMGVGWIRQ PPGKALEWLA NIWWDDDKYY NPSLKNRLTI SKDTSKNQVV
LTMTNMDPVD TATYYCARIG PIKYPTAPYR YFDFWGQGTM VTVSSASTKG
PSVFPLAPCS RSTSESTAAL GCLVKDYFPE PVTVSWNSGA LTSGVHTFPA
VLQSSGLYSL SSVVTVPSSS LGTKTYTCNV DHKPSNTKVD KRVESKYGPP
CPPCPAPEFL GGPSVFLFPP KPKDTLMISR TPEVTCVVVD VSQEDPEVQF
NWYVDGVEVH NAKTKPREEQ FNSTYRVVSV LTVLHQDWLN GKEYKCKVSN
KGLPSSIEKT ISKAKGQPRE PQVYTLPPSQ EEMTKNQVSL TCLVKGFYPS
DIAVEWESNG QPENNYKTTP PVLDSDGSFF LYSRLTVDKS RWQEGNVFSC
SVMHEALHNH YTQKSLSLSL GK (SEQ ID NO: 29)

969 gH2 heavy chain (V + constant-hu IgG4P, exons underlined) with signal sequence underlined
and italicized: *atggagtggt cctgggtgtt tctgttcttc ctgagtgtga ccaccggggt ccactcc*gaa gtgacactca
aggagtctgg acccgctctg gtgaaaccaa cccaaacact cactttgaca tgtactttta gtggcttctc attgactacc tatggaatgg
gcgtggggatg gatcagacag ccacctgca aggctctgga atggctgcc aacatctggt gggatgacga caagtactat
aaccccgtccc tgaaaaaccg gctgaccatt agcaaggata cttctaaaaa tcaagtggtg ctgaccatga caaatatgga
tcccgttgac accgcaacct actactgcgc ccgcattggt cccataaagt accctacggc cttaccga tatttcgact tttggggcca
agggacaatg gttactgtct ctgagcgctt ctacaaaggc ccatccgtct tcccccgaag ccctgctcc aggagcacct
ccgagcagca gccgccctg gctgcctggg tcaaggacta cttcccgaa ccggtgacgg tgtcgtgaa ctcaggcgcc
ctgaccagcg gcgtgcacac cttcccggct gtcctacagt cctcaggact ctactccctc agcagcgtgg tgaccgtgcc
ctccagcagc ttgggcacga gacctacac ctgcaacgta gatcacaagc ccagcaacac caaggtggac aagagagttg
gtgagaggcc agcacaggga gggagggtgt ctgctggaag ccaggctcag ccctcctgcc tggaccgcc ccggctgtgc
agccccagcc cagggcagca aggcatgccc atctgtctc tcacccgga ggctctgac cacccactc atgcccaggg
agagggtctt ctggattttt ccaccaggct ccgggcagcc acaggctgga tgcccctacc ccaggccctg cgcatacagg
ggcaggtgct gcgctcagac ctgccaagag ccatatccgg gaggaccctg ccctgacct aagcccaccc caaaggccaa
actctccact ccctcagctc agacaccttc tctcctcca gatctgagta actcccatc tctctgc agagtccaaa tatggtcccc
catgccacc atgcccaggt aagccaaccc aggcctcgcc ctccagtca aggcgggaca ggtgccctag agtagcctgc
atccagggac aggccccagc cgggtgctga cgcatccacc tccatctctt cctcagcacc tgagttcctg ggggaccat
cagtcttcct gttccccca aacccaagg acactctcat gatctcccgg acccctgagg tcacgtgcgt ggtggtggac
gtgagccagg aagaccccga ggtccagttc aactggtacg tggatggcgt ggaggtgcat aatgccaaga caaagccgcg
ggaggagcag ttcaacagca cgtaccgtgt ggtcagcgtc ctcaccgtcc tgcaccagga ctggctgaac ggcaaggagt
acaagtgcaa ggtctccaac aaaggcctcc cgtcctccat cgagaaaacc atctccaaag ccaaaggtgg gacccacggg
gtgcgagggc cacatggaca gaggtcagct cggcccaccc tctgccctgg gagtgaccgc tgtgccaacc tctgtcccta
cagggcagcc ccgagagcca caggtgtaca ccctgccccc atcccaggag gagatgacca gaaccaggt cagcctgacc
tgcctggtca aaggcttcta ccccagcgac atcgccgtgg agtgggagag caatgggcag ccggagaaca actacaagac
cacgcctccc gtgctggact ccgacggctc cttcttcctc tacagcaggc taaccgtgga caagagcagg tggcaggagg
ggaatgtctt ctcatgctcc gtgatgcatg aggctctgca caaccactac acacagaaga gcctctcccc tgtctctggt aaa (SEQ
ID NO: 30)

Human VK1 2-1-(1) 012 JK4 acceptor framework: DIQMTQSPSS LSASVGDRVT
ITCRASQSIS SYLNWYQQKP GKAPKLLIYA ASSLQSGVPS RFSGSGSGTD FTLTISSLQP
EDFATYYCQQ SYSTPLTFGG GTKVEIK (SEQ ID NO: 32)

Human VK1 2-1-(1) 012 JK4 acceptor framework: gacatccaga tgacccagtc tccatcctcc ctgtctgcat
ctgtaggaga cagagtcacc atcacttgcc gggcaagtca gagcattagc agctatttaa attggtatca gcagaaacca
gggaaagccc ctaagctcct gatctatgct gcatccagtt tgcaaagtgg ggtcccatca aggttcagtg gcagtggatc -continued Nucleic Acids, Polypeptides

```
tgggacagat ttcactctca ccatcagcag tctgcaacct gaagattttg caacttacta ctgtcaacag agttacagta cccctctcac
tttcggcgga gggaccaagg tggagatcaa a (SEQ ID NO: 33)

Human VH2 3-1 2-70 JH3 acceptor framework: QVTLKESGPA LVKPTQTLTL TCTFSGFSLS
TSGMRVSWIR QPPGKALEWL ARIDWDDDKF YSTSLKTRLT ISKDTSKNQV
VLTMTNMDPV DTATYYCARI AFDIWGQGTM VTVS (SEQ ID NO: 33)

Human VH2 3-1 2-70 JH3 acceptor framework: caggtcacct tgaaggagtc tggtcctgcg ctggtgaaac
ccacacagac cctcacactg acctgcacct tctctgggtt ctcactcagc actagtggaa tgcgtgtgag ctggatccgt
cagcccccag ggaaggccct ggagtggctt gcacgcattg attgggatga tgataaattc tacagcacat ctctgaagac
caggctcacc atctccaagg acacctccaa aaaccaggtg gtccttacaa tgaccaacat ggaccctgtg gacacagcca
cgtattactg tgcacggata gcttttgata tctggggcca agggacaatg gtcaccgtct ct (SEQ ID NO: 34)

Amino acid sequence for CSF-1R: MGPGVLLLLL VATAWHGQGI PVIEPSVPEL
VVKPGATVTL RCVGNGSVEW DGPPSPHWTL YSDGSSSILS TNNATFQNTG
TYRCTEPGDP LGGSAAIHLY VKDPARPWNV LAQEVVVFED QDALLPCLLT
DPVLEAGVSL VRVRGRPLMR HTNYSFSPWH GFTIHRAKFI QSQDYQCSAL
MGGRKVMSIS IRLKVQKVIP GPPALTLVPA ELVRIRGEAA QIVCSASSVD
VNFDVFLQHN NTKLAIPQQS DFHNNRYQKV LTLNLDQVDF QHAGNYSCVA
SNVQGKHSTS MFFRVVESAY LNLSSEQNLI QEVTVGEGLN LKVMVEAYPG
LQGFNWTYLG PFSDHQPEPK LANATTKDTY RHTFTLSLPR LKPSEAGRYS
FLARNPGGWR ALTFELTLRY PPEVSVIWTF INGSGTLLCA ASGYPQPNVT
WLQCSGHTDR CDEAQVLQVW DDPYPEVLSQ EPFHKVTVQS LLTVETLEHN
QTYECRAHNS VGSGSWAFIP ISAGAHTHPP DEFLFTPVVV ACMSIMALLL
LLLLLLLYKY KQKPKYQVRW KIIESYEGNS YTFIDPTQLP YNEKWEFPRN
NLQFGKTLGA GAFGKVVEAT AFGLGKEDAV LKVAVKMLKS TAHADEKEAL
MSELKIMSHL GQHENIVNLL GACTHGGPVL VITEYCCYGD LLNFLRRKAE
AMLGPSLSPG QDPEGGVDYK NIHLEKKYVR RDSGFSSQGV DTYVEMRPVS
TSSNDSFSEQ DLDKEDGRPL ELRDLLHFSS QVAQGMAFLA SKNCIHRDVA
ARNVLLTNGH VAKIGDFGLA RDIMNDSNYI VKGNARLPVK WMAPESIFDC
VYTVQSDVWS YGILLWEIFS LGLNPYPGIL VNSKFYKLVK DGYQMAQPAF
APKNIYSIMQ ACWALEPTHR PTFQQICSFL QEQAQEDRRE RDYTNLPSSS
RSGGSGSSSS ELEEESSSEH LTCCEQGDIA QPLLQPNNYQ FC (SEQ ID NO: 35)

Amino acid sequence for CSF-1R:
MRHTNYSFSPWHGFTIHRAKFIQSQDYQCSALMGGRKVMSISIRLKVQK (SEQ ID NO:
36)

Amino acid sequence for CSF-1R: (SNP V32G, A245S, H247P, V279M, position underlined)
IPVIEPSVPELVVKPGATVTLRCVGNGSVEWDGPPSPHWTLYSDGSSSILSTNNATFQNT
GTYRCTEPGDPLGGSAAIHLYVKDPARPWNVLAQEVVVFEDQDALLPCLLTDPVLEAG
VSLVRVRGRPLMRHTNYSFSPWHGFTIHRAKFIQSQDYQCSALMGGRKVMSISIRLKVQ
KVIPGPPALTLVPAELVRIRGEAAQIVCSASSVDVNFDVFLQHNNTKLAIHQQSDFHNNR
YQKVLTLNLDQVDFQHAGNYSCVASNVQGKHSTSMFFRVVESAYLNLSSEQNLIQEVT
VGEGLNLKVMVEAYPGLQGFNWTYLGPFSDHQPEPKLANATTKDTYRHTFTLSLPRLK
PSEAGRYSFLARNPGGWRALTFELTLRYPPEVSVIWTFINGSGTLLCAASGYPQPNVTWL
QCSGHTDRCDEAQVLQVWDDPYPEVLSQEPFHKVTVQSLLTVETLEHNQTYECRAHNS
VGSGSWAFIPISAGAHTHPPDE (SEQ ID NO: 37)

MGPGVLLLLL VATAWHGQGI PVIEPSVPEL VVKPGATVTL RCVGNGSVEW
DGPPSPHWTL YSDGSSSILS TNNATFQNTG TYRCTEPGDP LGGSAAIHLY
VKDPARPWNV LAQEVVVFED QDALLPCLLT DPVLEAGVSL VRVRGRPLMR
HTNYSFSPWH GFTIHRAKFI QSQDYQCSAL MGGRKVMSIS IRLKVQKVIP
GPPALTLVPA ELVRIRGEAA QIVCSASSVD VNFDVFLQHN NTKLAIPQQS
DFHNNRYQKV LTLNLDQVDF QHAGNYSCVA SNVQGKHSTS MFFRVVESAY
LNLSSEQNLI QEVTVGEGLN LKVMVEAYPG LQGFNWTYLG PFSDHQPEPK
LANATTKDTY RHTFTLSLPR LKPSEAGRYS FLARNPGGWR ALTFELTLRY
PPEVSVIWTF INGSGTLLCA ASGYPQPNVT WLQCSGHTDR CDEAQVLQVW
DDPYPEVLSQ EPFHKVTVQS LLTVETLEHN QTYECRAHNS VGSGSWAFIP
ISAGAHTHPP DE (SEQ ID NO: 38)
```

CSF-1R

The term "colony stimulating factor-1 receptor" or "CSF1R" as used herein refers to a tyrosine-protein kinase that acts as cell-surface receptor for CSF1 and interleukin 34 (IL34) and plays an essential role in the regulation of survival, proliferation and differentiation of hematopoietic precursor cells, especially mononuclear phagocytes, such as macrophages and monocytes. It promotes the release of proinflammatory chemokines in response to IL34 and CSF1, and thereby plays an important role in innate immunity and in inflammatory processes. CSF1R also plays an important role in the regulation of osteoclast proliferation and differentiation, the regulation of bone resorption, and is required for normal bone and tooth development. CSF1R is required for normal male and female fertility, and for normal development of milk ducts and acinar structures in the mammary gland during pregnancy. It also promotes reorganization of the actin cytoskeleton, regulates formation of membrane ruffles, cell adhesion and cell migration, and promotes cell invasion.

CSF1 is a cytokine that controls the production, differentiation, and function of macrophages, and CSF1R mediates most if not all of the biological effects of this cytokine.

The term "Ab969.g2" as used herein means an antibody specifically binding to CSF1-R and comprises (a) a light chain comprising CDR1, CDR2 and CDR3 as defined in SEQ ID NO: 1, SEQ ID NO: 2 and SEQ ID NO: 3, respectively, and (b) a heavy chain comprising CDR1, CDR2, and CDR3 as defined in SEQ ID NO: 4, SEQ ID NO: 5 and SEQ ID NO: 6, respectively. This Ab969.g2 antibody has been previously described in PCT/EP2014/068050.

The term "specifically binds to CSF1R", "specifically binding to CSF1R", and equivalents as used herein when referring to an antibody means the antibody will bind to CSF1R with sufficient affinity and specificity to achieve a biologically meaningful effect. The antibody selected will normally have a binding affinity for CSF1R, for example, the antibody may bind CSF1R with a Kd value of between 100 nM and 1 pM. Antibody affinities may be determined by a surface plasmon resonance bases assay, such as the BIAcore assay; enzyme-linked immunoabsorbent assay (ELISA); and competition assays (e.g. RIA's), for example. Within the meaning of the present invention an antibody specifically binding to CSF1R, may also bind to another molecule; such as by way of a non-limiting example in the case of a bispecific antibody.

Formulations and Methods of Treatment

Any antibody (e.g., an anti-CSF-1R antibody or anti-CSF-1 antibody) disclosed herein can be used for the methods, kits, or compositions of the disclosure.

In some embodiments, a pharmaceutical composition of the disclosure comprises an anti-CSF-1R antibody or anti-CSF-1 antibody or antigen binding fragment thereof or an inhibitor of CSF-1R activity and a pharmaceutically acceptable carrier.

In certain embodiments, the combinations described herein are used for treating a skin condition. In some embodiments, the method is directed to the use of an anti-CSF-1R antibody, or binding fragment thereof, for the treatment of systemic scleroderma, generalized scleroderma, localized scleroderma, morphea scleroderma, linear scleroderma, CREST syndrome, diffuse scleroderma, Circumscribed Morphea, Calcinosis, Raynaud's phenomenon, Esophageal dysmotility, Sclerodactyly, Telangiectasias, Sine Sclerosis and/or diffuse scleroderma.

In some embodiments, the method is directed to the use of an anti-CSF-1R antibody, or binding fragment thereof, for the treatment of acute graft versus host disease (aGvHD). In some embodiments, the method is directed to the use of an anti-CSF-1R antibody, or binding fragment thereof, for the treatment of chronic graft versus host disease (cGvHD).

In some embodiments, the method of treating a human patient identified as having cGVHD comprises determining the initial level of classical monocytes in the patient. In some embodiments, the method of treating a human patient identified as having cGVHD comprises determining the initial level of classical monocytes in the patient followed by administering an effective dose of axatilimab or an anti-CSF-1R antibody; and determining a second level of classical monocytes in a subsequent time period. In some embodiments, the method of treating a human patient identified as having cGVHD comprises determining the initial level of classical monocytes in the patient followed by administering an effective dose of axatilimab or an anti-CSF-1R antibody; and determining a second level of classical monocytes in a subsequent time period, and continue treatment with the axatilimab or anti-CSF-1R antibody if the second classical monocyte level is greater than a pre-determined percentage. In some embodiments, the method of treating a human patient identified as having cGVHD comprises determining the initial level of classical monocytes in the patient followed by administering an effective dose of axatilimab or an anti-CSF-1R antibody; and determining a second level of classical monocytes in a subsequent time period, and continue treatment with the axatilimab or anti-CSF-1R antibody if the ratio between the initial classical monocyte level and the second classical monocyte level is greater than a pre-determined percentage. In some embodiments, the present application is directed to a method of treating cGVHD comprising treating a patient in need thereof with a therapeutically effective amount of axatilimab, wherein the axatilimab targets the pathogenic monocyte derived macrophages. In some embodiments, the present application is directed to a method of treating cGVHD comprising treating a patient in need thereof with a therapeutically effective amount of axatilimab, wherein the axatilimab targets the pathogenic monocyte derived macrophages and minimally impacts the non-classical monocytes. In some embodiments, the present application is directed to a method of treating cGVHD comprising treating a patient in need thereof with a therapeutically effective amount of axatilimab, wherein the axatilimab targets the pathogenic monocyte derived macrophages and minimally impacts the intermediate monocytes.

A method for treating graft versus host disease (GvHD) in a human, comprising administering to a human in need thereof axatilimab or anti-CSF-1R antibody, wherein the antibody is administered at a dosage determined by the level of circulating classical monocytes. A method for treating graft versus host disease (GvHD) in a human, comprising administering to a human in need thereof axatilimab or anti-CSF-1R antibody, wherein the antibody is administered at a dosage determined by the level of circulating intermediate monocytes. A method for treating graft versus host disease (GvHD) in a human, comprising administering to a human in need thereof axatilimab or anti-CSF-1R antibody, wherein the antibody is administered at a dosage determined by the level of circulating non-classical monocytes.

The terms "treat," "treating," and "treatment" are meant to include alleviating or abrogating a disorder, disease, or condition; or one or more of the symptoms associated with the disorder, disease, or condition; or alleviating or eradicating the cause(s) of the disorder, disease, or condition itself. As used herein, "preventing" or "prevent" describes reducing or eliminating the onset of the symptoms or complications of the disease, condition or disorder.

As used herein, the term "alleviate" is meant to describe a process by which the severity of a sign or symptom of a disorder is decreased. Importantly, a sign or symptom can be alleviated without being eliminated. In a preferred embodiment, the administration of pharmaceutical compositions disclosed herein leads to the elimination of a sign or symptom, however, elimination is not required. Effective dosages are expected to decrease the severity of a sign or symptom. For instance, a sign or symptom of a disorder such as cGVHD, which can occur in multiple locations, is alleviated if the severity of the cGVHD is decreased within at least one of multiple locations.

Treating the conditions listed herein can result in preventing the occurrence of the conditions described herein, including chronic graft versus host disease (cGVHD) or reducing the severity of cGVHD. A reduction in symptoms may also be referred to as "regression". Preferably, after treatment, severity is reduced by 5% or greater relative to prior to treatment; more preferably, severity is reduced by 10% or greater; more preferably, reduced by 20% or greater; more preferably, reduced by 30% or greater; more preferably, reduced by 40% or greater; even more preferably, reduced by 50% or greater; and most preferably, reduced by greater than 75% or greater. Severity may be measured by any reproducible means of measurement. The severity may be measured as a diameter of the area of interest or according to various physician scales.

A "pharmaceutical composition" or "therapeutic composition" is a formulation containing the active ingredient, such as an anti-CSF-1R antibody or anti-CSF-1 antibody or antigen binding fragment thereof or inhibitor of CSF-1R activity disclosed herein in a form suitable for administration to a subject. In some embodiments, the pharmaceutical composition is in bulk or in unit dosage form. The unit dosage form is any of a variety of forms, including, for example, a capsule, an IV bag, a tablet, a single pump on an aerosol inhaler or a vial. The quantity of active ingredient (e.g., a formulation of the disclosed compound or salt, hydrate, solvate or isomer thereof) in a unit dose of composition is an effective amount and is varied according to the particular treatment involved. One skilled in the art will appreciate that it is sometimes necessary to make routine variations to the dosage depending on the age and condition of the patient. The dosage will also depend on the route of administration. A variety of routes are contemplated, including oral, pulmonary, rectal, parenteral, transdermal, subcutaneous, intravenous, intramuscular, intraperitoneal, inhalational, buccal, sublingual, intrapleural, intrathecal, intranasal, and the like. Dosage forms for the topical or transdermal administration of a compound of this disclosure include powders, sprays, ointments, pastes, creams, lotions, gels, solutions, patches and inhalants. In one embodiment, the active compound is mixed under sterile conditions with a pharmaceutically acceptable carrier, and with any preservatives, buffers, or propellants that are required.

"Active ingredient" as employed herein refers to an ingredient with a pharmacological effect, such as a therapeutic effect, at a relevant dose.

"Pharmaceutically acceptable carrier" means a carrier that is useful in preparing a pharmaceutical composition that is generally safe, non-toxic and neither biologically nor otherwise undesirable, and includes excipient that is acceptable for veterinary use as well as human pharmaceutical use. For example, the pharmaceutically acceptable carrier should not itself induce the production of antibodies harmful to the individual receiving the composition and should not be toxic. Suitable carriers may be large, slowly metabolised macromolecules such as proteins, polypeptides, liposomes, polysaccharides, polylactic acids, polyglycolic acids, polymeric amino acids, amino acid copolymers and inactive virus particles.

Pharmaceutically acceptable salts can be used, for example mineral acid salts, such as hydrochlorides, hydrobromides, phosphates and sulphates, or salts of organic acids, such as acetates, propionates, malonates and benzoates.

Pharmaceutically acceptable carriers in therapeutic compositions may additionally contain liquids such as water, saline, glycerol and ethanol. Additionally, auxiliary substances, such as wetting or emulsifying agents or pH buffering substances, may be present in such compositions. Such carriers enable the pharmaceutical compositions to be formulated as tablets, pills, dragees, capsules, liquids, gels, syrups, slurries and suspensions, for ingestion by the patient.

Suitable forms for administration include forms suitable for parenteral administration, e.g. by injection or infusion, for example by bolus injection or continuous infusion. Where the product is for injection or infusion, it may take the form of a suspension, solution or emulsion in an oily or aqueous vehicle and it may contain formulatory agents, such as suspending, preservative, stabilizing and/or dispersing agents. Alternatively, the antibody molecule may be in dry form, for reconstitution before use with an appropriate sterile liquid.

Once formulated, the compositions of the disclosure can be administered directly to the subject.

In certain embodiments, the pH of the final formulation is not similar to the value of the isoelectric point (pI) of the antibody or fragment, for example if the pH of the formulation is 7 then a pI of from 8-9 or above may be appropriate. Whilst not wishing to be bound by theory it is thought that this may ultimately provide a final formulation with improved stability, for example the antibody or fragment remains in solution.

In one example, the pharmaceutical formulation at a pH in the range of 4.0 to 7.0 comprises: 1 to 200 mg/mL of an antibody according to the present disclosure, 1 to 100 mM of a buffer, 0.001 to 1% of a surfactant, a) 10 to 500 mM of a stabilizer, b) 10 to 500 mM of a stabilizer and 5 to 500 mM of a tonicity agent, or c) 5 to 500 mM of a tonicity agent.

The pharmaceutical compositions of this disclosure may be administered by any number of routes including, but not limited to, oral, intravenous, intramuscular, intra-arterial, intramedullary, intrathecal, intraventricular, transdermal, transcutaneous (for example, see WO98/20734), subcutaneous, intraperitoneal, intranasal, enteral, topical, sublingual, intravaginal or rectal routes. Hyposprays may also be used to administer the pharmaceutical compositions of the disclosure. Typically, the therapeutic compositions may be prepared as injectables, either as liquid solutions or suspensions. Solid forms suitable for solution in, or suspension in, liquid vehicles prior to injection may also be prepared.

Direct delivery of the compositions will generally be accomplished by injection, subcutaneously, intraperitoneally, intravenously or intramuscularly, or delivered to the interstitial space of a tissue. The compositions can also be administered into a lesion. Dosage treatment may be a single dose schedule or a multiple dose schedule.

It will be appreciated that the active ingredient in the composition will be an antibody molecule. As such, it will be susceptible to degradation in the gastrointestinal tract. Thus, if the composition is to be administered by a route using the gastrointestinal tract, the composition will need to contain agents which protect the antibody from degradation but which release the antibody once it has been absorbed from the gastrointestinal tract.

A thorough discussion of pharmaceutically acceptable carriers is available in Remington's Pharmaceutical Sciences (Mack Publishing Company, N.J. 1991).

In one embodiment the formulation is provided as a formulation for topical administrations including inhalation.

Suitable inhalable preparations include inhalable powders, metering aerosols containing propellant gases or inhalable solutions free from propellant gases. Inhalable powders according to the disclosure containing the active substance may consist solely of the abovementioned active substances or of a mixture of the abovementioned active substances with physiologically acceptable excipient.

These inhalable powders may include monosaccharides (e.g. glucose or arabinose), disaccharides (e.g. lactose, saccharose, and maltose), oligo- and polysaccharides (e.g. dextrans), polyalcohols (e.g. sorbitol, mannitol, and xylitol), salts (e.g. sodium chloride, calcium carbonate) or mixtures of these with one another. Mono- or disaccharides are suitably used, the use of lactose or glucose, particularly but not exclusively in the form of their hydrates.

Particles for deposition in the lung require a particle size less than 10 microns, such as 1-9 microns for example from 0.1 to 5 µm, in particular from 1 to 5 µm. The particle size of the active ingredient (such as the antibody or fragment) is of primary importance.

The propellent gases which can be used to prepare the inhalable aerosols are known in the art. Suitable propellent gases are selected from among hydrocarbons such as n-propane, n-butane or isobutane and halohydrocarbons such as chlorinated and/or fluorinated derivatives of methane, ethane, propane, butane, cyclopropane or cyclobutane. The abovementioned propellent gases may be used on their own or in mixtures thereof.

Particularly suitable propellent gases are halogenated alkane derivatives selected from among TG 11, TG 12, TG 134a and TG227. Of the abovementioned halogenated hydrocarbons, TG134a (1,1,1,2-tetrafluoroethane) and TG227 (1,1,1,2,3,3,3-heptafluoropropane) and mixtures thereof are particularly suitable.

The propellent-gas-containing inhalable aerosols may also contain other ingredients such as cosolvents, stabilizers, surface-active agents (surfactants), antioxidants, lubricants and means for adjusting the pH. All these ingredients are known in the art. The propellant-gas-containing inhalable aerosols according to the disclosure may contain up to 5% by weight of active substance. Aerosols according to the disclosure contain, for example, 0.002 to 5% by weight, 0.01 to 3% by weight, 0.015 to 2% by weight, 0.1 to 2% by weight, 0.5 to 2% by weight or 0.5 to 1% by weight of active ingredient.

Alternatively topical administrations to the lung may also be by administration of a liquid solution or suspension formulation, for example employing a device such as a nebulizer, for example, a nebulizer connected to a compressor (e.g., the Pari LC-Jet Plus® nebulizer connected to a Pari Master® compressor manufactured by Pari Respiratory Equipment, Inc., Richmond, Va.).

The antibody of the disclosure can be delivered dispersed in a solvent, e.g., in the form of a solution or a suspension. It can be suspended in an appropriate physiological solution, e.g., saline or other pharmacologically acceptable solvent or a buffered solution. Buffered solutions known in the art may contain 0.05 mg to 0.15 mg disodium edetate, 8.0 mg to 9.0 mg NaCl, 0.15 mg to 0.25 mg polysorbate, 0.25 mg to 0.30 mg anhydrous citric acid, and 0.45 mg to 0.55 mg sodium citrate per 1 ml of water so as to achieve a pH of about 4.0 to 5.0. A suspension can employ, for example, lyophilized antibody.

The therapeutic suspensions or solution formulations can also contain one or more excipients. Excipients are well known in the art and include buffers (e.g., citrate buffer, phosphate buffer, acetate buffer and bicarbonate buffer), amino acids, urea, alcohols, ascorbic acid, phospholipids, proteins (e.g., serum albumin), EDTA, sodium chloride, liposomes, mannitol, sorbitol, and glycerol. Solutions or suspensions can be encapsulated in liposomes or biodegradable microspheres. The formulation will generally be provided in a substantially sterile form employing sterile manufacture processes.

This may include production and sterilization by filtration of the buffered solvent/solution used for the formulation, aseptic suspension of the antibody in the sterile buffered solvent solution, and dispensing of the formulation into sterile receptacles by methods familiar to those of ordinary skill in the art.

Nebulizable formulation according to the present disclosure may be provided, for example, as single dose units (e.g., sealed plastic containers or vials) packed in foil envelopes. Each vial contains a unit dose in a volume, e.g., 2 mL, of solvent/solution buffer.

The antibodies disclosed herein may be suitable for delivery via nebulization.

It is also envisaged that the antibody of the present disclosure may be administered by use of gene therapy. In order to achieve this, DNA sequences encoding the heavy and light chains of the antibody molecule under the control of appropriate DNA components are introduced into a patient such that the antibody chains are expressed from the DNA sequences and assembled in situ.

The pharmaceutical compositions suitably comprise a therapeutically effective amount of the anti-CSF-1R antibody or anti-CSF-1 antibody or antigen binding fragment thereof or inhibitor of CSF-1R activity. The term "therapeutically effective amount" as used herein refers to an amount of a therapeutic agent needed to treat, ameliorate or prevent a targeted disease or condition, or to exhibit a detectable therapeutic, pharmacological or preventative effect. For example, for any antibody disclosed herein, the therapeutically effective amount can be estimated initially either in cell culture assays, e.g., of neoplastic cells, or in animal models, usually rats, mice, rabbits, dogs, pigs or primates. The animal model may also be used to determine the appropriate concentration range and route of administration. Such information can then be used to determine useful doses and routes for administration in humans.

Therapeutic/prophylactic efficacy and toxicity may be determined by standard pharmaceutical procedures in cell cultures or experimental animals, e.g., $ED_{50}$ (the dose therapeutically effective in 50% of the population) and $LD_{50}$ (the dose lethal to 50% of the population). The dose ratio between toxic and therapeutic effects is the therapeutic index, and it can be expressed as the ratio, $LD_{50}/ED_{50}$. Pharmaceutical compositions that exhibit large therapeutic indices are preferred. The dosage may vary within this range depending upon the dosage form employed, sensitivity of the patient, and the route of administration.

Dosage and administration are adjusted to provide sufficient levels of the active agent(s) or to maintain the desired effect. Factors which may be taken into account include the severity of the disease state, general health of the subject, age, weight, and gender of the subject, diet, time and frequency of administration, drug interaction(s), reaction sensitivities, and tolerance/response to therapy. Generally, the dose should be sufficient to result in slowing, and preferably regressing the severity of the condition. Dosages can range from about 0.01 mg/kg per day to about 10 mg/kg per day. In some embodiments, dosages can range from about 0.1 mg/kg, 0.5 mg/kg, 1 mg/kg, 1.5 mg/kg, or 3 mg/kg. In some embodiments, the dose will be in the range of about 0.1 mg/day to about 5 mg/kg. Pharmaceutical compositions may be conveniently presented in unit dose forms containing a predetermined amount of an active agent of the disclosure per dose.

Therapeutic doses of the antibodies (e.g., anti-CSF-1R antibodies or anti-CSF-1 antibody) according the present disclosure show no apparent or limited toxicology effects in vivo.

In certain embodiments, the axatilimab or anti-CSF-1R antibody is administered every day, every other day, every week, every 2 weeks, 3 weeks, 4 weeks, 5 weeks, 6 weeks, 7 weeks, 8 weeks, 9 weeks, 10 weeks, 11 weeks, 12 weeks, 13 weeks, 14 weeks, 15 weeks, 16 weeks, 17 weeks, 18 weeks, 19 weeks, or every 20 weeks, or every month.

The term "antibody" is used according to its commonly known meaning in the art. The antibody molecules of the present disclosure may comprise a complete antibody molecule having full length heavy and light chains or a binding fragment thereof and may be, but are not limited to Fab, modified Fab, Fab', modified Fab', F(ab')$_2$, Fv, single domain antibodies (e.g. VH or VL or VHH), scFv, bi, tri or tetravalent antibodies, Bis-scFv, diabodies, triabodies, tetrabodies and epitope-binding fragments of any of the above (see for example Holliger and Hudson, 2005, Nature Biotech. 23(9):1126-1136; Adair and Lawson, 2005, Drug Design Reviews—Online 2(3), 209-217). The methods for creating and manufacturing these antibody fragments are well known in the art (see for example Verma et al., 1998, Journal of Immunological Methods, 216:165-181). Other antibody fragments for use in the present disclosure include the Fab and Fab' fragments described in International patent applications WO05/003169, WO05/003170 and WO05/003171. Multi-valent antibodies may comprise multiple specificities e.g. bispecific or may be monospecific (see for example WO92/22853, WO05/113605, WO2009/040562 and WO2010/035012).

Binding fragment of an antibody as employed herein refers to a fragment capable of binding an antigen with affinity to characterize the fragment as specific for the antigen.

In one embodiment the antibody according to the present disclosure is provided as CSF-1R binding antibody fusion protein which comprises an immunoglobulin moiety, for example a Fab or Fab' fragment, and one or two single domain antibodies (dAb) linked directly or indirectly thereto, for example as described in WO2009/040562, WO2010/035012, WO2011/030107, WO2011/061492 and WO2011/086091, all incorporated herein by reference.

In some embodiments, the fusion protein comprises two domain antibodies, for example as a variable heavy (VH) and variable light (VL) pairing, optionally linked by a disulfide bond. In some embodiments, the Fab or Fab' element of the fusion protein has the same or similar specificity to the single domain antibody or antibodies. In one embodiment the Fab or Fab' has a different specificity to the single domain antibody or antibodies, that is to say the fusion protein is multivalent. In one embodiment a multivalent fusion protein according to the present disclosure has an albumin binding site, for example a VH/VL pair therein provides an albumin binding site. The constant region domains of the antibody molecule of the present disclosure, if present, may be selected having regard to the proposed function of the antibody molecule, and in particular the effector functions which may be required. For example, the constant region domains may be human IgA, IgD, IgE, IgG or IgM domains. In particular, human IgG constant region domains may be used, especially of the IgG1 and IgG3 isotypes when the antibody molecule is intended for therapeutic uses and antibody effector functions are required. Alternatively, IgG2 and IgG4 isotypes may be used when the antibody molecule is intended for therapeutic purposes and antibody effector functions are not required.

It will also be understood by one skilled in the art that antibodies may undergo a variety of posttranslational modifications. The type and extent of these modifications often depends on the host cell line used to express the antibody as well as the culture conditions. Such modifications may include variations in glycosylation, methionine oxidation, diketopiperazine formation, aspartate isomerization and asparagine deamidation. A frequent modification is the loss of a carboxy-terminal basic residue (such as lysine or arginine) due to the action of carboxypeptidases (as described in Harris, R J. *Journal of Chromatography* 705: 129-134, 1995). Accordingly, the C-terminal lysine of the antibody heavy chain may be absent.

As used herein, the term 'humanized antibody refers to an antibody or antibody molecule wherein the heavy and/or light chain contains one or more CDRs (including, if desired, one or more modified CDRs) from a donor antibody (e.g. a murine monoclonal antibody) grafted into a heavy and/or light chain variable region framework of an acceptor antibody (e.g. a human antibody) (see, e.g. U.S. Pat. No. 5,585,089; WO91/09967). For a review, see Vaughan et al, Nature Biotechnology, 16, 535-539, 1998. In one embodiment rather than the entire CDR being transferred, only one or more of the specificity determining residues from any one of the CDRs described herein above are transferred to the human antibody framework (see for example, Kashmiri et al., 2005, Methods, 36:25-34). In one embodiment only the specificity determining residues from one or more of the CDRs described herein above are transferred to the human antibody framework. In another embodiment only the specificity determining residues from each of the CDRs described herein above are transferred to the human antibody framework. When the CDRs or specificity determining residues are grafted, any appropriate, acceptor variable region framework sequence may be used having regard to the class/type of the donor antibody from which the CDRs are derived, including mouse, primate and human framework regions.

As used herein, the terms "approximately" and "about," as applied to one or more values of interest, refer to a value that is similar to a stated reference value. In certain embodiments, the term "approximately" or "about" refers to a range of values that fall within 25%, 20%, 19%, 18%, 17%, 16%, 15%, 14%, 13%, 12%, 11%, 10%, 9%, 8%, 7%, 6%, 5%, 4%, 3%, 2%, 1%, or less in either direction (greater than or less than) of the stated reference value unless otherwise stated or otherwise evident from the context (except where such number would exceed 100% of a possible value). For example, when used in the context of an amount of a given compound in a lipid component of a nanoparticle composition, "about" may mean+/−10% of the recited value.

Articles used in the claims and description, such as "a," "an," and "the," may mean one or more than one unless indicated to the contrary or otherwise evident from the context. Claims or descriptions that include "or" between one or more members of a group are considered satisfied if one, more than one, or all of the group members are present in, employed in, or otherwise relevant to a given product or process unless indicated to the contrary or otherwise evident from the context. The disclosure includes embodiments in which exactly one member of the group is present in, employed in, or otherwise relevant to a given product or process. The disclosure includes embodiments in which more than one, or all, of the group members are present in, employed in, or otherwise relevant to a given product or process.

Treatment" or "treating" is an approach for obtaining beneficial or desired results including clinical results. Beneficial or desired clinical results may include one or more of the following: decreasing one more symptoms resulting from the disease; (ii) diminishing the extent of the disease and/or stabilizing the disease (e.g., delaying the worsening of the disease); (iii) delaying the spread of the disease; (iv) delaying or slowing the onset or recurrence of the disease and/or the progression of the disease; (v) ameliorating the disease state and/or providing a remission (whether partial or total) of the disease and/or decreasing the dose of one or more other medications required to treat the disease; (vi) increasing the quality of life, and/or (vii) prolonging survival.

"Delaying" the development of a disease or condition means to defer, hinder, slow, retard, stabilize, and/or postpone development of the disease or condition. This delay can be of varying lengths of time, depending on the history of the disease or condition, and/or subject being treated. A method that "delays" development of a disease or condition is a method that reduces probability of disease or condition development in a given time frame and/or reduces the extent of the disease or condition in a given time frame, when compared to not using the method. Such comparisons are typically based on clinical studies, using a statistically significant number of subjects. Disease or condition development can be detectable using standard methods, such as routine physical exams, mammography, imaging, or biopsy. Development may also refer to disease or condition progression that may be initially undetectable and includes occurrence, recurrence, and onset.

It is also noted that the term "comprising" is intended to be open and permits but does not require the inclusion of additional elements or steps. When the term "comprising" is used herein, the terms "consisting essentially of" and "consisting of" are thus also encompassed and disclosed. Throughout the description, where compositions or combinations are described as having, including, or comprising specific components or steps, it is contemplated that compositions or combinations also consist essentially of, or consist of, the recited components. Similarly, where methods or processes are described as having, including, or comprising specific process steps, the processes also consist essentially of, or consist of, the recited processing steps. Further, it should be understood that the order of steps or order for performing certain actions is immaterial so long as the invention remains operable. Moreover, two or more steps or actions can be conducted simultaneously.

Where ranges are given, endpoints are included. Furthermore, it is to be understood that unless otherwise indicated or otherwise evident from the context and understanding of one of ordinary skill in the art, values that are expressed as ranges can assume any specific value or sub-range within the stated ranges in different embodiments of the disclosure, to the tenth of the unit of the lower limit of the range, unless the context clearly dictates otherwise.

Where technically appropriate, embodiments of the invention may be combined. Any embodiments specifically and explicitly recited herein may form the basis of a disclaimer either alone or in combination with one or more further embodiments.

All publications and patent documents cited herein are incorporated herein by reference as if each such publication or document was specifically and individually indicated to be incorporated herein by reference. Citation of publications and patent documents is not intended as an admission that any is pertinent prior art, nor does it constitute any admission as to the contents or date of the same.

EXAMPLES

The following examples are included to demonstrate embodiments of the present invention. Those of skill in the art will appreciate that changes to the specific embodiments described herein can be made and still obtain a like result without departing from the spirit and scope of the invention.

Example 1: Safety and Efficacy of Axatilimab in the Treatment of cGVHD

Clinical trial evaluated the safety and preliminary efficacy of the anti-CSF-1R (Ab535; axatilimab) in up to 30 patients with chronic graft versus host disease (cGVHD) who have received at least two prior lines of therapy. All patients tested received prior treatment with ibrutinib, steroids, and a calcineurin inhibitor, have been enrolled across three dose cohorts: one patient was treated at 0.15 mg/kg every two weeks (Q2W, Cohort 1), one is receiving a dose of 0.5 mg/kg Q2W (Cohort 2), and three patients are receiving 1.0 mg/kg Q2W (Cohort 3).

Responses have been observed in all evaluable patients as of the data cutoff date, with no dose limiting toxicity (DLT) reported. Among the three patients dosed in Cohort 3 (1 mg/kg Q2W), one patient recently cleared the DLT period, two patients experienced a partial response, and all three patients remain on therapy. The patient in Cohort 2 experienced a partial response and is currently in their ninth month of treatment with the anti-CSF-1R antibody or antigen binding fragment thereof, after having had prior treatment with ibrutinib and both Jakafi® (ruxolitinib) and KD025, two agents currently being investigated for the treatment of cGVHD. The first patient (Cohort 1) achieved a short-lived partial response but subsequently discontinued due elevated liver function tests (LFTs) attributed to progression in their liver cGVHD. Cohort 4, which will explore a 3 mg/kg Q2W dose is now open for enrollment.

Data demonstrates that CSF-1R blockade can prevent and treat disease in animal models of cGVHD. The initial data provides the first clinical evidence that targeting CSF-1R dependent macrophages may benefit patients with cGVHD. To date, the anti-CSF-1R antibody or antigen binding fragment thereof, has been safe and well-tolerated, with no dose-limiting toxicities observed. Dose escalation is ongoing in the Phase 1 portion of the trial. The preferable initial dosing schedule is 1 mg/kg of the axatilimab anti-CSF-1R antibody or antigen binding fragment thereof, administered every two weeks.

The initial results from this trial underscore the potential of the anti-CSF-1R antibody or antigen binding fragment thereof, to serve as an effective therapy for patients with cGVHD, in need of effective alternatives. It is quite encouraging to see the early signs of activity in patients with this difficult to treat disease. Additional patients are evaluated at 1 mg/kg and 3 mg/kg.

Example 2. Study of Axatilimab (SNDX-6352), a CSF-1R Humanized Antibody, for Chronic Graft-Versus-Host Disease after 2 or More Lines of Systemic Treatment Chronic graft versus host disease (cGVHD) is a major cause of morbidity and late non-relapse mortality after allogeneic hematopoietic cell transplantation and is commonly associated with prolonged immune suppression. Patients (pts) with inadequate response to steroids have few effective therapeutic options and represent an unmet medical need. Available therapies are associated with significant toxicity, immunosuppression, and increased risk of infections. Preclinical studies demonstrate that CSF-1/CSF-1R is a key regulatory pathway involved in the expansion and infiltration of donor-derived macrophages that mediate cGVHD. Axatilimab (axa) is a humanized, full-length IgG4 antibody with high affinity to CSF-1R. Without being bound to any theory, axatilimab affects the migration, proliferation, differentiation, and survival of monocytes and macrophages by binding to CSF-1R and blocking its activation by its two known ligands, CSF-1 and IL-34. It offers a novel therapeutic option for treatment of these patients.

Methods: The Phase ½ dose-escalation and dose-expansion study evaluating safety, tolerability, pharmacokinetics (PK)/pharmacodynamics (PD), and efficacy of axatilimab in pts >6 years of age with active symptomatic cGVHD despite ≥2 prior lines of therapy. The Phase 1 endpoints were safety, tolerability, PK and PD with the primary objective of defining optimal biologic dose; the primary endpoint of the Phase 2 study is overall response rate (CR+PR) by 6 months. Patients were dosed in 28-day cycles.

Results: Twelve patients have been enrolled in the Phase 1 study. Median age at enrollment was 58 y (range, 29-73 y), 8 patients were male. Patients had failed a median of 5 prior lines of treatment (range 4-9). Doses included 0.15 mg/kg (n=1), 0.5 mg/kg (n=1), 1 mg/kg (n=3), 3 mg/kg (n=6) every 2 weeks (q2w), and 3 mg/kg q4w (n=1). Of these, 5 pts (42%) are still receiving axatilimab. The median number of cycles for all patients is 5 (range 1-12). Of the 3 patients whose starting dose was 3 mg/kg q2w and remain on study, 2 dose reduced; one to 2 mg/kg q4w and one to 1 mg/kg q2w. Seven patients (58%) discontinued due to: adverse events (3 mg/kg q2w, n=2); death due to traumatic fall (1 mg/kg q2w, n=1); investigator decision (0.5 mg/kg q2w, n=1); progressive cGVHD (1 and 0.15 mg/kg q2w, n=1 each); and non-compliance (3 mg/kg q2w, n=1).

Two of 6 pts (17%) at a dose of 3 mg/kg q2w reported a treatment emergent adverse event that was considered a dose limiting toxicity (DLT): 1 with CTCAE Grade 4 creatine kinase increase with symptoms of myositis after dose 1, and the $2^{nd}$ with an elevation in amylase/lipase that delayed the 3rd dose for >2 weeks. The latter patients restarted therapy at 1 mg/kg q2w and remains on treatment after 5 cycles.

Four patients (1 at 0.15 mg/kg and 3 at 3 mg/kg q2w, 33%) had a related treatment emergent adverse event that was ≥Grade 3: increase in aspartate aminotransferase (n=2); increase in creatine phosphokinase (n=2); and increase in gamma-glutamyl transferase (n=2). Such biochemical elevations may be a consequence of CSF-1R blockade on Kupffer cells leading to an inhibition in the clearance of these enzymes, consistent with the mechanism of action of axa and when asymptomatic have not been associated with clinical manifestations of hepatitis, pancreatitis, or rhabdomyolysis. Periorbital edema was observed in 2 pts (≤Grade 2); no additional CSF-1Ri class-effect associated TEAEs were observed.

Clinical responses as defined by the 2014 NIH cGVHD Consensus Criteria have been observed in 7 pts (58%) across all dose levels; median time to response was 12 weeks. Organ-specific responses have been observed in esophagus (n=1/1), eyes (n=3/10), joints/fascia (n=5/9), mouth (n=1/7), and skin (n=3/8). Prior therapies received by the responders included ibrutinib (6 pts), ruxolitinib (5 pts), and KD025 (3 pts); 3 of the responding patients had received all of these. Six patients (50%) reported at least a 7-point improvement in the Lee Symptom Score. Preliminary PK profiles and pharmacodynamic endpoints, including circulating $CD14^+$ $CD16^+$ nonclassical and $CD14^{++}CD16^+$ intermediate monocyte kinetics, are consistent with those observed in healthy volunteers and patients.

Conclusions: These data demonstrate that axatilimab is clinically active with acceptable safety profile and responses observed in patients with active cGVHD. The study is progressing at 3 mg/kg q4w and Phase 2 study at a dose of 1 mg/kg q2w.

Example 3: Clinical Trial for Axatilimab (Ab535)

While the pathophysiological understanding of cGVHD is emerging, there has been little meaningful development of therapies for patients with cGVHD. Currently, there remains a longstanding reliance on prednisone as the mainstay of treatment. Steroid administration can relieve symptoms and delay disease progression; however, this approach is associated with significant toxicity and emergence of resistance (Flowers and Martin 2015, MacDonald 2017). An effort to decrease corticosteroid doses has led to their use in combination with other immunosuppressants, such as cyclosporine, tacrolimus, and sirolimus, in frontline or second-line settings, despite a lack of clinical evidence supporting additional efficacy after combining these agents with corticosteroids (Miklos 2017). Approximately 50% to 60% of patients with cGVHD require secondary treatment within 2 years after initial systemic treatment. Despite no consensus with respect to optimal choice of agent, they have typically included rituximab or imatinib (Flowers and Martin 2015). In 2017 Imbruvica® (ibrutinib), a BTK inhibitor, became the first FDA approved therapy for the therapy. The side effects of ibrutinib are significant with 38% of patients discontinuing due to an adverse event and 31% of patients dose reducing in the pivotal evaluation of ibrutinib in patients with cGVHD. Additionally, ibrutinib is not given to a large proportion of their cGVHD patients due to the organ system involvement of the patients that participated in the clinical development program. Recent insights into cGVHD have led to interventions targeting kinases involved in the disease related inflammatory signaling pathways, such as BTK, JAK1/2, and Syk, being evaluated. Nonclinical and patient sample correlative studies targeting these pathways have shown promising results (MacDonald 2017). Axatilimab has the potential, based on its high affinity to inhibit CSF-1R, to provide an immunotherapeutic approach to treat cGVHD. It is currently being evaluated in a Phase ½ study in patients with cGVHD.

Chronic graft-versus-host disease (cGVHD) remains the major cause of morbidity and non-relapse mortality after allogeneic hematopoietic stem cell transplantation (HSCT). cGVHD typically manifests with multiorgan pathology which often occurs during the first year post-HSCT but can also develop beyond the first year post-HSCT (Jagasia 2015).

Treatment of cGVHD is currently based on steroid administration and although many other approaches, including additional immune suppressants, ultraviolet B (UVB) phototherapy, and extracorporeal photopheresis (ECP) are commonly used, none have proven clearly effective.

Targeting pathogenic monocyte derived macrophages by preventing their differentiation and survival through the inhibition of colony stimulating factor 1 receptor (CSF-1R) has proven highly effective in animal systems.

Axatilimab is a humanized IgG4 monoclonal antibody (mAb) directed against CSF-1R with the potential to treat cGVHD through blockade of macrophage activity. Data from the current axatilimab Phase ½ study in patients with cGVHD demonstrate that axatilimab is biologically and clinically active, inducing organ specific responses and symptom improvement, with no significant adverse events. These data support further evaluation of axatilimab.

Study Inclusion Criteria

To be eligible for participation in this study, participants must meet all the following:

Age

Patient must be 6 years of age or older, at the time of signing the informed consent.

Type of Participant and Disease Characteristics

Patients who are allogeneic HSCT recipients with active cGVHD requiring systemic immune suppression.

Active cGVHD is defined as the presence of signs and symptoms of cGVHD per 2014 NIH Consensus Development Project on Criteria for Clinical trials in cGVHD (Jagasia 2015).

Patients with refractory or recurrent active cGVHD after at least 2 lines of systemic therapy.

Patients must have documented progressive disease as defined by the NIH 2014 consensus criteria, in terms of either organ specific algorithm or global assessment, or active, symptomatic cGVHD for which the physician believes that a new line of systemic therapy is required.

Patients may have persistent active acute and cGVHD manifestations (overlap syndrome), as defined by 2014 NIH Consensus Development Project on Criteria for Clinical trials in cGVHD.

Diagnostic Assessments

Karnofsky Performance Scale of ≥60 (if aged 16 years or older); Lansky Performance Score of ≥60 (if aged <16 years)

Adequate organ and bone marrow functions evaluated during the 14 days prior to randomization as follows:
- Absolute neutrophil count≥1.5×109/L without growth factors within 1 week of study entry)
- Platelet count≥50×109/L (without transfusion within 2 weeks of study entry)
- Total bilirubin, ALT, and aspartate aminotransferase (AST)≤upper limit of normal (ULN)
- For patients with suspected liver cGVHD, ALT and AST≤3×ULN and total bilirubin ≤ULN
- Creatinine clearance (CrCl)≥50 mL/min/1.73 m2 based on the Cockcroft-Gault formula in adult patients and Schwartz formula in pediatric patients.

Sex

Male and/or Female Participants.

Contraceptive use by men or women should be consistent with local regulations regarding the methods of contraception for those participating in clinical studies.

Male patients: Non-sterilized male patients who are not abstinent and intend to be sexually active with a female partner of childbearing potential must use a male condom plus spermicide from the time of screening throughout the total duration of the study intervention treatment period and 90 days after the last dose of study intervention. However, periodic abstinence, the rhythm method, and the withdrawal method are not acceptable methods of contraception. Male patients should refrain from sperm donation throughout this period.

Female patients: Evidence of post-menopausal status or negative urinary or serum pregnancy test for female pre-menopausal patients. Women will be considered post-menopausal if they have been amenorrheic for 12 months without an alternative medical cause. The following age-specific requirements apply:

Women <50 years of age would be considered post-menopausal if they have been amenorrheic for 12 months or more following cessation of exogenous hormonal treatments and if they have luteinizing hormone and follicle-stimulating hormone levels in the post-menopausal range for the institution or underwent surgical sterilization (bilateral oophorectomy or hysterectomy).

Women ≥50 years of age would be considered post-menopausal if they have been amenorrheic for 12 months or more following cessation of all exogenous hormonal treatments, had radiation-induced menopause with last menses >1 year ago, had chemotherapy-induced menopause with last menses >1 year ago, or underwent surgical sterilization (bilateral oophorectomy, bilateral salpingectomy or hysterectomy).

Female patients of childbearing potential who are not abstinent and intend to be sexually active with a non-sterilized male partner must use at least 1 highly effective method of contraception from the time of screening throughout the total duration of the study intervention treatment period and 90 days after the last dose of study intervention. Non-sterilized male partners of a female patient of childbearing potential must use male condom plus spermicide throughout this period. Cessation of birth control after this point should be discussed with a responsible physician. Periodic abstinence, the rhythm method, and the withdrawal method are not acceptable methods of birth control. Female patients should also refrain from breastfeeding throughout this period.

To Evaluate the Overall Response Rate (ORR) of Axatilimab at 0.3 mg/Kg Q2W, 1 mg/Kg Q2W, and 3 mg/Kg Q4W in Patients with cGVHD.

ORR in the first 6 cycles as defined by the 2014 NIH Consensus Development Project on Criteria for Clinical Trials in cGVHD.

To Evaluate the Secondary Measures of Clinical Benefit.

ORR on study as defined by the 2014 NIH Consensus Development Project on Criteria for Clinical Trials in cGVHD.

Duration of response (DOR) defined as the time from best response of PR or CR until documented progression of cGVHD, start of new therapy, or death for any reason (Definition 1). DOR defined as the time from initial response of PR or CR until documented progression of cGVHD, start of new therapy, or death for any reason (Definition 2).

Sustained Response Rate (SRR)

Organ-specific response rate is based on 2014 NIH Consensus Development Project on Criteria for Clinical Trials in cGVHD. Joints and fascia response rate based on refined NIH response algorithm for cGVHD. Evaluation includes 1) Proportion of patients with a ≥5-point improvement in modified Lee Symptom Scale score; 2) Percent reduction in average daily dose (or equivalent) of corticosteroids; 3) Proportion of patients who discontinue corticosteroid use after study entry; 4) Percent reduction in average daily dose (or equivalent) of calcineurin inhibitors; 5) Proportion of patients who discontinue calcineurin inhibitors use after study entry.

Secondary—PK/Pharmacodynamic

To assess the plasma population PK (pop PK) profile of axatilimab in patients with cGVHD. Axatilimab PK parameters and patient factors that may explain variability in drug exposure. To assess pharmacodynamic profile of axatilimab the change from baseline in colony stimulating factor 1 (CSF-1), interleukin 34 (IL-34) levels and its association with cGVHD response were measured. To determine or assess the changes in monocyte level with response, the change from baseline in circulating monocyte number and phenotype (CD14/16) was measured.

To determine or assess the baseline in monocyte level with response. The baseline circulating monocyte number and phenotype (CD14/16) was measured.

Secondary—Immunogenicity

Presence of anti-drug antibody (ADA) was measured.

Pharmacodynamic

To evaluate changes in biomarkers following treatment with axatilimab. Frequency of immune cells in peripheral circulation, including natural killer (NK) cells, T-cells, B-cells was measured. T determine or assess the changes in circulating inflammation biomarkers with response, the changes from baseline in circulating inflammation biomarkers was measured. To determine or assess the baseline circulating inflammation biomarkers with response, the baseline circulating inflammation biomarkers was measured. Additional evaluations in patients with skin and pulmonary cGVHD, the changes from baseline in skin macrophages, Langerhans cells and dendritic cells in skin or pulmonary biopsy prior to axatilimab and after 3 cycles of axatilimab treatment (optional skin/pulmonary biopsy consent for those with skin involvement) was measured.

Efficacy

To explore possible additional evidence of clinical benefit, the change in symptom activity as based on Lee cGVHD Activity Assessment Patient Self-Report was measured. Proportion of patients with FFS at Cycle 7 Day 1 and 1 year was determined. FFS is defined as the time from randomization to death or unequivocal progression of cGVHD or relapse of underlying malignancy or addition of another systemic immune suppressive therapy or discontinuation of study treatment due to toxicity. Overall survival (OS); Time to response; Time to next treatment; to assess physician-reported outcome; Change in cGVHD severity as based on the Physician-reported global cGVHD Activity Assessment.

Overall Design

Phase 2, open-label, randomized, multicenter study to evaluate the efficacy, safety and tolerability of axatilimab at 3 different dose levels, in patients with recurrent or refractory active cGVHD who have received at least 2 prior lines of systemic therapy due to progression of disease, intolerability or toxicity. Disease progression as defined by the NIH 2014 consensus criteria, either in terms of organ specific algorithm or global assessment or, active, symptomatic cGVHD or those requiring an additional or new line of systemic therapy.

The study consists of 3 periods: Screening, Treatment, and Follow-up. Throughout the study, patients are evaluated. At enrollment, eligible patients are randomized to one of 3 dose cohorts (axatilimab 0.3 mg/kg every 2 weeks [Q2W], 1 mg/kg Q2W, and 3 mg/kg Q4W). Patients started treatment (Cycle 1 Day 1) within 3 days of randomization/ enrollment and will receive axatilimab from Cycle 1 Day 1, in 4-week (28-day) treatment cycles, until disease progression (as defined by the NIH 2014 consensus criteria), withdrawal of consent, or unacceptable toxicity. Following treatment discontinuation, patients will receive an End of Treatment (EOT) visit 30 days after the last dose of study drug and 2 further safety and disease evaluation visits at 60 and 90 days post last dose of study drug.

Simon's optimal 2-stage design is implemented within each dose cohort. In the first stage 27 patients are randomized to each of the 3 dose cohorts. To limit the potential exposure of patients to an inefficacious dose and obviate the need for a pause in accrual, the initial futility analysis is based on an early endpoint (ie, overall response in the first 3 cycles). Each dose is evaluated for futility and unacceptable toxicity, and the stopping boundaries for futility and unacceptable toxicity are as follows:

Futility assessment based on responses in the first 3 cycles: this assessment will occur when each patient in the cohort has had the opportunity to complete 3 cycles of therapy. If ≤6 patients achieve a response in the first 3 cycles to axatilimab, the randomization to this dose level may be stopped for futility.

Futility assessment based on responses in the first 6 cycles: this assessment will occur when each patient in the cohort has had the opportunity to complete 6 cycles of therapy. If ≤9 patients achieve a response to axatilimab, the randomization to this dose level is stopped for futility.

Safety assessment: safety assessment will occur whenever there is a futility analysis, and the boundary for unacceptable toxicity is ≥8 out of 27 patients having a toxic event defined as any serious or severe (≥Grade 3) TEAE that is attributed to study drug. Grade 2 events that are considered treatment related and result in medical intervention or hospitalization are counted as a toxic event. Study randomization will not pause while data from the interim analyses are being evaluated. An Independent Data Monitoring Committee will evaluate all data that are available at the time of the data cut and determine, in light of the pre-determined futility and toxicity boundaries, which doses patients should no longer be enrolled to. Doses that don't meet the futility or safety boundaries will go on to be evaluated in the second stage of the study in which an additional 43 patients are enrolled into that dose level. A final efficacy analysis is performed when all patients have had the opportunity to complete 6 cycles of treatment with axatilimab. A dose level is considered successful if ≥29 patients have had a response to axatilimab (PR or CR), as defined by NIH 2014 cGVHD criteria. Patients enrolled into a Q2W regimen may be eligible to change to a Q4W regimen during the study. Patients enrolled into the 0.3 mg/kg Q2W regimen may be eligible to have their dose escalated to 1 mg/kg Q2W. The on-treatment response criteria is assessed every 4 weeks and at the EOT visit or discontinuation of the study intervention using 2014 NIH Consensus Development Project on Criteria for Clinical Trials in cGVHD: CR, PR, lack of response (unchanged, mixed or progression).

Number of Patients:

In Stage 1, 27 patients are enrolled into each treatment arm (0.3 mg/kg Q2W, 1 mg/kg Q2W, and 3 mg/kg Q4W).

In Stage 2, an additional 43 patients are enrolled into each of the treatment arms which have passed the futility and safety evaluations from Stage 1.

Dosing Arms and Duration of Treatment:

There are 3 dosing arms: 0.3 mg/kg Q2W, 1 mg/kg Q2W, and 3 mg/kg Q4W. Total study duration is 16 months as follows:

| | |
|---|---|
| Screening period: | Up to 28 days (1 month) prior to the first dose of study intervention |
| Treatment period: | Until unequivocal disease progression or unacceptable toxicity up to a maximum period of 2 years |
| Safety Follow-up period: | Up to 90 days (3 months) after the last administration of study intervention |

Dosing Methods:

Patients will receive axatilimab intravenously at a dose and regimen according to the dosing cohort that they are randomized to as follows:
0.3 mg/kg Q2W
1 mg/kg Q2W
3 mg/kg Q4W Without being bound by any particular theory, PK/pharmacodynamic modeling simulation of distributions of time-averaged non-classical monocytes (NCMC) and intermediate monocytes (IMMC) in patient populations treated with different axatilimab Q2W dosing regimen have been conducted. The modeling indicates that at 0.15 mg/kg Q2W both NCMC and IMMC are at or near baseline, while at 0.5 mg/kg q2w NCMC are <25% decreased and IMMC are near baseline. A 1 mg/kg Q2W dose yields counts that are approximately 50% decreased for both NCMC and IMMC, while 3 mg/kg Q2W results in complete decrease of NCMC and IMMC over a 2-week dosing interval. At 3 mg/kg Q4W, modeling indicates a time-averaged decrease in NCMC and IMMC levels between 1 mg/kg Q2W and 2 mg/kg Q4W. While the clinical relevance of monocyte counts as pharmacodynamic markers of probability of response remains to be determined, circulating monocyte levels are a direct biological readout of CSF-1R inhibition and may be used to guide optimization of dose and schedule. A dose of 0.3 mg/kg Q2W is expected to result in some, but relatively minimal, decrease in time-averaged NCMC and IMMC, generating a sufficient dose range to provide more certainty around the optimal dosing regimen for any subsequent studies.

Intrapatient Dose Escalation

Patients enrolled into the 0.3 mg/kg Q2W dose level who have not experienced any ≥Grade 2 treatment related TEAEs, have experienced unequivocal progression and who would otherwise require addition or change of systemic therapy, may have their dose increased to 1 mg/kg Q2W regardless of timing.

If the 0.3 mg/kg dose level is declared futile, patients may have their dose increased to 1 mg/kg Q2W following decision to cease enrolling to the dose level. Dose escalation should occur only at the start of the new cycle.

Changes to Dosing Schedule

Patients enrolled into Q2W regimens may have their dosing regimens changed to Q4W if they meet the criteria provided.

If, following a change in schedule from Q2W to Q4W, a patient progresses, they may return to a Q2W schedule. At the point of change from a Q2W to Q4W schedule and vice versa, the dose intensity must remain the same ie, the dose intensity immediately before the change must equate to the dose intensity immediately after the change.

Patients Enrolled into the 1 mg/kg Q2W Dose Schedule

Patients who have had their assessment and have achieved a PR/CR that has been sustained for at least 20 weeks or have not progressed, may change their dose schedule from Q2W to Q4W. They will maintain their dose intensity by going from 1 mg/kg to 2 mg/kg. Their new dose is 2 mg/kg Q4W.

Patients Enrolled into the 0.3 mg/kg Q2W Dose Schedule

Patients who have had their assessment and have achieved a PR/CR that has been sustained for at least 20 weeks or have not progressed, may change their dose schedule from Q2W to Q4W. They will maintain their dose intensity by going from 0.3 mg/kg to 0.6 mg/kg. Their new dose is 0.6 mg/kg Q4W.

Patients Who have Escalated to the 1 mg/Kg Q2W Dose Schedule from 0.3 mg/Kg Q2W

If a patient has experienced a PR/CR or has not progressed following dose escalation to 1 mg/kg Q2W and their best response is maintained for 20 weeks, they may change their dose schedule from Q2W to Q4W. They will maintain their dose intensity by going from 1 mg/kg to 2 mg/kg. Their new dose is 2 mg/kg Q4W.

| | Dose Reduction Levels | | |
| --- | --- | --- | --- |
| | Starting Dose | | |
| Dose reduction | 0.3 mg/kg IV Q2W | 1 mg/kg IV Q2W | 3 mg/kg Q4W |
| Reduction of 1 dose level | 0.2 mg/kg | 0.6 mg/kg IV Q2W | 2 mg/kg Q4w |
| Reduction of 2 dose levels | 0.15 mg/kg | 0.3 mg/kg IV Q2W | 1 mg/kg q2w |

Dose modification guidelines for axatilimab due to AST, ALT, bilirubin, CK, amylase or lipase elevation are specified in the table below.

AST, ALT Bilirubin, CK, Amylase and Lipase: Dose Modification Guidelines for Axatilimab Based on Laboratory Results on Day of Dosing (Within 2 Days Prior to Dosing)

| Toxicity | Dose modifications |
| --- | --- |
| Asymptomatic Grade 2 AST (>3.0 – 5.0 × ULN if baseline was normal; >3.0 – 5.0 × baseline if baseline was abnormal), with ≤Grade 1 ALT and ≤Grade 1 total bilirubin | Continue axatilimab without dose delay or reduction with agreement from both Investigator and Sponsor's Medical Monitor |
| Grade 2 ALT (>3.0 – 5.0 × ULN if baseline was normal; >3.0 – 5.0 × baseline if baseline was abnormal) with total bilirubin ≤Grade 1 | Hold axatilimab dose until recovery to Grade 1, then resume axatilimab at the same dose level |
| Grade 3 AST (>5.0 – 20.0 × ULN if baseline was normal; >5.0 – 20.0 × baseline if baseline was abnormal) with total bilirubin ≤Grade 1 | Hold axatilimab dose until recovery to Grade 2, then resume axatilimab at the next lower dose |
| Grade 3 ALT (>5.0 – 20.0 × ULN if baseline was normal; >5.0 – 20.0 × baseline if baseline was abnormal) with total bilirubin ≤Grade 1 | Hold axatilimab dose until recovery to Grade 1, then resume axatilimab at the next lower dose |

| Toxicity | Dose modifications |
| --- | --- |
| Concurrent ALT or AST ≥3 × ULN and total bilirubin ≥2 × ULN in the absence of cholestasis (elevation of ALP and gamma glutamyl transferase (GGT) >2.5 × ULN) | Permanently discontinue axatilimab |
| Grade 4 AST or ALT (>20 × ULN) | Permanently discontinue axatilimab |

| Toxicity | Dose modifications |
|---|---|
| Grade 2 total bilirubin | Rule out cholestasis. If ruled out, hold study intervention until recovery to Grade 1, then resume. If evidence of cholestasis, intervention may be continued without delay |
| Grade 3 total bilirubin | Rule out cholestasis. If ruled out, permanently discontinue study intervention. If evidence of cholestasis, study intervention may be resumed after recovery to Grade 1 |
| ≥Grade 3 CK, amylase or lipase in the absence of any clinical symptoms | Before administering axatilimab, conduct diagnostic evaluation, eg, serum and urine myoglobin, or CK-MB, BUN, creatinine, ECG, troponin (I or T). If results show no evidence of end organ damage, continue axatilimab without dose reduction, |
| Symptomatic Grade 3 CK, amylase or lipase | Permanently discontinue axatilimab |

Axatilimab can cause modulation of Kupffer cells in the liver, which may lead to elevation of liver enzymes (ALT and AST). Serum bilirubin, ALP and GGT will need to be monitored along with ALT and AST for assessment of liver toxicity.

Note:
Grade is per CTCAE 5.0

| Other Non-hematologic Toxicity: Dose Modification Guidelines for Axatilimab | |
|---|---|
| Toxicity | Dose modifications |
| Grade 4 | Administer symptomatic remedies/start prophylaxis. Any Grade 4 events require permanent treatment discontinuation from axatilimab. |
| Grade 3 | Administer symptomatic remedies/start prophylaxis. Hold axatilimab dose until recovery to Grade 2 under the following directions: 1. If axatilimab is held for ≤4 weeks, resume axatilimab at the next lower dose (Table 4). 2. If the axatilimab dose is held for more than 4 weeks, permanently discontinue axatilimab. |
| Grade 2 | Administer symptomatic remedies/start prophylaxis. Do not hold axatilimab dose. |

Note:
Grade is per CTCAE 5.0

Hematologic Toxicity

The guidelines in the Hematologic Toxicity table are followed for determining the dose modifications based on hematologic status at the time of planned dosing.

| Hematologic Toxicity: Dose Modification Guidelines for Axatilimab | |
|---|---|
| Toxicity | Dose modifications |
| Grade 3 to 4 neutropenia, Febrile neutropenia or neutropenic infection Grade 3 to 4 | Hold axatilimab dose until recovery to Grade 1 or study baseline under the following directions. 1. If axatilimab is held for ≤4 weeks, resume axatilimab at the next lower dose |
| uncomplicated thrombocytopenia, or Grade 2 complicated thrombocytopenia | 2. If the axatilimab dose is held for more than 4 weeks, permanently discontinue axatilimab. |
| Recurrence of the same hematologic toxicity | If the same hematologic toxicity recurs: 1. Administer symptomatic remedies/ start prophylaxis. Hold axatilimab dose until recovery to Grade 1 or baseline. 2. If recovered within 7 days, resume axatilimab at next lower dose (Table 4). 3. If the episode is not recovered within 14 days despite axatilimab dose reduction to next lower dose, as described above, permanently discontinue axatilimab. 4. If the $3^{rd}$ episode, permanently discontinue axatilimab. |

Note:
Grade is per CTCAE 5.0

Axatilimab Infusion-Related Reaction

If a patient experiences an axatilimab infusion-related reaction, they may continue on study intervention treatment per guidance presented. Patients who previously experienced an infusion-related reaction will receive a premedication regimen of 25 to 50 mg IV or oral equivalent diphenhydramine and 650 mg IV or oral equivalent acetaminophen/paracetamol approximately 30 to 60 minutes prior to each subsequent dose of axatilimab.

Treatment modifications for axatilimab infusion-related reactions are outlined in the table.

| Infusion-related Reactions for Axatilimab | |
|---|---|
| NCI-CTCAE Grade | Treatment Modification for Axatilimab |
| Grade 1-mild Mild transient reaction: infusion interruption not indicated; intervention not indicated. | Decrease axatilimab infusion rate by 50% being given at the time of event onset and monitor closely for any worsening. |
| Grade 2-moderate Therapy or infusion interruption indicated but responds promptly to symptomatic treatment (eg, antihistamines, nonsteroidal | Temporarily discontinue axatilimab infusion. Resume infusion at 50% of previous rate once infusion-related reaction has resolved or decreased to at least Grade 1 in severity and |

-continued

| Infusion-related Reactions for Axatilimab | |
|---|---|
| NCI-CTCAE Grade | Treatment Modification for Axatilimab |
| anti-inflammatory drug [NSAIDs], narcotics, IV fluids); prophylactic medications indicated for ≤24 hours. | monitor closely for any worsening. At next cycle, administer oral premedication with antihistamine and anti-pyretic and monitor closely for infusion reaction. |
| Grade 3 or Grade 4-severe or life-threatening Grade 3: Prolonged (eg, not rapidly responsive to symptomatic medication and/or brief interruption of infusion); recurrence of symptoms following initial improvement; hospitalization indicated for clinical sequelae<br>Grade 4: Life-threatening consequences-urgent intervention is indicated. | Stop the axatilimab infusion immediately and disconnect infusion tubing from the patient. Patients must be withdrawn immediately from axatilimab treatment and must not receive any further axatilimab treatment. |

NSAIDs = nonsteroidal anti-inflammatory drugs
Note:
Grade is per CTCAE 5.0

If a Grade 2 infusion-related reaction does not improve or worsens after implementation of the modifications indicated (including reducing the infusion rate by 50%), the Investigator may consider treatment with corticosteroids, and the infusion should be stopped for that day. At the next cycle, administration of oral premedication with antihistamine and anti-pyretic is required. Prophylactic steroids are NOT permitted. If the patient has a second infusion-related reaction of Grade 2 or higher on the slower 50% infusion rate, with or without the addition of further medication to the mandatory premedication, the infusion should be stopped, and the patient removed from axatilimab treatment.

Randomization to Axatilimab Dose Level

All patients are centrally assigned to axatilimab dose in a 1:1:1 randomization ratio using an Interactive Response Technology (IRT). Patient assignments are stratified for severity of cGVHD (mild/moderate vs. severe) and prior use of at least one of the following therapies: ibrutinib, ruxolitinib and KD025 (prior therapy vs. no prior therapy).

Administration Procedures

The axatilimab drug product must be diluted to 50 mL with 0.9% saline solution (sodium chloride injection) supplied in an infusion bag. No other drugs should be added to the solution for infusion containing axatilimab.

The dose amount required to prepare the axatilimab infusion solution is based on the patient's weight in kilograms (kg). All patients should be weighed within 3 days prior to dosing. If the patient experiences either a weight loss or gain >10% compared to the weight used for the last dose calculation, the amount of study intervention must be recalculated. For weight change <10%, the decision to recalculate the axatilimab dose can be in accordance with institutional practice.

Efficacy Assessments

It is preferred that all cGVHD assessments be done by the same health care provider who completed the C1D1 assessment. At minimum, the C7D1 assessment should be performed by the same health care provider who performed the C1D1 assessment. In addition, any assessments leading to changes in cGVHD therapy must be confirmed by the PI or primary treating physician.

Response Determination According to 2014 NIH Consensus Definitions

Overall physician-assessed responses are evaluated as defined by the 2014 NIH Consensus Development Project on Criteria for Clinical trials in cGVHD (Lee 2015). CR is defined as resolution of all manifestations in each organ or site, and PR is defined as improvement in at least 1 organ or site without progression in any other organ or site. Table 9 contains the Working Group proposed consensus definitions of CR, PR and progression for assessment of organ-specific responses as well as a global response determination.

| Response Determination for Chronic GVHD Clinical Studies based on Clinician Assessments | | | |
|---|---|---|---|
| Organ | Complete Response | Partial Response | Progression |
| Skin | NIH Skin Score 0 after previous involvement | Decrease in NIH Skin Score by 1 or more points | Increase in NIH Skin Score by 1 or more points, except 0 to 1 |
| Eyes | NIH Eye Score 0 after previous involvement | Decrease in NIH Eye Score by 1 or more points | Increase in NIH Eye Score by 1 or more points, except 0 to 1 |
| Mouth | NIH Modified OMRS 0 after previous involvement | Decrease in NIH Modified OMRS of 2 or more points | Increase in NIH Modified OMRS of 2 or more points |
| Esophagus | NIH Esophagus Score 0 after previous involvement | Decrease in NIH Esophagus Score by 1 or more points | Increase in NIH Esophagus Score by 1 or more points, except 0 to 1 |
| Upper GI | NIH Upper GI Score 0 after previous involvement | Decrease in NIH Upper GI Score by 1 or more points | Increase in NIH Upper GI Score by 1 or more points, except 0 to 1 |

Response Determination for Chronic GVHD Clinical Studies based on Clinician Assessments

| Organ | Complete Response | Partial Response | Progression |
|---|---|---|---|
| Lower GI | NIH Lower GI Score 0 after previous involvement | Decrease in NIH Lower GI Score by 1 or more points | Increase in NIH Lower GI Score by 1 or more points, except from 0 to 1 |
| Liver | Normal ALT, alkaline phosphatase, and total bilirubin after previous elevation of 1 or more | Decrease by 50% | Increase by 2 ULN |
| Lungs | Normal % FEV1 after previous involvement If PFTs not available, NIH Lung Symptom Score 0 after previous involvement | Increase by 10% predicted absolute value of % FEV1 If PFTs not available, decrease in NIH Lung Symptom Score by 1 or more points | Decrease by 10% predicted absolute value of % FEV1 If PFTs not available, increase in NIH Lung Symptom Score by 1 or more points, except 0 to 1 |
| Joints and fascia | Both NIH Joint and Fascia Score 0 and P-ROM score 25 after previous involvement by at least 1 measure | Decrease in NIH Joint and Fascia Score by 1 or more points or increase in P-ROM score by 1 point for any site | Increase in NIH Joint and Fascia Score by 1 or more points or decrease in P-ROM score by 1 point for any site |
| Global | Clinician overall severity score 0 | Clinician overall severity score decreases by 2 or more points on a 0-10 scale | Clinician overall severity score increases by 2 or more points on a 0-10 scale |

Response Determination for Pediatric Patients

No special assessments are performed for pediatric patients. However, for younger patients, or those unable to comply, PFT assessments will include pulse oximetry and as clinically indicated, CT scan with inspiratory and expiratory phases to assess air trapping.

Physician-Reported Global and Organ Specific cGVHD Activity Assessment

Changes in cGVHD severity as defined by the NIH 2014 Consensus Criteria are evaluated using physician reported global and organ-specific cGVHD activity assessment form. The clinicians will provide a subjective assessment of current overall chronic GVHD severity on a 4-point category scale (no chronic GVHD, mild, moderate, severe) independent of the recorded NIH global severity score, and their evaluations of cGVHD changes since the last assessment. Key organ assessments include skin, mouth, liver, upper and lower GI, esophagus, lung, eye, and joint/fascia (Jagasia 2015, Lee 2015).

Patient-Reported cGVHD Activity Assessment (modified Lee cGVHD Symptom Scale)

Changes in patient-reported symptom activity are evaluated using the cGVHD Lee symptom scale (Lee 2002) which has been recommended for use by the 2005 and 2014 NIH Consensus Conferences to capture cGVHD symptoms.

The Lee cGVHD symptom questionnaire asks patients to indicate the degree of "bother" that they experienced during the past 7 days due to symptoms in 7 domains potentially affected by chronic GVHD (skin, eyes and mouth, breathing, eating and digestion, muscles and joints energy, emotional distress) (Lee 2002). Published evidence supports its validity, reliability, and sensitivity to cGVHD severity (Lee 2015, Merkel 2016, Teh 2020).

Pharmacokinetics

Axatilimab levels in plasma samples are determined using a validated enzyme-linked immunosorbent assay (ELISA).

Pharmacodynamics and Biomarkers

Collection of samples for biomarkers is a part of this study. The following blood samples for immune correlate analyses biomarker research are performed and are collected from all patients participating in this study:

Levels of blood immune parameters that may include IFNgamma, IL-1beta, IL-4, IL-5, IL-6, IL-8, IL-10, IL-12p70, TNFalpha, CSF1 and IL-34, and change from baseline compared to PK, safety endpoints.

Levels of circulating classical and non-classical monocytes and change from baseline compared to PK, safety endpoints.

Analysis of numbers of circulating immune cell subsets including CD8+ T cells, CD4+ T cells, B cells, NK cells and change from baseline compared to PK and safety endpoints.

In addition, samples are stored, and analysis may be performed on biomarker variants thought to play a role in immune-modulation including, but not limited to, emergent candidate genes/genome-wide analysis for RNA, serum analytes, or tissue biomarkers to evaluate their association with observed clinical responses to axatilimab.

In patients with skin or pulmonary cGVHD, changes in macrophages, Langerhans cells and dendritic cells in skin and/or transbronchial lung biopsy prior to axatilimab and after 2 cycles (C3D1) of axatilimab treatment are evaluated by immunohistochemistry (IHC) and/or gene expression analysis. (Optional skin biopsy/lung biopsy consent is requested for those with skin/lung involvement).

Immunogenicity Assessments

Antibodies to axatilimab are evaluated in plasma samples collected from all patients. Plasma samples are screened for antibodies binding to axatilimab, and the titer of confirmed positive samples is reported. Other analyses are performed to verify the stability of antibodies to axatilimab and/or further characterize the immunogenicity of axatilimab.

The detection and characterization of antibodies to axatilimab is performed using a validated assay. All samples collected for detection of antibodies to axatilimab also have matching samples evaluated for axatilimab plasma concentration to enable interpretation of the antibody data. Antibodies may be characterized further and/or evaluated for their ability to neutralize the activity of the study intervention(s).

Karnofsky/Lansky Performance Status

The Karnofsky/Lansky Performance Status allows patients to be classified as to their functional impairment on a scale from 0 to 100. The lower the score, the worse the survival for most serious illnesses. The score can be used to compare effectiveness of different therapies and to assess the prognosis in individual patients. The Karnofsky Scale is designed for patients aged 16 years and older, and the Lansky scale is designed for patients less than 16 years old (Lansky 1987). The Karnofsky scale is widely used validated tool in oncology settings, especially HSCT (Schag 1984, Crooks 1991, O'Toole and Golden 1991). The Karnofsky and Lansky performance status are presented in the table.

Hill, L., A. Alousi, P. Kebriaei, R. Mehta, K. Rezvani, E. Shpall (2018). New and emerging therapies for acute and chronic graft versus host disease. *Ther Adv Hematol* 9(1): 21-46.

Inamoto, Y., S. J. Lee, L. E. Onstad, M. E. D. Flowers, B. K. Hamilton, M. H. Jagasia, et al. (2020). Refined National Institutes of Health response algorithm for chronic graft-versus-host disease in joints and fascia. *Blood Adv* 4(1): 40-46.

Jagasia, M., C. Scheid, G. Socie, F. A. Ayuk, J. Tischer, M. L. Donato, et al. (2019). Randomized controlled study of ECP with methoxsalen as first-line treatment of patients with moderate to severe cGVHD. *Blood Adv* 3(14): 2218-2229.

Jagasia, M., R. Zeiser, M. Arbushites, P. Delaite, B. Gadbaw, N. V. Bubnoff (2018). Ruxolitinib for the treatment of patients with steroid-refractory GVHD: an introduction to the REACH trials. *Immunotherapy* 10(5): 391-402.

Jagasia, M. H., H. T. Greinix, M. Arora, K. M. Williams, D. Wolff, E. W. Cowen, et al. (2015). National Institutes of Health Consensus Development Project on Criteria for Clinical Trials in Chronic Graft-versus-Host Disease: I.

| Karnofsky/Lansky Performance Status | | |
|---|---|---|
| Score | Karnofsky (for patients ≥16 years) | Lansky (for patients <16 years) |
| | Able to carry on normal activity; no special care is needed | Able to carry on normal activity; no special care is needed |
| 100 | Normal, no complaints, no evidence of disease | Fully active |
| 90 | Able to carry on normal activity, minor signs or symptoms of disease. | Minor restriction in physically strenuous play |
| 80 | Normal activity with effort, some signs or symptoms of disease | Restricted in strenuous play, tires more easily, otherwise active |
| | Unable to work, able to live at home, cares for most personal needs, a varying amount of assistance is needed | Mild to moderate restriction |
| 70 | Cares for self, unable to carry on normal activity or do active work | Both greater restrictions of, and less time spent in active play |
| 60 | Requires occasional assistance, but is able to care for most of his/her needs | Ambulatory up to 50% of time, limited active play with assistance/supervision |
| 50 | Requires considerable assistance and frequent medical care | Considerable assistance required for any active play, fully able to engage in quiet play |
| | Unable to care for self, requires equivalent of institutional or hospital care, disease may be progressing rapidly | Moderate to severe restriction |
| 40 | Disabled, requires special care and assistance | Able to initiate quite activities |
| 30 | Severely disabled, hospitalization indicated; Death not imminent | Needs considerable assistance for quiet activity |
| 20 | Very sick, hospital indicated, death not imminent | Limited to very passive activity initiated by others (eg, TV) |
| 10 | Moribund, fatal processes progressing rapidly | Completely disabled, not even passive play |
| 0 | Death | Death |

REFERENCES

Alexander, K. A., R. Flynn, K. E. Lineburg, R. D. Kuns, B. E. Teal, S. D. Olver, et al. (2014). CSF-1-dependant donor-derived macrophages mediate chronic graft-versus-host disease. *J Clin Invest* 124(10): 4266-4280.

Crooks, V., S. Waller, T. Smith, T. J. Hahn (1991). The use of the Karnofsky Performance Scale in determining outcomes and risk in geriatric outpatients. *J Gerontol* 46(4): M139-144.

Flowers, M. E. and P. J. Martin (2015). How we treat chronic graft-versus-host disease. *Blood* 125(4): 606-615.

The 2014 Diagnosis and Staging Working Group report. *Biol Blood Marrow Transplant* 21(3): 389-401 e3 81.

Lansky, S. B., M. A. List, L. L. Lansky, C. Ritter-Sterr, D. R. Miller (1987). The measurement of performance in childhood cancer patients. *Cancer* 60(7): 1651-1656.

Lee, S., E. F. Cook, R. Soiffer, J. H. Antin (2002). Development and validation of a scale to measure symptoms of chronic graft-versus-host disease. *Biol Blood Marrow Transplant* 8(8): 444-452.

Lee, S. J., D. Wolff, C. Kitko, J. Koreth, Y. Inamoto, M. Jagasia, et al. (2015). Measuring therapeutic response in chronic graft-versus-host disease. National Institutes of Health consensus development project on criteria for clinical trials in chronic graft-versus-host disease: IV. The 2014 Response Criteria Working Group report. *Biol Blood Marrow Transplant* 21(6): 984-999.

MacDonald, K. P., G. R. Hill, B. R. Blazar (2017). Chronic graft-versus-host disease: biological insights from preclinical and clinical studies. *Blood* 129(1): 13-21.

Merkel, E. C., S. A. Mitchell, S. J. Lee (2016). Content Validity of the Lee Chronic Graft-versus-Host Disease Symptom Scale as Assessed by Cognitive Interviews. *Biol Blood Marrow Transplant* 22(4): 752-758.

Miklos, D., C. S. Cutler, M. Arora, E. K. Waller, M. Jagasia, I. Pusic, et al. (2017). Ibrutinib for chronic graft-versus-host disease after failure of prior therapy. *Blood* 130(21): 2243-2250.

O'Toole, D. M. and A. M. Golden (1991). Evaluating cancer patients for rehabilitation potential. *West J Med* 155(4): 384-387.

Schag, C. C., R. L. Heinrich, P. A. Ganz (1984). Karnofsky performance status revisited: reliability, validity, and guidelines. *J Clin Oncol* 2(3): 187-193.

Teh, C., L. Onstad, S. J. Lee (2020). Reliability and Validity of the Modified 7-Day Lee Chronic Graft-versus-Host Disease Symptom Scale. *Biol Blood Marrow Transplant* 26(3): 562-567.

Thall, P. F., R. M. Simon, E. H. Estey (1995). Bayesian sequential monitoring designs for single-arm clinical trials with multiple outcomes. *Stat Med* 14(4): 357-379.

EQUIVALENTS

The details of one or more embodiments of the invention are set forth in the accompanying description above. Although any methods and materials similar or equivalent to those described herein can be used in the practice or testing of the present invention, the preferred methods and materials are now described. Other features, objects, and advantages of the invention will be apparent from the description and from the claims. In the specification and the appended claims, the singular forms include plural referents unless the context clearly dictates otherwise. Unless defined otherwise, all technical and scientific terms used herein have the same meaning as commonly understood by one of ordinary skill in the art to which this invention belongs.

The invention can be embodied in other specific forms without departing from the spirit or essential characteristics thereof. The foregoing description has been presented only for the purposes of illustration and is not intended to limit the invention to the precise form disclosed, but by the claims appended hereto.

The invention claimed is:

1. A method of treating chronic graft versus host disease (cGVHD), wherein the method comprises intravenously administering an anti-CSF-1R antibody to a human subject in need thereof at a dose of 0.3 mg/kg every two weeks or 1.0 mg/kg every two weeks, wherein the anti-CSF-1R antibody comprises a light chain and a heavy chain, wherein:
   a variable domain of the light chain comprises:
      a CDR comprising the amino acid sequence SEQ ID NO: 1 for CDR-L1,
      a CDR comprising the amino acid sequence SEQ ID NO:2 for CDR-L2, and
      a CDR comprising the amino acid sequence SEQ ID NO:3 for CDR-L3; and
   a variable domain of the heavy chain comprises:
      a CDR comprising the amino acid sequence SEQ ID NO:4 for CDR-H1,
      a CDR comprising the amino acid sequence SEQ ID NO:5 for CDR-H2, and
      a CDR comprising the amino acid sequence SEQ ID NO:6 for CDR-H3.

2. The method of claim 1, wherein:
   the heavy chain comprises the amino acid sequence SEQ ID NO:23; and
   the light chain comprises the amino acid sequence SEQ ID NO:15.

3. The method of claim 1, wherein the heavy chain comprises the amino acid sequence SEQ ID NO:27 and the light chain comprises the amino acid sequence SEQ ID NO:19.

4. The method of claim 1, wherein the chronic graft versus host disease is selected from skin chronic graft versus host disease, eyes chronic graft versus host disease, mouth chronic graft versus host disease, esophagus chronic graft versus host disease, upper GI chronic graft versus host disease, lower GI chronic graft versus host disease, liver chronic graft versus host disease, lungs chronic graft versus host disease, joints and fascia chronic graft versus host disease, and global chronic graft versus host disease.

5. The method of claim 4, wherein the cGVHD in the human subject has progressed on one or more prior therapies.

6. The method of claim 5, wherein the cGVHD in the human subject has progressed from a previous ibrutinib treatment.

7. The method of claim 5, wherein the cGVHD in the human subject has progressed on at least two prior therapies, wherein at least one prior therapy was ibrutinib.

8. The method of claim 5, wherein the method decreases a level of non-classical, intermediate, and/or classical monocytes, and wherein the level of non-classical, intermediate, and/or classical monocytes is not fully depleted between doses of the anti-CSF-1R antibody.

9. The method of claim 1, wherein the anti-CSF-1R antibody is axatilimab.

10. The method of claim 1, wherein the cGVHD is sclerodermatous.

11. The method of claim 3, wherein the heavy chain C-terminal lysine is absent.

12. The method of claim 1, wherein the method further comprises administering a second therapeutic agent.

13. The method of claim 12, wherein the second therapeutic agent is a corticosteroid.

14. A method of treating cGVHD in a human subject in need thereof, the method comprising intravenously administering an anti-CSF-1R antibody comprising a heavy chain comprising an amino acid sequence SEQ ID NO: 27 and a light chain comprising the amino acid sequence SEQ ID NO: 19 at a dose of 0.3 mg/kg every two weeks.

15. The method of claim 14, wherein the heavy chain C-terminal lysine is absent.

16. The method of claim 14, wherein the cGVHD is selected from skin chronic graft versus host disease, eyes chronic graft versus host disease, mouth chronic graft versus host disease, esophagus chronic graft versus host disease, upper GI chronic graft versus host disease, lower GI chronic graft versus host disease, liver chronic graft versus host disease, lungs chronic graft versus host disease, joints and fascia chronic graft versus host disease, and global chronic graft versus host disease.

17. A method of treating cGVHD in a human subject in need thereof, the method comprising intravenously administering an anti-CSF-1R antibody comprising a heavy chain comprising a sequence given in SEQ ID NO: 27 and a light chain comprising a sequence given in SEQ ID NO:19 at a dose of 1.0 mg/kg every two weeks.

18. The method of claim 17, wherein the heavy chain C-terminal lysine is absent.

19. The method of claim 17, wherein the chronic graft versus host disease is selected from skin chronic graft versus host disease, eyes chronic graft versus host disease, mouth chronic graft versus host disease, esophagus chronic graft versus host disease, upper GI chronic graft versus host disease, lower GI chronic graft versus host disease, liver chronic graft versus host disease, lungs chronic graft versus host disease, joints and fascia chronic graft versus host disease, and global chronic graft versus host disease.

20. The method of claim 1 further comprising administering the anti-CSF-1R antibody at a dose of 0.6 mg/kg every four weeks once the subject has a partial response, a complete response, or the cGVHD has not progressed.

21. The method of claim 1 further comprising administering the anti-CSF-1R antibody at a dose of 0.6 mg/kg every four weeks once the subject has a partial response for at least twenty weeks.

22. The method of claim 1 further comprising administering the anti-CSF-1R antibody at a dose of 0.6 mg/kg every four weeks once the subject has a complete response for at least twenty weeks.

23. The method of claim 1 further comprising administering the anti-CSF-1R antibody at a dose of 0.6 mg/kg every four weeks once the cGVHD has not progressed for at least twenty weeks.

24. The method of claim 14 further comprising administering the anti-CSF-1R antibody at a dose of 0.6 mg/kg every four weeks once the subject has a partial response, a complete response, or the cGVHD has not progressed.

25. The method of claim 14 further comprising administering the anti-CSF-1R antibody at a dose of 0.6 mg/kg every four weeks once the subject has a partial response for at least twenty weeks.

26. The method of claim 14 further comprising administering the anti-CSF-1R antibody at a dose of 0.6 mg/kg every four weeks once the subject has a complete response for at least twenty weeks.

27. The method of claim 14 further comprising administering the anti-CSF-1R antibody at a dose of 0.6 mg/kg every four weeks once the cGVHD has not progressed for at least twenty weeks.

28. The method of claim 17 further comprising administering the anti-CSF-1R antibody at a dose of 0.6 mg/kg every four weeks once the subject has a partial response, a complete response, or the cGVHD has not progressed.

29. The method of claim 17, further comprising administering the anti-CSF-1R antibody at a dose of 0.6 mg/kg every four weeks once the subject has a partial response after at least twenty weeks.

30. The method of claim 17, further comprising administering the anti-CSF-1R antibody at a dose of 0.6 mg/kg every four weeks once the subject has a complete response for at least twenty weeks.

31. The method of claim 17, further comprising administering the anti-CSF-1R antibody at a dose of 0.6 mg/kg every four weeks once the cGVHD has not progressed for at least twenty weeks.

* * * * *